United States Patent
Saito et al.

(10) Patent No.: US 8,133,380 B2
(45) Date of Patent: Mar. 13, 2012

(54) METHOD FOR REGENERATING ION EXCHANGER

(75) Inventors: Takayuki Saito, Kanagawa (JP); Tsukuru Suzuki, Kanagawa (JP); Yuji Makita, Kanagawa (JP); Kaoru Yamada, Kanagawa (JP); Masayuki Kumekawa, Tokyo (JP); Hozumi Yasuda, Tokyo (JP); Osamu Nabeya, Tokyo (JP); Kazuto Hirokawa, Tokyo (JP); Mitsuhiko Shirakashi, Tokyo (JP); Yasushi Toma, Kanagawa (JP); Itsuki Kobata, Tokyo (JP)

(73) Assignee: Ebara Corporation, Tokyo (JP)

(*) Notice: Subject to any disclaimer, the term of this patent is extended or adjusted under 35 U.S.C. 154(b) by 774 days.

(21) Appl. No.: 12/222,733

(22) Filed: Aug. 14, 2008

(65) Prior Publication Data

US 2008/0314763 A1    Dec. 25, 2008

Related U.S. Application Data

(62) Division of application No. 10/432,397, filed as application No. PCT/JP02/12519 on Nov. 29, 2002, now Pat. No. 7,427,345.

(30) Foreign Application Priority Data

Nov. 29, 2001 (JP) ................................. 2001-365147
Mar. 22, 2002 (JP) ................................... 2002-80974
Mar. 22, 2002 (JP) ................................... 2002-80975
Nov. 7, 2002 (JP) ................................. 2002-324410

(51) Int. Cl.
*B23H 3/10* (2006.01)

(52) U.S. Cl. .................... 205/688; 204/536; 204/551

(58) Field of Classification Search .................. 205/688; 204/536, 551
See application file for complete search history.

(56) References Cited

U.S. PATENT DOCUMENTS

| | | | |
|---|---|---|---|
| 2,815,320 A * | 12/1957 | Kollsman | 204/524 |
| 6,368,493 B1 | 4/2002 | Mori et al. | |
| 6,602,396 B2 | 8/2003 | Mori et al. | |
| 6,743,349 B2 | 6/2004 | Mori et al. | |
| 6,875,335 B2 | 4/2005 | Mori et al. | |
| 7,101,465 B2 | 9/2006 | Kobata et al. | |

FOREIGN PATENT DOCUMENTS

DE    40 16 000 A    11/1991
DE    43 24 862 A    1/1995

(Continued)

OTHER PUBLICATIONS

European Search Report issued Aug. 29, 2008 in the corresponding European Patent Application No. EP 02 78 5985.

(Continued)

*Primary Examiner* — Arun S Phasge
(74) *Attorney, Agent, or Firm* — Wenderoth, Lind & Ponack, L.L.P.

(57) ABSTRACT

A method and device for regenerating an ion exchanger can regenerate an ion exchanger easily and quickly, and can minimize a load upon cleaning of the regenerated ion exchanger and disposal of waste liquid. A method for regenerating a contaminated ion exchanger includes: providing a pair of a regeneration electrode and a counter electrode, a partition disposed between the electrodes, and an ion exchanger to be regenerated disposed between the counter electrode and the partition; and applying a voltage between the regeneration electrode and the counter electrode while supplying a liquid between the partition and the regeneration electrode and also supplying a liquid between the partition and the counter electrode.

8 Claims, 29 Drawing Sheets

FOREIGN PATENT DOCUMENTS

| | | | |
|---|---|---|---|
| EP | 0 519 504 | A | 12/1992 |
| EP | 1079003 | | 2/2001 |
| EP | 1139400 | | 10/2001 |
| JP | 29-1575 | | 3/1954 |
| JP | 60-75337 | | 4/1985 |
| JP | 6-4074 | | 1/1994 |
| JP | 10-58236 | | 3/1998 |
| JP | 2000-061322 | | 2/2000 |
| JP | 2000-167714 | | 6/2000 |
| JP | 2001-64799 | | 3/2001 |
| WO | 98/51621 | | 11/1998 |
| WO | 01/12292 | | 2/2001 |
| WO | 02/103771 | A | 12/2002 |

OTHER PUBLICATIONS

Japanese Office Action (with English Language Translation) in corresponding Japanese Application No. 2001-365147.

Japanese Office Action (with English Language Translation) in corresponding Japanese Application No. 2002-080974.

Japanese Office Action (with English Language Translation) in corresponding Japanese Application No. 2002-324410.

International Search Report issued Mar. 18, 2003 in the International (PCT) Application of which the present application is the U.S. National Stage.

Japanese Examiner's Final Decision of Refusal (with English Language Translation) in corresponding Japanese Application No. 2002-324410.

European Office Action (in the English Language) dated Feb. 5, 2009 in corresponding European Application No. 02 785 985.9.

Korean Office Action (with English Language Translation) dated Nov. 26, 2008 in corresponding Korean Application No. 10-2004-7008256.

Chinese Office Action (with English Translation) dated Dec. 26, 2006 in corresponding Chinese Application No. 02827689.2.

* cited by examiner

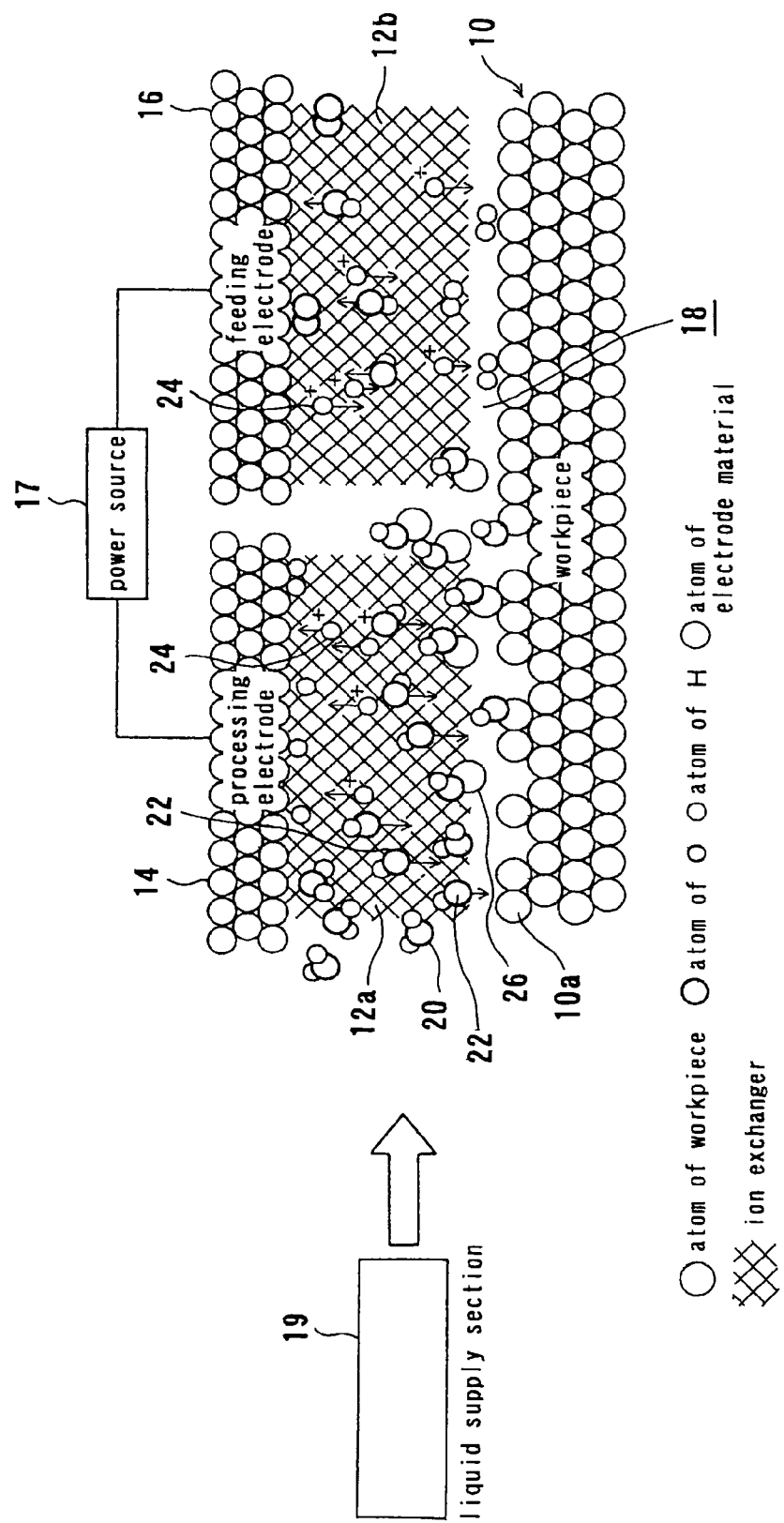

METHOD FOR REGENERATING ION EXCHANGER

This is a divisional of U.S. application Ser. No. 10/432,397, filed Nov. 18, 2003 now U.S. Pat. No. 7,427,345, which is the National Stage of International Application No. PCT/JP02/12519, filed Nov. 29, 2002.

TECHNICAL FIELD

The present invention relates to a method and device for regenerating an ion exchanger, and more particularly to a method and device for regenerating an ion exchanger which, in electrolytic processing for processing an electrically conductive material on the surface of a substrate such as a semiconductor wafer or removing impurities adhering to the substrate surface, can electrochemically remove a metal or other ions taken in an ion exchanger used in the electrolytic processing, thereby regenerating the ion exchanger.

The present invention also relates to an electrolytic processing apparatus and method which is provided with the device for regenerating an ion exchanger and which is useful for processing an electrically conductive material on the surface of a substrate such as a semiconductor wafer or removing impurities adhering to the substrate surface, and to a method for such electrolytic processing.

BACKGROUND ART

In recent years, instead of using aluminum or aluminum alloys as a material for forming interconnection circuits on a substrate such as a semiconductor wafer, there is an eminent movement towards using copper (Cu) which has a low electric resistivity and high electromigration resistance. Copper interconnects are generally formed by filling copper into fine recesses formed in the surface of a substrate. Various techniques are known for forming such copper interconnects, including CVD, sputtering, and plating. According to any such technique, a copper film is formed in the substantially entire surface of a substrate, followed by removal of unnecessary copper by chemical mechanical polishing (CMP).

FIGS. 1A through 1C illustrate, in sequence of process steps, an example of forming such a substrate W having copper interconnects. As shown in FIG. 1A, an insulating film 2, such as a silicon oxide film of $SiO_2$ or a film of low-k material, is deposited on a conductive layer 1a in which electronic devices are formed, which is formed on a semiconductor base 1. A contact hole 3 and a trench 4 for interconnects are formed in the insulating film 2 by the lithography/etching technique. Thereafter, a barrier layer 5 of TaN or the like is formed on the entire surface, and a seed layer 7 as an electric supply layer for electroplating is formed on the barrier layer 5.

Then, as shown in FIG. 1B, copper plating is performed onto the surface of the substrate W to fill the contact hole 3 and the trench 4 with copper and, at the same time, deposit a copper film 6 on the insulating film 2. Thereafter, the copper film 6 and the barrier layer 5 on the insulating film 2 are removed by chemical mechanical polishing (CMP) so as to make the surface of the copper film 6 filled in the contact hole 3 and the trench 4 for interconnects and the surface of the insulating film 2 lie substantially on the same plane. An interconnection composed of the copper film 6 as shown in FIG. 1C is thus formed.

Components in various types of equipment have recently become finer and have required higher accuracy. As sub-micro manufacturing technology has commonly been used, the properties of materials are largely influenced by the processing method. Under these circumstances, in such a conventional machining method that a desired portion in a workpiece is physically destroyed and removed from the surface thereof by a tool, a large number of defects may be produced to deteriorate the properties of the workpiece. Therefore, it becomes important to perform processing without deteriorating the properties of the materials.

Some processing methods, such as chemical polishing, electrolytic processing, and electrolytic polishing, have been developed in order to solve this problem. In contrast with the conventional physical processing, these methods perform removal processing or the like through chemical dissolution reaction. Therefore, these methods do not suffer from defects, such as formation of an affected layer and dislocation, due to plastic deformation, so that processing can be performed without deteriorating the properties of the materials.

A processing method provided with an ion exchanger has been developed as electrolytic processing. FIG. 2 illustrates the principle of this electrolytic processing. FIG. 2 shows the ionic state when an ion exchanger 12a mounted on a processing electrode 14 and an ion exchanger 12b mounted on a feeding electrode 16 are brought into contact with or close to a surface of a workpiece 10, while a voltage is applied via a power source 17 between the processing electrode 14 and the feeding electrode 16, and a liquid 18, e.g. ultrapure water, is supplied from a liquid supply section 19 between the processing electrode 14, the feeding electrode 16 and the workpiece 10. In the case of this electrolytic processing, water molecules 20 in the liquid 18 such as ultrapure water are dissociated efficiently by using the ion exchangers 12a, 12b into hydroxide ions 22 and hydrogen ions 24. The hydroxide ions 22 thus produced, for example, are carried, by the electric field between the workpiece 10 and the processing electrode 14 and by the flow of the liquid 18, to the surface of the workpiece 10 opposite to the processing electrode 14 whereby the density of the hydroxide ions 22 in the vicinity of the workpiece 10 is enhanced, and the hydroxide ions 22 are reacted with the atoms 10a of the workpiece 10. The reaction product 26 produced by this reaction is dissolved in the liquid 18, and removed from the workpiece 10 by the flow of the liquid 18 along the surface of the workpiece 10. Removal processing of the surface of the workpiece 10 is thus effected.

When carrying out electrolytic processing of e.g. copper by using e.g. a cation exchanger having cation-exchange groups, copper is captured by the cation-exchange groups. Progress of the consumption of cation-exchange groups by copper makes it impossible to continue the electrolytic processing. When electrolytic processing of copper is carried out by using as an ion exchanger an anion exchanger having anion-exchange groups, on the other hand, fine particles of a copper oxide are generated and the particles adhere to the surface of the ion exchanger (anion exchanger). Such particles on the ion exchanger can contaminate the surface of a next substrate to be processed.

It is therefore considered to regenerate such consumed or contaminated ion exchangers in order to remove the above drawbacks. Regeneration of an ion exchanger is made by exchange of an ion captured by the ion exchanger for hydrogen ion in the case of a cation exchanger or for hydroxide ion in the case of an anion exchanger.

Ion-exchange processes using an ion exchanger are widely utilized for various purposes, such as purification, separation and condensation. Regeneration of an ion exchanger has conventionally been practiced by immersing the ion exchanger in an acid solution when the exchanger is a cation exchanger, or in an alkali solution when the exchanger is an anion exchanger. In the case of a cation exchanger which has captured an ion having an ion selectivity coefficient close to that of hydrogen ion, such as sodium ion, the ion exchanger can be regenerated in a very short time by immersing it in an acid solution. However, when an ion exchanger, which has captured an ion having a large ion selectivity coefficient, is regenerated by immersing it in an acid or alkali solution, the regeneration rate is very slow. Further, such a chemical liquid remains at a high concentration in the regenerated ion exchanger, requiring cleaning of the ion exchanger. In addition, disposal of the chemical liquid used in the regeneration is needed.

An ion exchanger to be contacted with a workpiece is generally in the shape of a thin film from the viewpoint of surface smoothness and flexibility. Accordingly, the ion-exchange capacity, which is a measure of processing amount, is generally small. It has therefore been practiced to laminate an ion exchanger having a large ion-exchange capacity between a film-type ion exchanger and an electrode so that most of the processing products may be taken in the laminated portion (laminated ion exchanger). Even with such a laminated ion exchanger, when the processing progresses to a certain extent, the laminated portion cannot take in the processing products any more. Change or regeneration of the ion exchanger is therefore necessary. Change of the ion exchanger is generally practiced by hand, and therefore a considerable time is needed for the exchange operation. When carrying out regeneration of the ion exchanger, processing must be stopped during the regeneration operation carried out by the conventional method, which adversely affects the throughput of the apparatus.

SUMMARY OF INVENTION

The present invention has been made in view of the above situation in the background art. It is therefore an object of the present invention to provide a method and device for regenerating an ion exchanger which can regenerate an ion exchanger easily and quickly, and can minimize a load upon cleaning of the regenerated ion exchanger and disposal of waste liquid.

It is also an object of the present invention to provide an electrolytic processing apparatus and method which can regenerate an ion exchanger easily and quickly without stopping processing, can minimize a load upon cleaning of the regenerated ion exchanger and can reduce the installation space.

In order to achieve the above object, the present invention provides a method for regenerating an ion exchanger for use in electrolytic processing, comprising: providing a pair of electrodes and an ion exchanger to be regenerated disposed between the electrodes; and applying a voltage between the electrodes while supplying a liquid therebetween, thereby regenerating the ion exchanger.

According to this method, through an ion-exchange reaction utilizing the ion exchanger as a solid electrolyte, ions which have been taken in the ion exchanger are moved in one direction so that the ions are gathered in the vicinity of one electrode, and the thus gathered ions are removed from the ion exchanger by the flow of a liquid supplied between the electrodes, whereby the ion exchanger can be regenerated.

FIG. 3 illustrates the principle of regeneration of an ion exchanger according to the present invention when the ion exchanger is a cation exchanger. In the case of a cation exchanger, only cations can move or migrate electrically within the cation exchanger. As shown in FIG. 3, a cation exchanger 30a as an ion exchanger to be regenerated is interposed between a pair of electrodes consisting of an anode 32 and a cathode 34. While supplying a liquid from a liquid supply section 36 to between the anode 32 and the cathode 34, a voltage is applied between the electrodes from a regeneration power source 38. Dissolved ions $M^+$ of a to-be-processed material, which have been taken in the cation exchanger (ion exchanger to be regenerated) 30a during processing of the material, and ions $M^+$ of a solid product, deriving from the to-be-processed material, deposited on the surface of the processing electrode then move from the anode 32 side to the cathode 34 side. The ions $M^+$ thus gathered on the cathode 34 side are precipitated on the cathode 34 by plating, but part of the ions are removed from the cation exchanger (ion exchanger to be regenerated) 30a by the flow of a liquid.

In the case of an anion exchanger, only anions can move electrically within the anion exchanger. Thus, in regeneration of an anion exchanger, anions in the anion exchanger can be gathered on the anode side and removed by the same operation as described above.

The liquid is, preferably, ultrapure water, pure water, a liquid having an electric conductivity of not more than 500 μS/cm, or an electrolytic solution.

Ultrapure water is generally a water having an electric conductivity (referring herein to that at 25° C., 1 atm) of not more than 0.1 μS/cm. Pure water is generally a water having an electric conductivity of not more than 10 μS/cm. The use of pure water in electrolytic processing enables a clean processing without leaving impurities on the processed surface of a workpiece, whereby a cleaning step after the electrolytic processing can be simplified. Specifically, one or two-stages of cleaning may suffice after the electrolytic processing.

It is also possible to use a liquid obtained by adding an additive, such as a surfactant, to pure water or ultrapure water, and having an electric conductivity of not more than 500 μS/cm, preferably not more than 50 μS/cm, more preferably not more than 0.1 μS/cm (resistivity of not less than 10 MΩ·cm). The local concentration of reactant ions can be prevented by allowing the additive, which plays a role to prevent local concentration of ions (e.g. hydroxide ions), to exist between a workpiece and an ion exchanger.

An aqueous solution of a neutral salt such as NaCl or $Na_2SO_4$, an acid such as HCl or $H_2SO_4$, or an alkali such as ammonia may be used as the electrolytic solution, and may be properly selected according to the properties of a workpiece.

It is preferred that an ion exchanger for regeneration be disposed between the ion exchanger to be regenerated and at least one of the electrodes. This can prevent ions, flowing in one direction within the ion exchanger to be generated, from adhering to the electrode, thus preventing a solid matter adhering to the electrode from contaminating the regenerated ion exchanger.

The ion exchanger for regeneration preferably has an ion-exchange group of the same polarity as the ion-exchange group of the ion exchanger to be regenerated. This allows ions to move from one ion exchanger to the other ion exchanger.

The electrode disposed on the side of the ion exchanger to be regenerated may be an anode when the ion exchanger to be regenerated and the ion exchanger for regeneration are cation exchangers, and a cathode when the both ion exchangers are anion exchangers.

When regenerating a cation exchanger which uses a cation-exchanger group as an ion-exchanger group, the cation exchanger (ion exchanger to be regenerated) is positioned on the anode side of the pair of electrodes, and the ion exchanger for regeneration is positioned on the cathode side. Thus, as shown in FIG. 4, the cation exchanger 30a to be regenerated and the cation exchanger 40 for regeneration are interposed between the pair of electrodes consisting of the anode 32 and the cathode 34 so that the anode 32 is on the side of the cation exchanger (ion exchanger to be regenerated) 30a. While supplying a liquid from the liquid supply section 36 to between the anode 32 and the cathode 34, a voltage is applied from the regeneration power source 38. Ions $M^+$ in the cation exchanger (ion exchanger to be regenerated) 30a then move to the side of the ion exchanger 40 for regeneration. The cation exchanger 30a is thus regenerated.

On the other hand, when regenerating an anion exchanger which uses an anion-exchange group as an ion-exchange group, the anion exchanger (ion exchanger to be regenerated) is positioned on the cathode side of the pair of electrodes, and the ion exchanger for regeneration is positioned on the anode side. Thus, as shown in FIG. 5, the anion exchanger 30b to be regenerated and the cation exchanger 40 for regeneration are interposed between the pair of electrodes consisting of the anode 32 and the cathode 34 so that the cathode 34 is on the side of the anion exchanger (ion exchanger to be regenerated) 30b. While supplying a liquid from the liquid supply section 36 to between the anode 32 and the cathode 34, a voltage is applied from the regeneration power source 38. Ions $X^-$ in the anion exchanger (ion exchanger to be regenerated) 30b then move to the side of the ion exchanger 40 for regeneration. The anion exchanger 30b is thus regenerated.

The present invention provides a device for regenerating an ion exchanger that is disposed on an electrode for use in electrolytic processing, comprising: a regeneration section including a regeneration electrode; a regeneration power source for applying a voltage between the electrode and the regeneration electrode; and a liquid supply section for supplying a liquid between the electrode and the regeneration electrode; wherein the ion exchanger to be regenerated is disposed between the electrode and the regeneration electrode.

According to the device, an ion exchanger to be regenerated is positioned between the electrode plate and the regeneration electrode, and a voltage is applied between the electrode plate and the regeneration electrode while supplying a liquid therebetween, whereby the ion exchanger can be regenerated.

It is preferred that an ion exchanger for regeneration be disposed between the ion exchanger to be regenerated and the regeneration electrode.

With the ion exchanger to be regenerated and the ion exchanger for regeneration thus facing each other, a liquid is supplied and a voltage is applied between the electrode plate and the regeneration electrode to regenerate the former ion exchanger.

It is preferred that at least one of the ion exchanger to be regenerated and the ion exchanger for regeneration be a laminate configured by a plurality of ion-exchange materials.

When the ion exchanger to be regenerated is a laminate of a plurality of ion-exchange materials, the plurality of ion-exchange materials (ion exchanger to be regenerated) can be regenerated simultaneously. When the ion exchanger for regeneration is configured by a lamination of plurality of ion-exchange materials, the substantial ion-exchanger capacity of the ion exchanger for regeneration is increased, and more ion exchanger (ion exchanger to be regenerated) can be regenerated continuously.

A monitor for monitoring the electrolysis current and time, and/or the quantity of electricity when the voltage is applied between the electrode and the regeneration electrode may be provided.

The regeneration amount of an ion exchanger is governed by the product of the electrolysis current and the electrolysis time, i.e. the quantity of electricity. Accordingly, by monitoring at least one of the electrolysis current and time, and/or the quantity of electricity by the monitor, it becomes possible to control the regeneration amount and detect the end point of regeneration.

The present invention provides another method for regenerating contaminated ion exchanger, comprising: providing a regeneration electrode and a counter electrode, a partition disposed between the regeneration electrode and the counter electrode, and an ion exchanger to be regenerated disposed between the counter electrode and the partition; and applying a voltage between the regeneration electrode and the counter electrode while supplying a liquid between the partition and the regeneration electrode and also supplying a liquid between the partition and the counter electrode.

According to this method, through an ion-exchange reaction utilizing the ion exchanger as a solid electrolyte, ions taken in the ion exchanger are moved toward the regeneration electrode and passed through the partition, and the ions which have passed through the partition are discharged out of the system by the flow of a liquid supplied between the partition and the regeneration electrode, whereby the ion exchanger can be regenerated.

The partition preferably comprises an ion exchanger. It is desired that the partition does not hinder the migration therethrough of impurity ions from the ion exchanger to be regenerated and inhibit permeation therethrough of the liquid (including ions in the liquid) flowing between the partition and the regeneration electrode into the side of the ion exchanger to be regenerated. In this regard, ion exchangers permit selective permeation therethrough of cations or anions. A suitable ion exchanger as a partition can be selected. Further, a film-type ion exchanger as a partition can prevent intrusion of the liquid flowing between the partition and the regeneration electrode into the to-be-regenerated ion exchanger side. Thus, a suitably selected film-type ion exchanger can meet the above requirements for the partition.

In a preferred embodiment, the partition may be a cation exchanger when the ion exchanger to be regenerated is a cation exchanger, and an anion exchanger when the ion exchanger to be regenerated is an anion exchanger. According to this embodiment, the partition (ion exchanger) has an ion-exchange group of the same polarity as the ion-exchange group of the ion exchanger to be regenerated. Such a partition can permit permeation therethrough of only those ions as coming from the ion exchanger to be regenerated and inhibit migration therethrough of ions in the liquid flowing between the partition and the regeneration electrode into the to-be-regenerated ion exchanger side.

The regeneration electrode may be a cathode when the ion exchanger to be regenerated is a cation exchanger, and an anode when the ion exchanger to be regenerated is an anion exchanger.

In the case of a cation exchanger, only cations can move or migrate electrically within the cation exchanger. When regenerating a cation exchanger, as shown in FIG. 6, a pair of a regeneration electrode 43 and a counter electrode 44, a partition 42 disposed between the electrodes, and a cation exchanger 41 as an ion exchanger to be regenerated, disposed between the counter electrode 44 and the partition 42, are provided. A liquid A is supplied from a first liquid supply section 45 to between the partition 42 and the regeneration electrode 43 and a liquid B is supplied from a second liquid supply section 46 to between the partition 42 and the counter electrode 44 and, at the same time, a voltage is applied from a regeneration power source 47 to between the regeneration electrode 43 as a cathode and the counter electrode 44 as an anode. Dissolved ions $M^+$ of a to-be-processed material, which have been taken in the cation exchanger (ion exchanger to be regenerated) 41 during processing of the material, then move from the counter electrode (anode) 44 side toward the regeneration electrode (cathode) 43 side and pass through the partition 42. The ions $M^+$ which have passed through the partition 42 are discharged out of the system by the flow of liquid A supplied between the partition 42 and the regeneration electrode 43. The cation exchanger 41 is thus regenerated.

In the case of an anion exchanger, on the other hand, only anions can move or migrate electrically within the anion exchanger. When regenerating an anion exchanger, as shown in FIG. 7, a pair of a regeneration electrode 43 and a counter electrode 44, a partition 42 disposed between the electrodes, and an anion exchanger 41a as an ion exchanger to be regenerated, disposed between the counter electrode 44 and the partition 42, are provided. A liquid A is supplied from a first liquid supply section 45 to between the partition 42 and the regeneration electrode 43 and a liquid B is supplied from a second liquid supply section 46 to between the partition 42 and the counter electrode 44 and, at the same time, a voltage is applied from a regeneration power source 47 to between the regeneration electrode 43 as an anode and the counter electrode 44 as a cathode. Dissolved ions $X^-$ in the anion exchanger (ion exchanger to be regenerated) 41a then move from the counter electrode (cathode) 44 side toward the regeneration electrode (anode) 43 side and pass through the partition 42. The ions $X^-$ which have passed through the partition 42 are discharged out of the system by the flow of liquid A supplied between the partition 42 and the regeneration electrode 43. The anion exchanger 41a is thus regenerated.

The liquid supplied between the partition and the counter electrode is preferably ultrapure water, pure water or a liquid having an electric conductivity of not more than 500 μS/cm.

The liquid supplied between the partition and the regeneration electrode is preferably a liquid having an electric conductivity of not less than 50 μS/cm which does not form a hardly soluble or insoluble compound through a reaction with an ion which is removed from the ion exchanger to be regenerated.

Such a liquid having an electric conductivity of not less than 50 μS/cm, because of its low electric resistance, can reduce the power consumption in the regeneration system. Further, the liquid does not form an insoluble compound (by-product) through a reaction with an impurity ion. In this regard, an insoluble compound, if formed, will adhere to the partition whereby the electric resistance between the regeneration electrode and the counter electrode will be changed, making it difficult to control the electrolysis current. Such a problem can thus be prevented. A suitable liquid may be chosen depending upon the kind of the impurity ion to be discharged. For example, when regenerating an ion exchanger that was used in electrolytic polishing of copper, sulfuric acid with a concentration of 1 wt % or higher may be employed.

The present invention provides another device for regenerating an ion exchanger, comprising: a regeneration electrode and a counter electrode disposed opposite to each other; a partition disposed between the regeneration electrode and the counter electrode; a power source for applying a voltage between the regeneration electrode and the counter electrode; and a liquid supply section for supplying a liquid between the partition and the regeneration electrode and/or between the partition and the counter electrode; wherein an ion exchanger to be regenerated is disposed between the partition and the counter electrode.

According to this device, an ion exchanger to be regenerated is disposed opposite to the regeneration electrode with the partition being interposed therebetween, and a voltage is applied between the regeneration electrode and the counter electrode while supplying a liquid between the partition and the regeneration electrode and also supplying a liquid between the partition and the counter electrode, whereby the ion exchanger can be regenerated.

The present invention provides an electrolytic processing apparatus, comprising: a processing electrode which can come close to or into contact with a workpiece; a feeding electrode for feeding electricity to the workpiece; an ion exchanger provided on a workpiece side surface of at least one of the processing electrode and the feeding electrode; a regeneration section provided between the ion exchanger and the at least one of the processing electrode and the feeding electrode, provided with the ion exchanger; a processing power source for applying a processing voltage between the processing electrode and the feeding electrode; and a processing liquid supply section for supplying a processing liquid for electrolytic processing to between the workpiece and the at least one of the processing electrode and the feeding electrode, in which the ion exchanger is present.

According to this apparatus, the processing electrode is brought close to or into contact with a workpiece while feeding electricity from the feeding electrode to the workpiece, and a processing liquid for electrolytic processing is supplied to between the workpiece and at least one of the processing electrode and the feeding electrode, in which the ion exchanger is present, while a processing voltage is applied between the processing electrode and the feeding electrode. By the above operation, electrolytic processing of the workpiece by the processing electrode and regeneration of the ion exchanger by the regeneration section can be carried out simultaneously.

The regeneration section preferably comprises a partition disposed close to or in contact with the ion exchanger, a discharge portion formed between the partition and at least one of the processing electrode and the feeding electrode, and a discharging liquid supply section for supplying a discharging liquid to the discharge portion, for discharging contaminants contained in the ion exchanger.

According to the regeneration section, through an ion-exchange reaction utilizing the ion exchanger as a solid electrolyte, impurity ions, such as ionic processing products, which are being taken in the ion exchanger during electrolytic processing, are moved toward the processing electrode or the feeding electrode and passed through the partition, and the impurity ions that have passed through the partition are discharged out of the system by the flow of the discharging liquid supplied to the discharge portion, whereby the ion exchanger can be regenerated.

In the case of a cation exchanger, only cations can move or migrate electrically within the cation exchanger. When the processing electrode, for example, is a cathode, a cation exchanger (ion exchange) is mounted so that it may cover the surface of the processing electrode. If it is intended to regenerate the cation exchanger, as shown in FIG. 8 on the right side, a regeneration section 234a is provided between a cation exchanger 230a and a processing electrode (cathode) 232. In the case of an anion exchanger, on the other hand, only anions can move electrically within the anion exchanger. When the feeding electrode, for example, is made an anode, an anion exchanger (ion exchanger) is mounted so that it may cover the surface of the feeding electrode. If it is intended to regenerate the anion exchanger, as shown in FIG. 8 on the left side, a regeneration section 234b is provided between an anion exchanger 230b and a feeding electrode (anode) 236.

The regeneration sections 234a, 234b each comprise a partition 238 disposed closed to or in contact with the ion exchanger (cation exchanger 230a or anion exchanger 230b), a discharge portion 240 formed between the processing electrode 232 or the feeding electrode 236 and the partition 238, and a discharging liquid supply section 242 for supplying to the discharge portion 240 a discharging liquid A for discharging contaminants. When a workpiece, such as a substrate W, is close to or in contact with the ion exchanger (cation exchanger 230a and/or anion exchanger 230b), the discharging A for discharging contaminants is supplied from the discharging liquid supply section 242 to the discharge portion 240 and a processing liquid B for electrolytic processing is supplied from an electrolytic processing liquid supply section 244 to between the partition 238 and the ion exchanger (cation exchanger 230a and/or anion exchanger 230b), while a voltage is applied from a processing power source 246 to between the processing electrode 232 as a cathode and the feeding electrode 236 as an anode, thereby carrying out electrolytic processing.

During the electrolytic processing, in the cation exchanger 230a, ions such as dissolved ions $M^+$ of a to-be-processed material, which are being taken in the cation exchanger, move toward the processing electrode (cathode) 232 and pass through the partition 238. The ions $M^+$ that have passed the partition 238 are discharged out of the system by the flow of the discharging liquid A supplied between the partition 238 and the processing electrode 232. The cation exchanger 230a is thus regenerated. When a cation exchanger is used as the partition 238, the partition (cation exchanger) 238 can permit permeation therethrough of only ions $M^+$ coming from the cation exchanger 230a. In the anion exchanger 230b, on the other hand, ions $X^-$ in the anion exchanger 230b move toward the feeding electrode (anode) 236 and pass through the partition 238. The ions $X^-$ that have passed the partition 238 are discharged out of the system by the flow of the discharging liquid A supplied between the partition 238 and the feeding electrode 236. The anion exchanger 230b is thus regenerated. When an anion exchanger is used as the partition 238, the partition (anion exchanger) 238 can permit permeation therethrough of only ions $X^-$ coming from the anion exchanger 230b.

Though a single liquid A is used as the liquid for discharging contaminants in this embodiment, it is also possible to use different liquids according to the types of impurity ions discharged from the ion exchangers.

The discharging liquid is preferably a liquid having an electric conductivity of not less than 50 μS/cm which does not form a hardly soluble or insoluble compound through a reaction with an ion which is removed from the ion exchanger provided on a workpiece side surface of at least one of the processing electrode and the feeding electrode.

The present invention provides another electrolytic processing apparatus comprising: a processing electrode which can come close to or into contact with a workpiece; a feeding electrode for feeding electricity to the workpiece; an ion exchanger provided on a workpiece side surface of at least one of the processing electrode and the feeding electrode; a regeneration section including a regeneration electrode and a discharge portion for flowing a discharging liquid therethrough, the discharge portion being formed between the regeneration electrode and the at least one of the processing electrode and the feeding electrode, provided with the ion exchanger; a processing power source for applying a processing voltage between the processing electrode and the feeding electrode; and a processing liquid supply section for supplying a processing liquid for electrolytic processing to between the workpiece and the at least one of the processing electrode and the feeding electrode, in which the ion exchanger is present.

In the case as shown in FIG. 9, if it is intended to regenerate the ion exchanger 230a by utilizing only the electrode 248 both as a processing electrode and a regeneration electrode, especially when the ion exchanger 230a is thick, the amount of processing products taken in by the ion exchanger during processing can be large and the processing may be continued for a long time. On the other hand, however, the electric field is likely to vary due to deposition of the processing products or impurities, accumulation of gas bubbles, etc. Thus, the electric resistances of internal micro portions of the ion exchanger 230a will change to thereby change the current values. This affects the efficiency of ion migration and makes it difficult to effect a uniform regeneration of the ion exchanger 230a. In order to obviate such drawbacks, a processing electrode 232 may be provided independently as shown in FIG. 9, and the electrode 248, positioned below the processing electrode 232, may be utilized as an electrode exclusively for regeneration (regeneration electrode). This suppresses the variation of electric field and enables uniform removal of ionic processing products (impurity ions), etc. accumulated within the ion exchanger 230a.

More specifically, on the opposite side of the processing electrode 232 from the ion exchanger (cation exchanger) 230a, a regeneration section 234c is provided including the regeneration electrode 248 and a discharge portion 240a, formed between the regeneration electrode 248 and the processing electrode 232, for flowing a discharging liquid (liquid A) therethrough. A regeneration voltage is applied from a regeneration power source 249 to between the processing electrode 232 and the regeneration electrode 248, thereby forcibly passing an electric current therebetween. Regeneration of the ion exchanger 230a can be effected in this way. A processing power source, because of its need for a CC (constant current) or CV (constant voltage) control, is generally expensive. A regeneration power source, on the other hand, needs no such control, and therefore a less expensive electrode can be utilized as the regeneration electrode 249.

In a preferred embodiment, the electrolytic processing apparatus further comprises a partition between the ion exchanger and the at least one of the processing electrode and the feeding electrode, provided with the ion exchanger, and/or between the regeneration electrode and the one of the processing electrode and the feeding electrode. According to this embodiment, ionic processing products (impurity ions), etc. taken in the ion exchanger are moved toward the processing electrode or the feeding electrode and passed through the partition. The impurity ions that have passed the partition are taken in the discharging liquid supplied to the discharging portion and discharged out of the system by the flow of the discharging liquid. The ion exchanger can thus be purified (regenerated) in a continuous manner.

The partition is preferably provided on the both sides of the at least one of the processing electrode and the feeding electrode, provided with the ion exchanger. For example, two partitions may be provided on the both surfaces of the processing electrode. In this case, even when the partitions undergo pressure differences due to the pressing force applied to a workpiece, the pressure of a processing liquid and the pressure of a discharging liquid, the partition can be used for a long time without deformation or breakage owing to the support by the electrode. Should one of the partitions be broken for some reason, the remaining one can prevent the discharging liquid from flowing out to the processing liquid side, and therefore prevent the discharging liquid (usually an electrolytic solution) from contacting the workpiece.

Preferably, the at least one of the processing electrode and the feeding electrode, provided with the ion exchanger, is in contact with the partition and is supported and fixed on a support. According to this embodiment, positioning and fixing of the partition can be made automatically by supporting and fixing the processing electrode on a support. This eliminates the need to separately provide a structure for holding the partition.

Preferably, the at least one of the processing electrode and the feeding electrode, provided with the ion exchanger, has a through-hole for passing therethrough the discharging liquid or the processing liquid. Ionic processing products (impurity ions), etc. coming from the ion exchanger pass through the through-hole provided in e.g. the processing electrode and reach the discharge portion. Such a through-hole may be provided e.g. by using a mesh electrode.

It is preferred that the electrolytic processing apparatus further comprise an intermediate electrode between the workpiece and the at least one of the processing electrode and the feeding electrode, provided with the ion exchanger. The provision of the intermediate electrode can change the electric potential stepwise, and can also equalize and stabilize the electric field.

The intermediate electrode and the one of the processing electrode and the feeding electrode, provided with the ion exchanger are preferably connected to an intermediate power source. This can change the voltage stepwise, and can also equalize and stabilize the electric field. It is desired that the voltage applied from the intermediate power source be smaller than the overall voltage (voltage for regeneration).

The intermediate electrode may be a floating electrode that is not connected to a power source. Even a floating electrode can change the voltage stepwise and stabilize the electric field.

Preferably, the intermediate electrode has a through-hole for passing therethrough the discharging liquid or the processing liquid. Ionic processing products (impurity ions), etc. coming from the ion exchanger pass through the through-hole(s) provided in the intermediate electrode and reach the discharge portion. Such a through-hole may be provided e.g. by using a mesh electrode.

The intermediate electrode may be laminated with an ion exchanger or a partition. By thus increasing the number of the intermediate electrode, it becomes possible to change stepwise the electric potential more uniformly.

Preferably, the discharge portion is provided with a stirring means for forcibly stirring the discharging liquid in the discharge portion. Forcible stirring of the discharging liquid in the discharging portion can prevent gas bubbles (hydrogen gas bubbles in removal processing of copper) generated in the surface of the processing electrode upon electrolytic processing from adhering to and growing on the partition and the electrode, thus preventing grown gas bubbles from impeding the formation of a uniform electric field. Further, the forcible stirring can lower the ion concentration of to-be-discharged ions in the vicinity of the partition, thus preventing the ions from impeding the ion-exchange reaction.

It is preferred that the electrolytic processing apparatus further comprise a deaerator for deaerating the discharging liquid. As described above, gas bubbles are generated in electrolytic processing. This increases the concentration of dissolved gas in the discharging liquid which has flowed into and is discharged out of the discharge portion. The provision of a deaerator, which deaerates the discharging liquid that has flowed out of the discharge portion, makes it possible to reuse the discharging liquid. As the deaerator, it is possible to use e.g. a deaerating film-type deaerating chamber, with which deaeration is carried out as follows: A liquid to-be-treated (discharging liquid) is introduced into a hollow non-liquid-permeable thread film, and the external pressure of the film is reduce to deaerate the liquid. The discharging liquid may be reused either batchwise or in a circulatory manner.

The present invention provides an electrolytic processing method, comprising: providing a processing electrode, a feeding electrode, an ion exchanger provided on a workpiece side surface of at least one of the processing electrode and the feeding electrode, and a regeneration section formed between the ion exchanger and the at least one of the processing electrode and the feeding electrode; allowing the processing electrode to be closed to or in contact with the workpiece while feeding electricity from the feeding electrode to the workpiece; supplying a processing liquid for electrolytic processing to between the workpiece and the at least one of the processing electrode and the feeding electrode, in which the ion exchanger is present; and applying a processing voltage between the processing electrode and the feeding electrode, thereby carrying out electrolytic processing of the workpiece by the processing electrode and regeneration of the ion exchanger by the regeneration section simultaneously.

The present invention provides still another electrolytic processing apparatus, comprising: a processing electrode which can come close to or into contact with a workpiece; a feeding electrode for feeding electricity to the workpiece; an ion exchanger provided on a workpiece side surface of at least one of the processing electrode and the feeding electrode; a discharging liquid flow passage, formed between the ion exchanger and the at least one of the processing electrode and the feeding electrode, provided with the ion exchanger, for flowing therethrough a discharging liquid for discharging contaminants contained in the ion exchanger; a processing power source for applying a processing voltage between the processing electrode and the feeding electrode; and a processing liquid supply section for supplying a processing liquid for electrolytic processing to between the workpiece and the at least one of the processing electrode and the feeding electrode, in which the ion exchanger is present.

According to the electrolytic processing apparatus, processing products as dissolved ions (impurity ions) are taken in the ion exchanger at the early stage of electrolytic processing, and when the ion-exchange capacity of the ion exchanger reaches its limit, the ionic processing products (impurity ions) can be taken in the discharging liquid flowing through the discharging liquid flow passage formed between the ion exchanger and the electrode (processing electrode or feeding electrode), whereby the ion exchanger can be regenerated. The apparatus can thus eliminate or at least lessen the exchange of the expendable member.

Preferably, a support for supporting the ion exchanger in a flat state is provided in the discharging liquid flow passage. The provision of such a support makes it possible to use an ion exchange in the form of a thin film, and allow the ion exchanger to contact a workpiece flexibly. The flexibility is required to respond to variations of the to-be-processed surface of a workpiece due the size of the workpiece, the relative movement between the workpiece and the ion exchanger, etc.

The ion exchanger is preferably a multi-layer laminate of two or more layers including a front surface layer composed of an ion exchanger in the form of a film and an intermediate or back surface layer composed of an elastic ion exchanger having a large ion-exchange capacity. Such a laminate, though the ion-exchange capacity of the surface layer ion exchanger may be small, can have an increased total ion-exchange capacity due to the presence of the intermediate or back surface ion exchanger. Moreover, because of the elasticity, the laminate can be prevented the workpiece from being damaged when an excessive pressure is applied thereto in electrolytic processing.

It is preferred that the electrolytic processing apparatus further comprise a discharging liquid regeneration section for regenerating the discharging liquid which has flowed through the discharging liquid flow passage and flowed out of the flow passage. This makes it possible to reuse the discharging liquid, thereby lowering the running cost of the apparatus.

The discharging liquid regeneration section is preferably provided with a liquid regeneration electrode which is electrically separated from the discharging liquid to be regenerated. The use of such a liquid regeneration electrode can carry out regeneration of the discharging liquid efficiently while preventing a short circuit.

Preferably, the discharging liquid regeneration section is provided in a circulation line connecting in the inlet and the outlet of the discharging liquid passage, and the circulation line is provided with a deaerator. This allows the discharging liquid to circulate during processing.

The present invention provides still another electrolytic processing apparatus comprising: a processing electrode which can come close to or into contact with a workpiece; a feeding electrode for feeding electricity to the workpiece; an ion exchanger provided on a workpiece side surface of at least one of the processing electrode and the feeding electrode; a discharging liquid flow passage, formed between the ion exchanger and the at least one of the processing electrode and the feeding electrode, provided with the ion exchanger, for flowing therethrough a discharging liquid containing an ion-exchange group for discharging contaminants; a processing power source for applying a processing voltage between the processing electrode and the feeding electrode; and a processing liquid supply section for supplying a processing liquid for electrolytic processing to between the workpiece and the at least one of the processing electrode and the feeding electrode, in which the ion exchanger is present.

Examples of the discharging liquid containing an ion-exchange group may include an ion exchanger which itself has liquidity and a liquid obtained by pulverizing an ion exchanger having a large ion-exchange capacity, and mixing the pulverized product with a liquid such as pure water.

Further, the present invention provides another electrolytic processing method comprising: providing a processing electrode, a feeding electrode and an ion exchanger provided on a workpiece side surface of at least one of the processing electrode and the feeding electrode; allowing the processing electrode to be close to or in contact with a workpiece while feeding electricity from the feeding electrode to the workpiece; and applying a processing voltage between the processing electrode and the feeding electrode while supplying a discharging liquid containing an ion-exchange group for discharging contaminants into a discharging liquid flow passage formed between the ion exchanger and the at least one of the processing electrode and the feeding electrode, provided with the ion exchanger, and also supplying a processing liquid for electric processing to between the workpiece and the at least one of the processing electrode and the feeding electrode, in which the ion exchanger is present, thereby carrying out processing of the workpiece.

The above and other objects, features, and advantages of the present invention will be apparent from the following description when taken in conjunction with the accompanying drawings which illustrates preferred embodiments of the present invention by way of example.

BRIEF DESCRIPTION OF DRAWINGS

FIG. 2 is a diagram illustrating the principle of electrolytic processing as carried out by using an ion exchanger;

DETAILED DESCRIPTION OF PREFERRED EMBODIMENTS

Figure 1A:
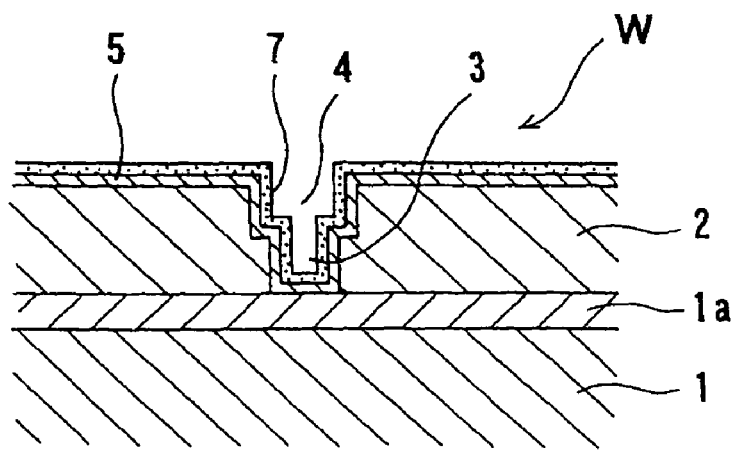
FIGS. 1A through 1C are diagrams illustrating, in sequence of process steps, an example of the formation of copper interconnects.

Preferred embodiments of the present invention will now be described with reference to the drawings. Though the below-described embodiments refer to application to electrolytic processing apparatuses (electrolytic polishing apparatuses) which use a substrate as a workpiece to be processed and remove (polish) copper formed on the surface of the substrate, the present invention is of course applicable to the other workpiece, and to other electrolytic process.

FIGS. 10 through 13 show an electrolytic processing apparatus 48a having a regeneration device of an ion exchanger according to a first embodiment of the present invention. This electrolytic processing apparatus 48a includes a substrate holder 52, supported at the free end of a pivot arm 50 that can pivot horizontally, for attracting and holding the substrate W with its front surface facing downward (so-called "face-down" manner), a disc-shaped electrode section 60 made of an insulating material and positioned beneath the substrate holder 52, and a regeneration section 64, supported at the free end of a pivot arm 62 that can pivot horizontally, for regenerating the ion exchanger 58. The electrode section 60 has, embedded therein, fan-shaped processing electrodes 54 and feeding electrodes 56 that are disposed alternately with their surfaces (upper faces) exposed. The film-like ion exchanger 58 is mounted on the upper surface of the electrode section 60 so as to cover the surfaces of the processing electrodes 54 and the feeding electrodes 56.

This embodiment uses, merely as an example of the electrode section 60 having the processing electrodes 54 and the feeding electrodes 56, such one that has a diameter a little longer than that of the substrate W held by the substrate holder 52 so that the entire surface of the substrate W may undergo electrolytic processing by making a scroll movement of the electrode section 60.

The ion exchanger 58 may be a nonwoven fabric which has an anion-exchange group or a cation-exchange group. A cation exchanger preferably carries a strongly acidic cation-exchange group (sulfonic acid group); however, a cation exchanger carrying a weakly acidic cation-exchange group (carboxyl group) may also be used. Though an anion exchanger preferably carries a strongly basic anion-exchange group (quaternary ammonium group), an anion exchanger carrying a weakly basic anion-exchange group (tertiary or lower amino group) may also be used.

The nonwoven fabric carrying a strongly basic anion-exchange group can be prepared by, for example, the following method: A polyolefin nonwoven fabric having a fiber diameter of 20-50 μm and a porosity of about 90% is subjected to the so-called radiation graft polymerization, comprising γ-ray irradiation onto the nonwoven fabric and the subsequent graft polymerization, thereby introducing graft chains; and the graft chains thus introduced are then aminated to introduce quaternary ammonium groups thereinto. The capacity of the ion-exchange groups introduced can be determined by the amount of the graft chains introduced. The graft polymerization may be conducted by the use of a monomer such as acrylic acid, styrene, glicidyl methacrylate, sodium styrenesulfonate or chloromethylstyrene. The amount of the graft chains can be controlled by adjusting the monomer concentration, the reaction temperature and the reaction time. Thus, the degree of grafting, i.e. the ratio of the weight of the nonwoven fabric after graft polymerization to the weight of the nonwoven fabric before graft polymerization, can be made 500% at its maximum. Consequently, the capacity of the ion-exchange groups introduced after graft polymerization can be made 5 meq/g at its maximum.

The nonwoven fabric carrying a strongly acidic cation-exchange group can be prepared by the following method: As in the case of the nonwoven fabric carrying a strongly basic anion-exchange group, a polyolefin nonwoven fabric having a fiber diameter of 20-50 μm and a porosity of about 90% is subjected to the so-called radiation graft polymerization comprising γ-ray irradiation onto the nonwoven fabric and the subsequent graft polymerization, thereby introducing graft chains; and the graft chains thus introduced are then treated with a heated sulfuric acid to introduce sulfonic acid groups thereinto. If the graft chains are treated with a heated phosphoric acid, phosphate groups can be introduced. The degree of grafting can reach 500% at its maximum, and the capacity of the ion-exchange groups thus introduced after graft polymerization can reach 5 meq/g at its maximum.

The base material of the ion exchanger 58 may be a polyolefin such as polyethylene or polypropylene, or any other organic polymer. Further, besides the form of a nonwoven fabric, the ion-exchanger may be in the form of a woven fabric, a sheet, a porous material, short fibers or net, etc.

When polyethylene or polypropylene is used as the base material, graft polymerization can be effected by first irradiating radioactive rays (γ-rays or electron beam) onto the base material (pre-irradiation) to thereby generate a radical, and then reacting the radical with a monomer, whereby uniform graft chains with few impurities can be obtained. When an organic polymer other than polyolefin is used as the base material, on the other hand, radical polymerization can be effected by impregnating the base material with a monomer and irradiating radioactive rays (γ-rays, electron beam or UV-rays) onto the base material (simultaneous irradiation). Though this method fails to provide uniform graft chains, it is applicable to a wide variety of base materials.

By using the ion exchanger 58 made of a nonwoven fabric, which liquid can flows therethough, having an anion-exchange group or a cation-exchange group, it becomes possible that pure water or ultrapure water, or a liquid such as an electrolytic solution can freely move within the nonwoven fabric, and the ion-exchange reaction between ions in the liquid and the ion-exchange group of the ion exchanger can be easily taken place.

When the ion exchanger 58 has only one of anion-exchange group and cation-exchange group, a limitation is imposed on electrolytically processable materials and, in addition, impurities are likely to form due to the polarity. In order to solve this problem, the ion exchanger 58 may have such a structure wherein anion exchangers having an anion-exchange group and cation exchangers having a cation-exchange group are concentrically disposed to constitute an integral structure. The anion exchangers and the cation exchangers may be superimposed on the surface, to be processed, of a substrate. It may also be possible to make the anion exchangers and the cation exchangers each in the shape of a fan, and dispose them alternately. Alternatively, the ion exchanger 58 may carry both of an anion-exchange group and a cation-exchange group per se. Such an ion exchanger may include an amphoteric ion exchanger in which anion-exchange groups and cation-exchange groups are distributed randomly, a bipolar ion exchanger in which anion-exchange groups and cation-exchange groups are present in layers, and a mosaic ion exchanger in which portions containing anion-exchange groups and portions containing cation-exchange groups are present in parallel in the thickness direction. Incidentally, it is of course possible to selectively use, as the ion exchanger 58, one having an anion-exchange group or one having a cation-exchange group according to the material to be processed.

The pivot arm 50, which moves up and down via a ball screw 68 by the actuation of a motor 66 for vertical movement, for pivoting the substrate holder 52 is connected to the upper end of a pivot shaft 72 that pivots by the actuation of a pivoting motor 70. The substrate holder 52 is connected to a motor 74 for rotation that is mounted on the free end of the pivot arm 50, and is allowed to rotate by the actuation of the motor 74 for rotation.

The electrode section 60 is connected directly to a hollow motor 76, and is allowed to make scroll movement (translational rotating movement) by the actuation of the hollow motor 76. A through-hole 60a as a pure water supply section for supplying pure water, preferably ultrapure water, is formed in the central portion of the electrode section 60. The through-hole 60a is connected to a pure water supply pipe 80, that vertically extends inside the hollow motor 76, via a through hole 78a formed inside a crank shaft 78 connected directly to a drive shaft of the hollow motor 76 for making scroll movement. Pure water or ultrapure water is supplied through the through-hole 60a, and via the ion exchanger 58 having water absorption property, is supplied to the entire processing surface of the substrate W.

Pure water herein refers to a water having an electric conductivity of not more than 10 μS/cm, and ultrapure water refers to a water having an electric conductivity of not more than 0.1 μS/cm. Instead of pure water, a liquid having an electric conductivity of not more than 500 μS/cm or any electrolytic solution may be used. By supplying such a processing liquid during processing, the instability factors of processing, such as process products and dissolved gases, can be removed, and processing can be effected uniformly with good reproducibility.

According to this embodiment, a plurality of fan-shaped electrode plates 82 is disposed in the surface of the electrode section 60 along the circumference direction, and the cathode and anode of a power source 86 are alternately connected, via a control box 84, to the electrode plates 82. The electrode plates 82 connected to the cathode of the power source 86 become the processing electrodes 54 and the electrode plates 82 connected to the anode of the power source 86 become the feeding electrodes 56. This applies to processing of e.g. copper, because electrolytic processing of copper proceeds on the cathode side. Depending upon a material to be processed, the cathode side can be a feeding electrode and the anode side can be a processing electrode. More specifically, when the material to be processed is copper, molybdenum, iron or the like, electrolytic processing proceeds on the cathode side, and therefore the electrode plates 82 connected to the cathode of the power source 86 should be the processing electrodes 54 and the electrode plates 82 connected to the anode should be the feeding electrodes 56. In the case of aluminum, silicon or the like, on the other hand, electrolytic processing proceeds on the anode side. Accordingly, the electrode plates connected to the anode of the power source should be the processing electrodes and the electrode plates connected to the cathode should be the feeding electrodes.

By thus disposing the processing electrodes 54 and the feeding electrodes 56 separately and alternately in the circumferential direction of the electrode section 60, fixed feeding portions to supply electricity to a conductive film (portion to be processed) of the substrate is not needed, and processing can be effected to the entire surface of the substrate. Further, by changing the positive and negative in a pulse manner, an electrolysis product can be dissolved and the flatness of the processed surface can be enhanced by the multiplex repetition of processing.

With respect to the processing electrode 54 and the feeding electrode 56, oxidation or dissolution thereof due to an electrolytic reaction is generally a problem. In view of this, it is preferred to use, as a base material of the feeding electrode 56, carbon, a noble metal that is relatively inactive, a conductive oxide or a conductive ceramics, rather than a metal or metal compound widely used for electrodes. A noble metal-based electrode may, for example, be one obtained by plating or coating platinum or iridium onto a titanium electrode, and then sintering the coated electrode at a high temperature to stabilize and strengthen the electrode. Ceramics products are generally obtained by heat-treating inorganic raw materials, and ceramics products having various properties are produced from various raw materials including oxides, carbides and nitrides of metals and nonmetals. Among them there are ceramics having an electric conductivity. When an electrode is oxidized, the value of the electric resistance generally increases to cause an increase of applied voltage. However, by protecting the surface of an electrode with a non-oxidative material such as platinum or with a conductive oxide such as an iridium oxide, the increase of electric resistance due to oxidation of the base material of an electrode can be prevented.

When carrying out electrolytic processing of copper by using as the ion exchanger 58 a cation exchanger having cation-exchange groups, a considerable proportion of the ion-exchange groups of the ion exchanger (cation exchanger) 58 is occupied by copper after the processing, leading to lowering of the processing efficiency of the next processing. When carrying out electrolytic processing of copper by using as the ion exchanger 58 an anion exchanger having anion-exchange groups, on the other hand, fine particles of a copper oxide are generated and the particles adhere to the surface of the ion exchanger (anion exchanger) 58. Such particles on the ion exchanger can contaminate the surface of a next substrate to be processed.

The regeneration section 64 is provided for regenerating such a consumed or contaminated ion exchanger 58, thereby removing the above drawbacks. The regeneration section 64 is mounted on the free end of a pivot arm 62 which is coupled to the upper end of a pivot shaft 90 that rotates by the actuation of a pivoting motor 88. The regeneration section 64 includes a regeneration electrode holder 94, a disc-shaped regeneration electrode 96 held with its surface facing downward by the regeneration electrode holder 94, and an ion exchanger 98 for regeneration, covering the entire surface (lower surface) of the regeneration electrode 96. The regeneration electrode 96 is designed to be large enough to entirely cover an electrode section 60 even when the electrode section 60 makes a scroll movement. By the pivoting of the pivot arm 62, the regeneration electrode 96 moves to a position at which it covers the entire surface of the electrode section 60. At that position, the ion exchanger 98 can come close to or into contact with the surface (upper surface) of the ion exchanger 58 covering the electrode plates 82, consisting of the processing electrodes 54 and the feeding electrodes 56, of the electrode section 60.

The regeneration electrode 96 is to be electrically connected by a wire 100 to one of the electrodes (e.g. cathode) of a power source 86 by means of a control box 84, while the electrode plates 82, consisting of the processing electrodes 54 and the feeding electrodes 56, are to be electrically connected to the other electrode (e.g. anode) of the power source 86. A regeneration power source 102 is thus constructed.

The ion exchanger 98 for regeneration has the same type of ion-exchange group as the ion exchanger 58 to be regenerated, mounted on the electrode section 60. That is, when a cation exchanger having a cation-exchange group is used as the ion exchanger 58, a cation exchanger is used also as the ion exchanger 98 for regeneration. When an anion exchanger having an anion-exchange group is used as the ion exchanger 58, an anion exchanger is used also as the ion exchanger 98 for regeneration. When connecting, by means of the control box 84, the regeneration electrode 96 to one of the electrodes of the power source 86 by the wire 100 and, at the same time, connecting the electrode plates 82, consisting of the processing electrodes 54 and the feeding electrodes 56, to the other electrode of the power source 86, as described above, such control is made that the electrode on the ion exchanger 98 side, i.e. the regeneration electrode 96, should have the opposite polarity to the polarity of the ion exchangers 58, 98. Thus, when cation exchangers, having a cation-exchange group as an ion-exchange group, are used as the ion exchangers 58, 98, such control is made that the regeneration electrode 96 should become a cathode and the electrode plates 82 should become an anode. Conversely, when anion exchangers are used as the ion exchangers 58, 98, the regeneration electrode 96 should become an anode and the electrode plates 82 should become a cathode.

Next, a substrate processing (electrolytic processing) and a regeneration treatment by the substrate processing apparatus will be described.

Figure 10:
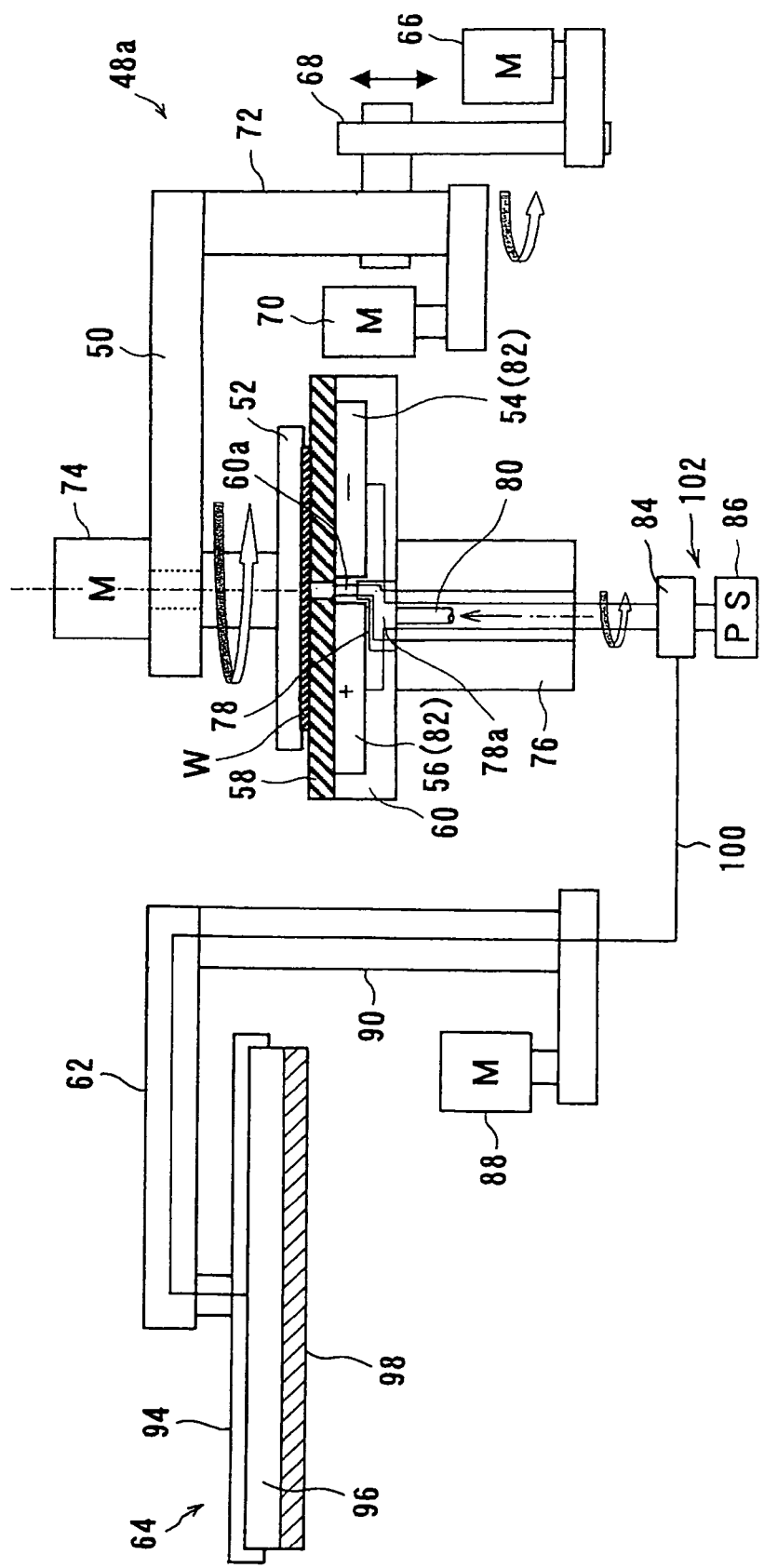
FIG. 10 is a cross-sectional view of an electrolytic processing apparatus provided with an ion exchanger regeneration device according to an embodiment of the present invention, showing the state of the apparatus upon electrolytic processing.
Figure 11:
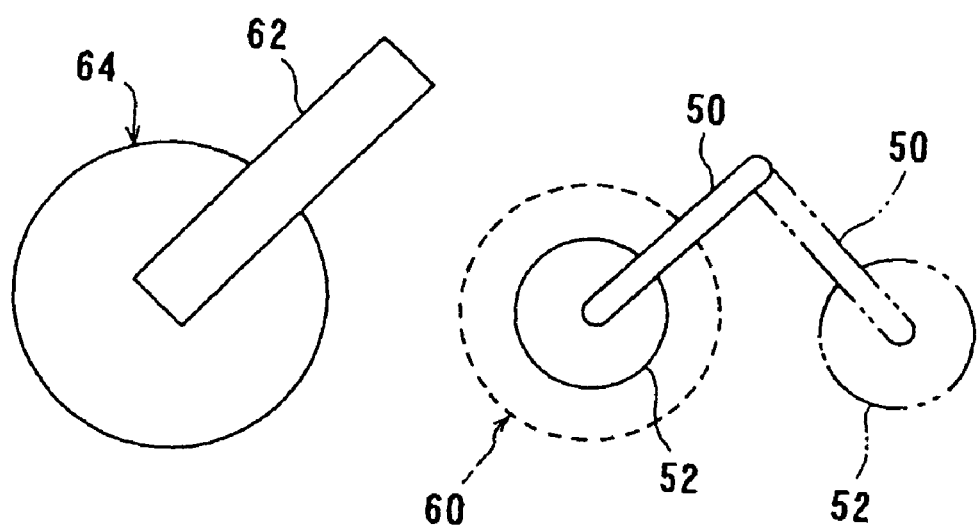
FIG. 11 is a plan view of FIG. 10.
Figure 12:
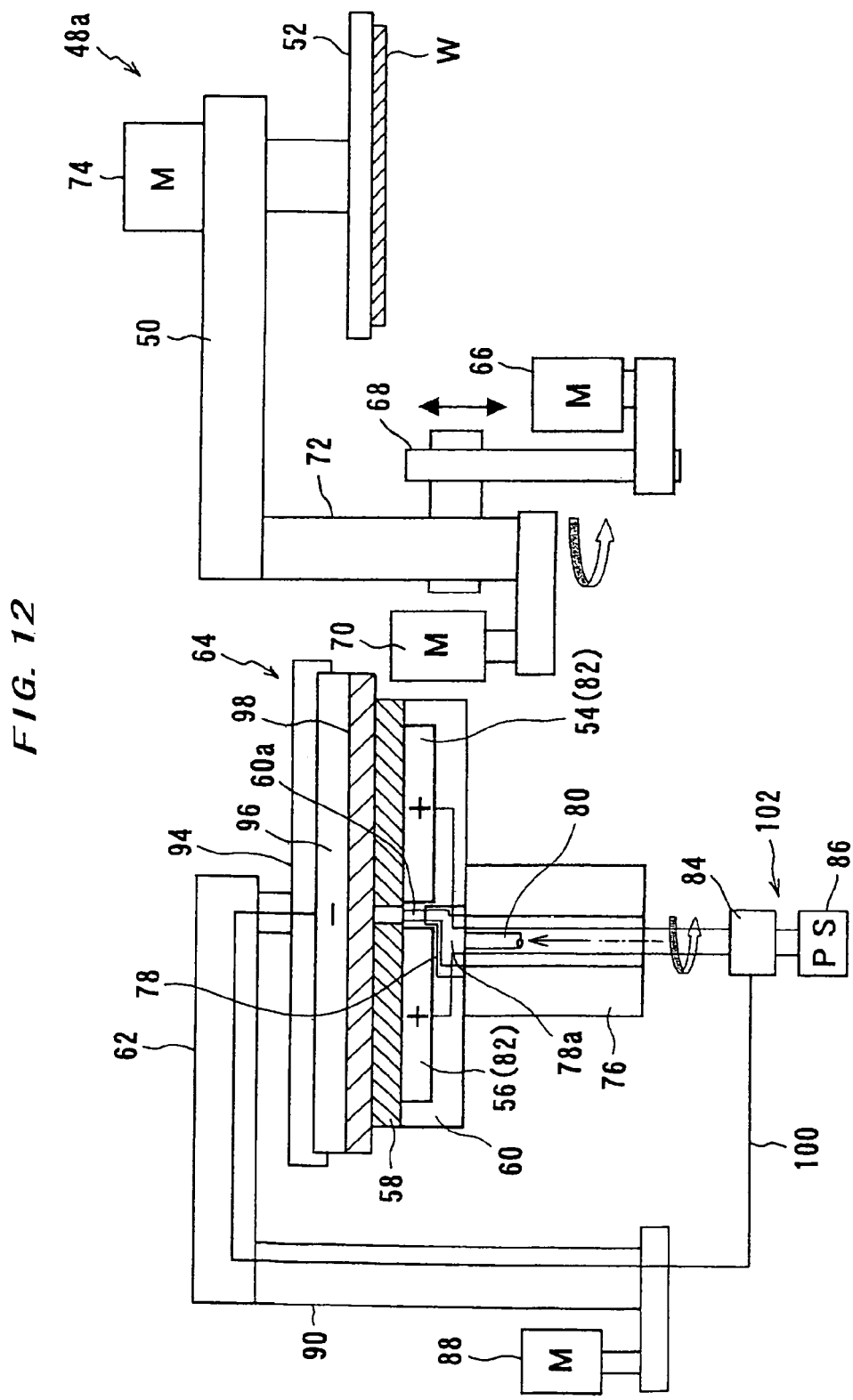
FIG. 12 is a cross-sectional view of an electrolytic processing apparatus provided with an ion exchanger regeneration device according to an embodiment of the present invention, showing the state of the apparatus upon regeneration of an ion exchanger.
Figure 13:
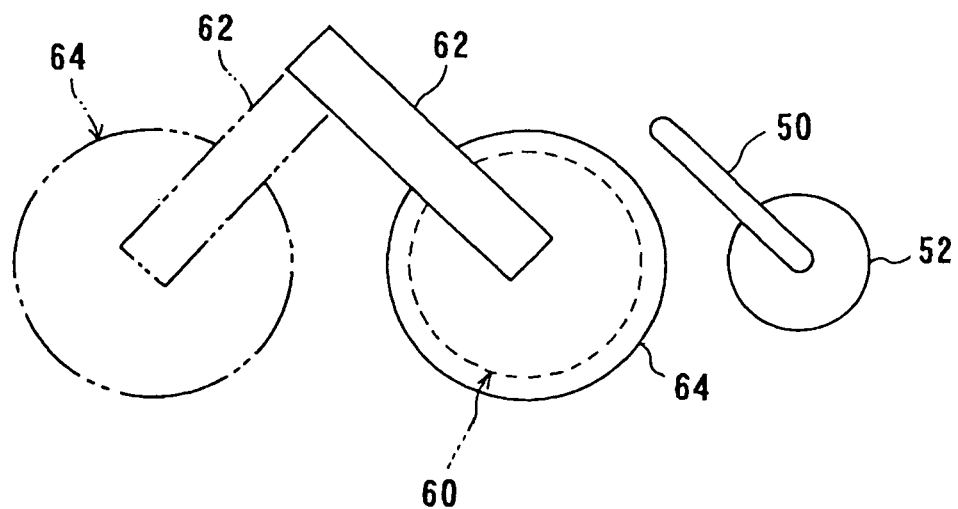
FIG. 13 is a plan view of FIG. 12.

First, a substrate W, as shown in FIGS. 10 and 11, is attracted and held by the substrate holder 52 of the electrolytic processing apparatus 48a, and the substrate holder 52 is moved by the pivot arm 50 to a processing position right above the electrode section 60. The substrate holder 52 is then lowered by the actuation of the motor 66 for vertical movement, so that the substrate W held by the substrate holder 52 contacts or gets close to the surface of the ion exchanger 58 mounted on the upper surface of the electrode section 60.

Figure 1B:
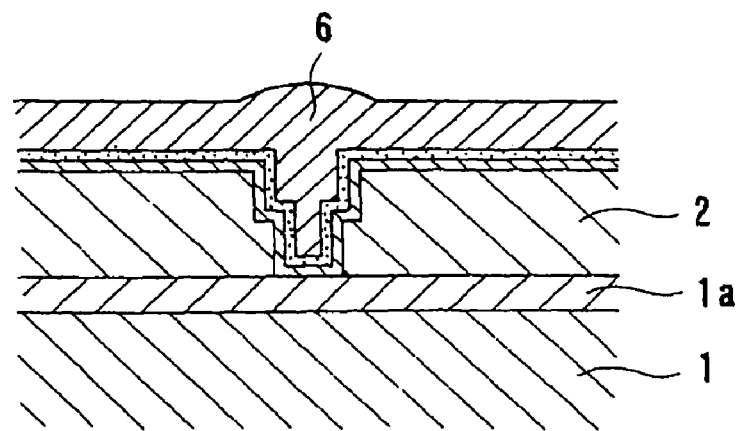
Figure 1C:
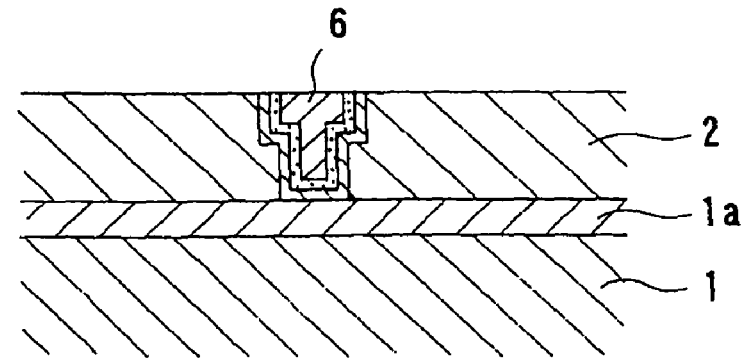
Figure 3:
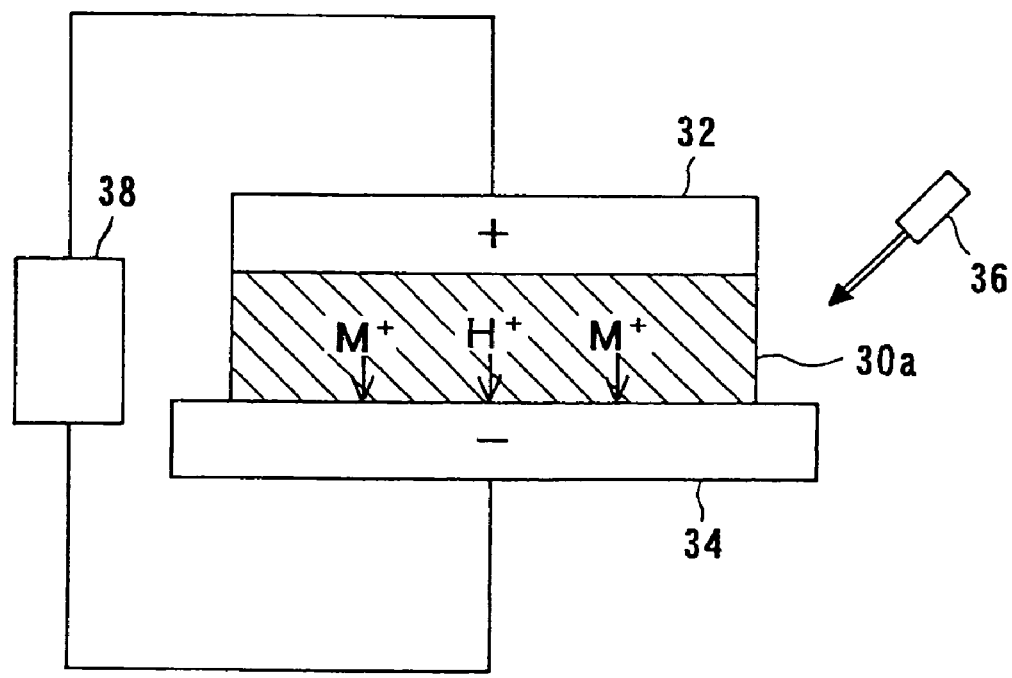
FIG. 3 is a diagram illustrating the principle of regeneration of an ion exchanger as carried out by disposing the ion exchanger to be regenerated between a pair of electrodes according to the present invention.
Figure 4:
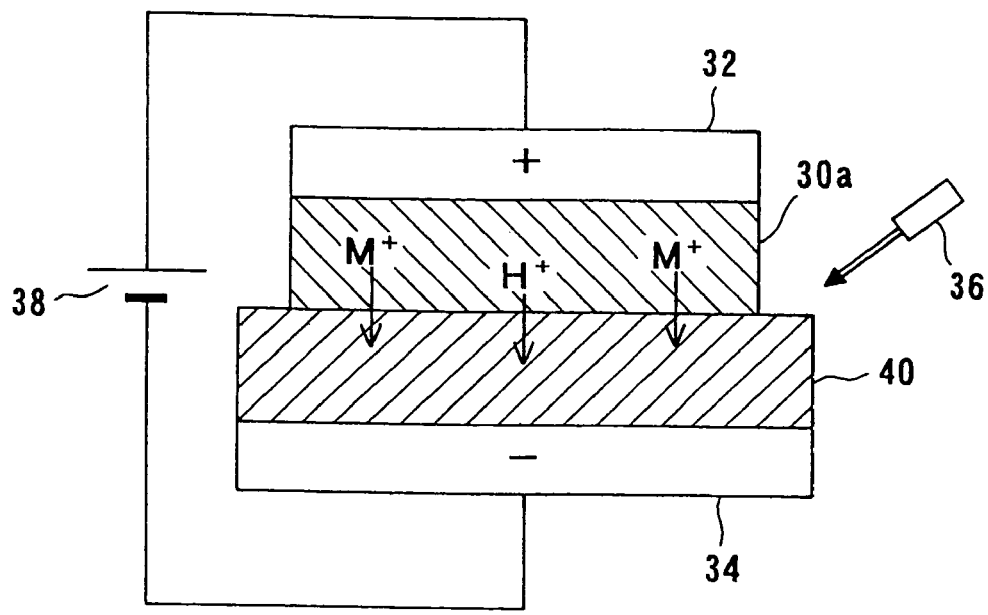
FIG. 4 is a diagram illustrating the principle of regeneration of an ion exchanger as carried out by disposing the ion exchanger (anion exchanger) to be regenerated and an ion exchanger for regeneration between a pair of electrodes according to the present invention.
Figure 5:
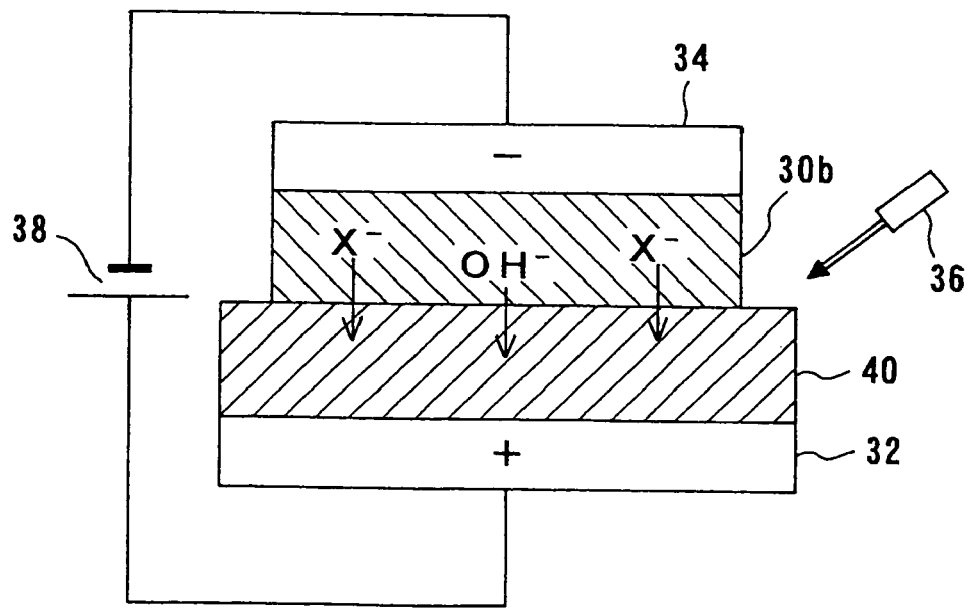
FIG. 5 is a diagram illustrating the principle of regeneration of an ion exchanger as carried out by disposing the ion exchanger (cation exchanger) to be regenerated and an ion exchanger for regeneration between a pair of electrodes according to the present invention.
Figure 6:
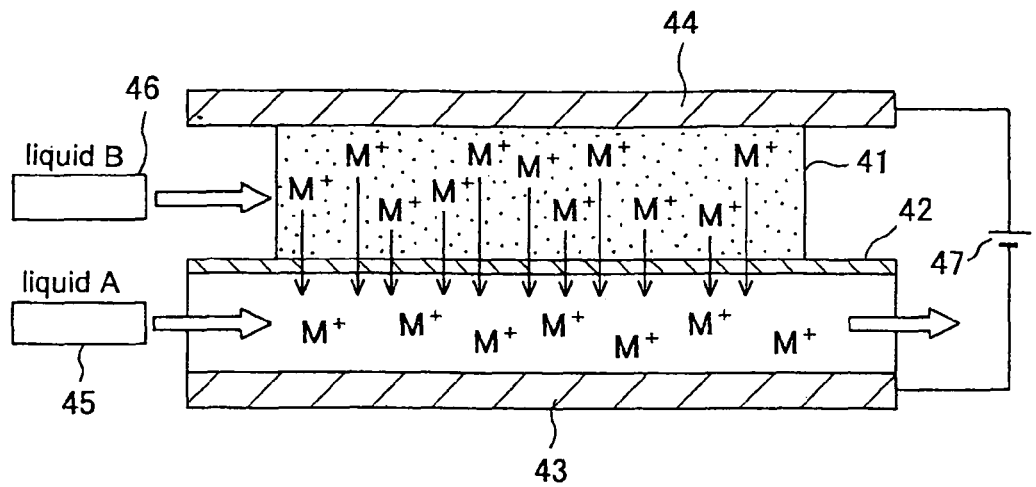
FIG. 6 is a diagram illustrating the principle of regeneration of a cation exchanger as carried out according to the present invention.
Figure 7:
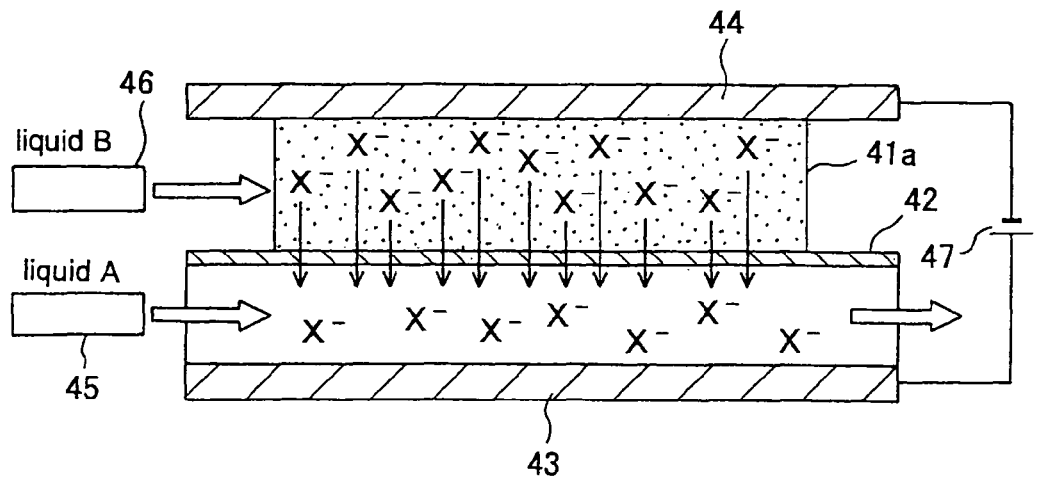
FIG. 7 is a diagram illustrating the principle of regeneration of an anion exchanger as carried out according to the present invention.

Next, via a control box 84, a given voltage is applied from the power source 86 between the processing electrodes 54 and the feeding electrodes 56, while the substrate holder 52 is rotated and the electrode section 60 is made scroll movement. Specifically, the ion exchanger 58 and the electrode section 60 are contacted or got close to each other, and are moved relatively. The electrode section 60 may be rotated instead of making a scroll movement. Furthermore, one of the ion exchanger 58 and the electrode section 60 may be moved. At the same time, pure water or ultrapure water is supplied, through the through-hole 60a, from beneath the electrode section 60 to the upper surface thereof, thereby filling pure water or ultrapure water into the space between the processing electrode 54, feeding electrode 56 and the substrate W. Thereby, electrolytic processing of the copper film 6, as shown in FIG. 1B, for example, formed on the substrate W is effected by the electrolytic reaction and the movement of ions produced in the ion exchanger. More specifically, by allowing pure water or ultrapure water to flow within the ion exchanger 58, the electrolytic processing efficiency can be enhanced.

After completion of the electrolytic processing, via the control box 84, the power source 84 is disconnected from the processing electrode 54 and feeding electrode 56, the rotation of the substrate holder 52 and the scroll movement of the electrode section 60 are stopped. Thereafter, the substrate holder 52 is raised, the pivot arm 50 is pivoted, and processed substrate W is transferred to next process.

This embodiment shows the case of supplying pure water, preferably ultrapure water, to the space between the electrode section 60 and the substrate W. The use of pure water or ultrapure water containing no electrolyte upon electrolytic processing can prevent extra impurities such as an electrolyte from adhering to and remaining on the surface of the substrate W. Further, copper ions or the like dissolved during electrolytic processing are immediately caught by the ion exchanger 58 through the ion-exchange reaction. This can prevent the dissolved copper ions or the like from re-precipitating on the other portions of the substrate W, or from being oxidized to become fine particles which contaminate the surface of the substrate W.

Ultrapure water has a high resistivity, and therefore an electric current is hard to flow therethrough. A lowering of the electric resistance is made by shortening a distance between the electrode and workpiece or interposing the ion exchanger between the electrode and workpiece. Further, an electrolytic solution, when used in combination with electrolytic solutions, can further lower the electric resistance and reduce the power consumption. When electrolytic processing is conducted by using an electrolytic solution, the portion of a workpiece that undergoes processing ranges over a slightly wider area than the area of the processing electrode. In the case of the combined use of ultrapure water and the ion exchanger, on the other hand, since almost no electric current flows through ultrapure water, electric processing is effected only within the area of a workpiece that is equal to the area of the processing electrode and the ion exchanger.

It is possible to use, instead of pure water or ultrapure water, an electrolytic solution obtained by adding an electrolyte to pure water or ultrapure water. The use of such an electrolytic solution can further lower the electric resistance and reduce the power consumption. A solution of a neutral salt such as NaCl or $Na_2SO_4$, a solution of an acid such as HCl or $H_2SO_4$, or a solution of an alkali such as ammonia, may be used as the electrolytic solution, and these solutions may be selectively used according to the properties of the workpiece. When the electrolytic solution is used, it is preferred to provide a slight interspace between the substrate W and the ion exchanger 58 so that they are not in contact with each other. Further, it is also possible to use, instead of pure water or ultrapure water, a liquid obtained by adding a surfactant or the like to pure water or ultrapure water, and having an electric conductivity of not more than 500 μS/cm, preferably not more than 50 μS/cm, more preferably not more than 0.1 μS/cm (resistivity of not less than 10 MΩ·cm). Due to the presence of a surfactant in pure water or ultrapure water, the liquid can form a layer, which functions to inhibit ion migration evenly, at the interface between the substrate W and the ion exchanger 58, thereby moderating concentration of ion exchange (metal dissolution) to enhance the flatness of the processed surface. The surfactant concentration is desirably not more than 100 ppm. When the value of the electric conductivity is too high, the current efficiency is lowered and the processing rate is decreased. The use of the liquid having an electric conductivity of not more than 500 μS/cm, preferably not more than 50 μS/cm, and more preferably not more than 0.1 μS/cm, can attain a desired processing rate.

If a voltage is raised to increase the current density in order to enhance the processing rate, an electric discharge can occur when the electric resistance between the electrode and the substrate (workpiece to be processed) is large. The occurrence of electric discharge causes pitching on the surface of the workpiece, thus failing to form an even and flat processed surface. To the contrary, since the electric resistance is very small when the ion exchanger 58 is in contact with the substrate W, the occurrence of an electric discharge can be avoided.

Next, at a desired time, for example, after an elapse of a predetermined time or after having processed a predetermined member of substrates, the ion exchanger 58, which has been used in the electrolytic processing, is subjected to a regeneration treatment. The regeneration treatment will now be described with reference to FIGS. 12 and 13.

First, the substrate holder 52 is retreated from above the electrode section 60, and then the pivot arm 62 is pivoted to move the regeneration section 64 to above the electrode section 60, so that the lower surface of the ion exchanger 98 for regeneration of the regeneration section 64 is brought close to or into contact with the upper surface of the ion exchanger 58 to be regenerated, mounted on the upper surface of the electrode section 60.

By means of the control box 84, one of the electrodes (e.g. cathode) of the power source 86 is connected to the regeneration electrode 96 and the other electrode (e.g. anode) is connected to the electrode plates 82 consisting of the processing electrodes 54 and the feeding electrodes 56, thereby applying a voltage between the regeneration electrode 96 and the electrode plates 82, while the electrode section 60 is allowed to make a scroll movement. At the same time, pure water or ultrapure water is supplied from below the electrode section 60 through the through-hole 60a to the upper surface of the electrode section 60 so as to fill the area between the regeneration electrode 96 and the electrode plates 82 with pure water or ultrapure water, thereby immersing the ion exchanger 58 to be regenerated and the ion exchanger 98 for regeneration in pure water or ultrapure water.

Upon the electrical connection, as described above, such control is made by means of the control box 84 that the electrode on the ion exchanger 98 side, i.e. the regeneration electrode 96, should have the opposite polarity to the polarity of the ion exchangers 58, 98. Thus, when cation exchangers are used as the ion exchangers 58, 98, the regeneration electrode 96 should become a cathode and the electrode plates 82 should become an anode. Conversely, when anion exchangers are used as the ion exchangers 58, 98, the regeneration electrode 96 should become an anode and the electrode plates 82 should become a cathode.

By the above operation, through an ion-exchange reaction utilizing the ion exchangers 58, 98 as a solid electrolyte, ions in the ion exchanger 58 to be regenerated are moved into the ion exchanger 98 for regeneration. Regeneration of the ion exchanger 58 is thus effected. When cation exchangers are used as the ion exchangers 58, 98, cations taken in the ion exchanger 58 to be regenerated move into the ion exchanger 98 for regeneration; when anion exchangers are used as the ion exchangers 58, 98, anions taken in the ion exchanger 58 to be regenerated move into the ion exchanger 98 for regeneration, whereby the ion exchanger 58 is regenerated.

As described above, instead of pure water or ultrapure water, it is also possible to use a liquid having an electric conductivity of not more than 500 μS/cm or an electrolytic solution.

After completion of the regeneration, electrical connections between the power source 86 and the electrodes plates 82 and between the power source 86 and the regeneration electrode 96 are shut off by means of the control box 84, and the scroll movement of the electrode section 60 is stopped. Thereafter, the pivot arm 62 is pivoted to return the regeneration section 64 to the original position.

Figure 14:
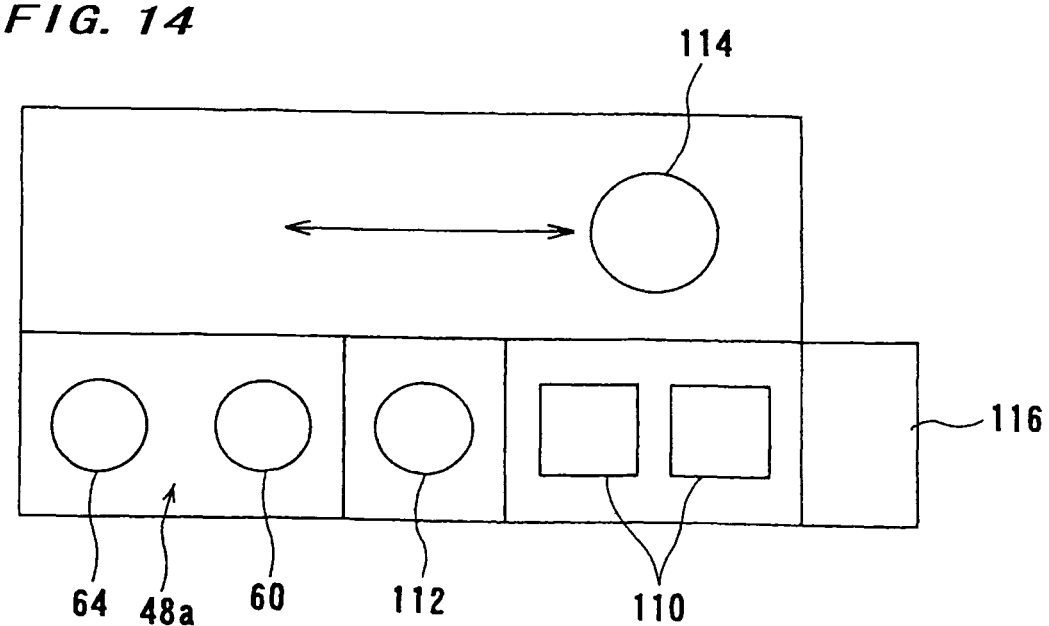
FIG. 14 is a diagram showing the layout of a substrate processing apparatus provided with the electrolytic processing apparatus shown in FIGS. 10 through 13.

FIG. 14 shows a substrate processing apparatus provided with the electrolytic processing apparatus 48a described above. As shown in FIG. 14, the substrate processing apparatus comprises a pair of loading/unloading units 110 as a carry-in and carry-out section for carrying in and carrying out a cassette housing a substrate W, e.g. a substrate W as shown in FIG. 1B, which has in its surface a copper film 6 as a conductor film (portion to be processed), a reversing machine 112 for reversing the substrate W, and an electrolytic processing apparatus 48a, which are disposed in series. A transfer robot 114 as a transfer device is provided which can move parallel to these apparatuses for transporting and transferring the substrate W therebetween. The substrate processing apparatus is also provided with a monitor 116, for monitoring a voltage applied between processing electrodes 54 and feeding electrodes 56 upon electrolytic processing in the electrolytic processing apparatus 48a, or an electric current flowing therebetween. The monitor can monitor at least one of an electrolysis current and electrolysis time, and/or the quantity of electricity, when the voltage is applied between the electrodes plates 82, consisting of the processing electrodes 54 and feeding electrodes 56, and the regeneration electrode 96 upon regeneration treatment.

Next, substrate processing (electrolytic processing) by the substrate processing apparatus will be described. First, a substrate W, e.g. a substrate which has in its surface a copper film 6 (see FIG. 1B) as a conductor film (portion to be processed), is taken by the transfer robot 114 out of the cassette housing substrates and set in the loading/unloading unit 110. If necessary, the substrate W is transferred to the reversing machine 112 to reverse the substrate W. The substrate W is then attracted and held by the substrate holder 52 of the electrolytic processing apparatus 48a. Then, the electrolytic processing of the substrate W can be conducted as the same manner described above.

At this time, the monitor 116 monitors the voltage applied between the processing electrodes 54 and the feeding electrodes 56 or the electric current flowing therebetween to detect the end point (terminal of processing). It is noted in this connection that in electrolytic processing an electric current (applied voltage) varies, depending upon the material to be processed, even with the same voltage (electric current). Therefore, the endpoint can surely be detected by the monitoring of changes in electric current or in voltage.

After completion of the electrolytic processing, the substrate holder 52 is raised, and substrate W is carried to the transfer robot 114 by pivoting the pivot arm 50. The transfer robot 114 takes the substrate W from the substrate holder 52 and, if necessary, transfers the substrate W to the reversing machine 112 for reversing it, and then returns the substrate W to the cassette in the loading/unloading unit 110.

When carrying out regeneration of the ion exchanger 58 in the above-described manner, at least one of the electrolysis current and time, and/or the quantity of electricity, as observed when a voltage is applied between the electrode plates 82, consisting of the processing electrodes 54 and the feeding electrodes 56, and the regeneration electrode 96, is monitored by the monitor 116. The regeneration amount of an ion exchanger is governed by the product of the electrolysis current and the electrolysis time, i.e. the quantity of electricity. Accordingly, by monitoring at least one of the electrolysis current and time, and/or the quantity of electricity by the monitor 116, it becomes possible to control the regeneration amount and detect the end point of regeneration.

Figure 15:
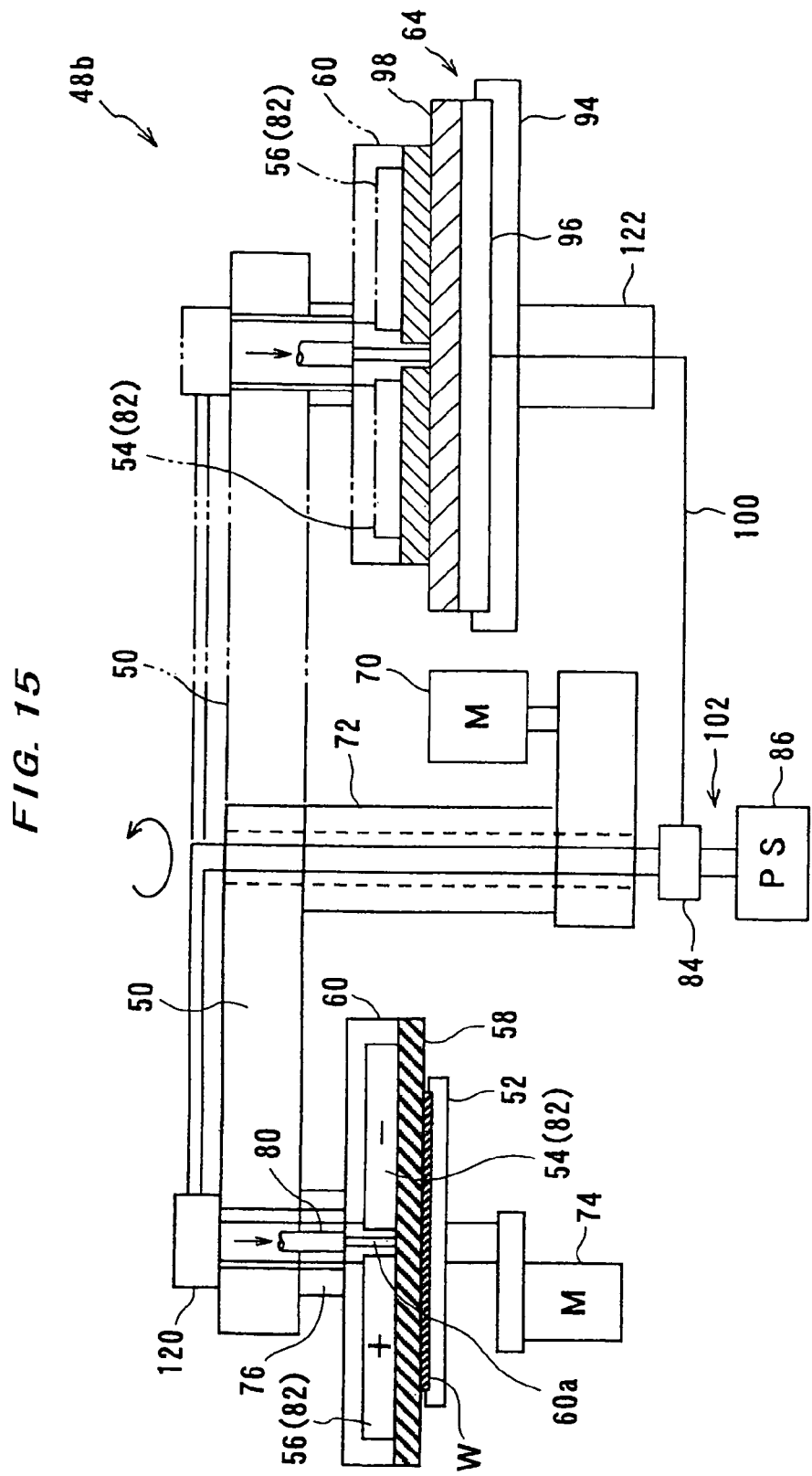
FIG. 15 is a cross-sectional view of an electrolytic processing apparatus provided with an ion exchanger regeneration device according to another embodiment of the present invention, in which the solid lines show the apparatus upon electrolytic processing and the imaginary lines show the apparatus upon regeneration.
Figure 16:
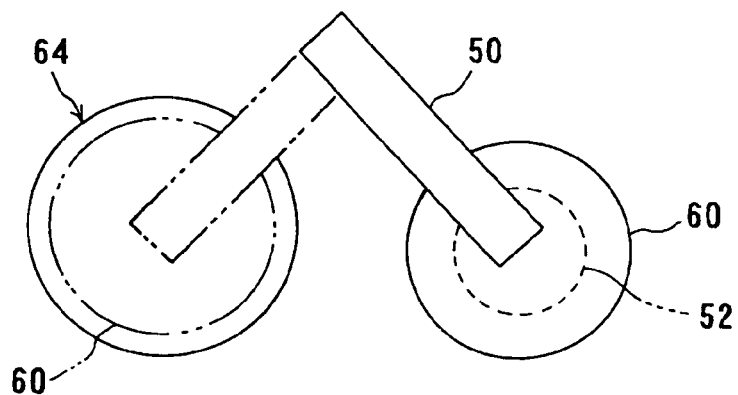
FIG. 16 is a plan view of FIG. 15.

FIGS. 15 and 16 show an electrolytic processing apparatus 48b having a regeneration device of an ion exchanger according to another embodiment of the present invention. In this electrolytic processing apparatus 48b, the positional relationship between the substrate holder 52 and the electrode section 60 in the preceding embodiments is reversed, and the substrate W is held with its surface facing upward (so-called "face-up" manner) so that electrolytic processing is conducted to the upper surface of the substrate. Thus, the substrate holder 52 is disposed beneath the electrode section 60, holds the substrate W with its surface facing upward, and rotates about its own axis by the actuation of the motor 74 for rotation. On the other hand, the electrode section 60, which has the processing electrodes 54 and the feeding electrodes 56 that are covered with the ion exchanger 58, is disposed above the substrate holder 52, is held with its front surface downward by the pivot arm 50 at the free end thereof, and rotates about its own axis by the actuation of the hollow motor 76. Further, wires extending from the power source 86 pass through a hollow portion formed in the pivot shaft 72 and reach the slip ring 120, and further pass through the hollow portion of the hollow motor 76 and reach the processing electrodes 54 and the feeding electrodes 56 to apply a voltage therebetween. According to this embodiment, the ion exchanger 58 is designed to have a diameter which is larger than that of the substrate W, but the ion exchanger which has a diameter smaller than the substrate W may be used.

Pure water or ultrapure water is supplied from the pure water supply pipe 80, via the through-hole 60a formed in the central portion of the electrode section 60, to the front surface (upper surface) of the substrate W from upper side of the substrate W.

As shown by solid lines in FIG. 15, in operation, the electrode section 60 is lowered so that the substrate W held by the substrate holder 52 contacts or gets close to the surface of the ion exchanger 58 mounted on the upper surface of the electrode section 60. Next, a given voltage is applied between the processing electrodes 54 and the feeding electrodes 56, while applying pure water or ultrapure water to the upper surface of the substrate W. At the same time, the substrate holder 52 and the electrode section 60 are rotated, and the electrode section 60 is pivoted. Thereby, electrolytic processing of the surface of the substrate is effected.

Further, the regeneration section 64 for regenerating the ion exchanger 58 mounted on the electrode section 60 is provided by the side of the substrate holder 52. The regeneration section 64 includes the regeneration electrode holder 94 joined to the upper end of a support post 122, the regeneration electrode 96 held by the regeneration electrode holder 94, and the ion exchanger 98 for regeneration, covering the surface (upper surface) of the regeneration electrode 96. As shown by the imaginary lines in FIG. 15, the electrode section 60 is moved to right above the regeneration section 64 by pivoting the pivot arm 50, and is then lowered so as to bring the ion exchanger 58 to be regenerated, mounted on the electrode section 60, close to or into contact with the ion exchanger 98 for regeneration of the regeneration section 64. While rotating and, if necessary, pivoting the electrode section 60, a given voltage is applied from the regeneration power source 102 to between the electrode plates 82, consisting of the processing electrodes 54 and the feeding electrodes 56, and the regeneration electrode 96, thereby regenerating the ion exchanger 58. The ion exchanger 58 after the regeneration is rinsed e.g. with ultrapure water.

Figure 17:
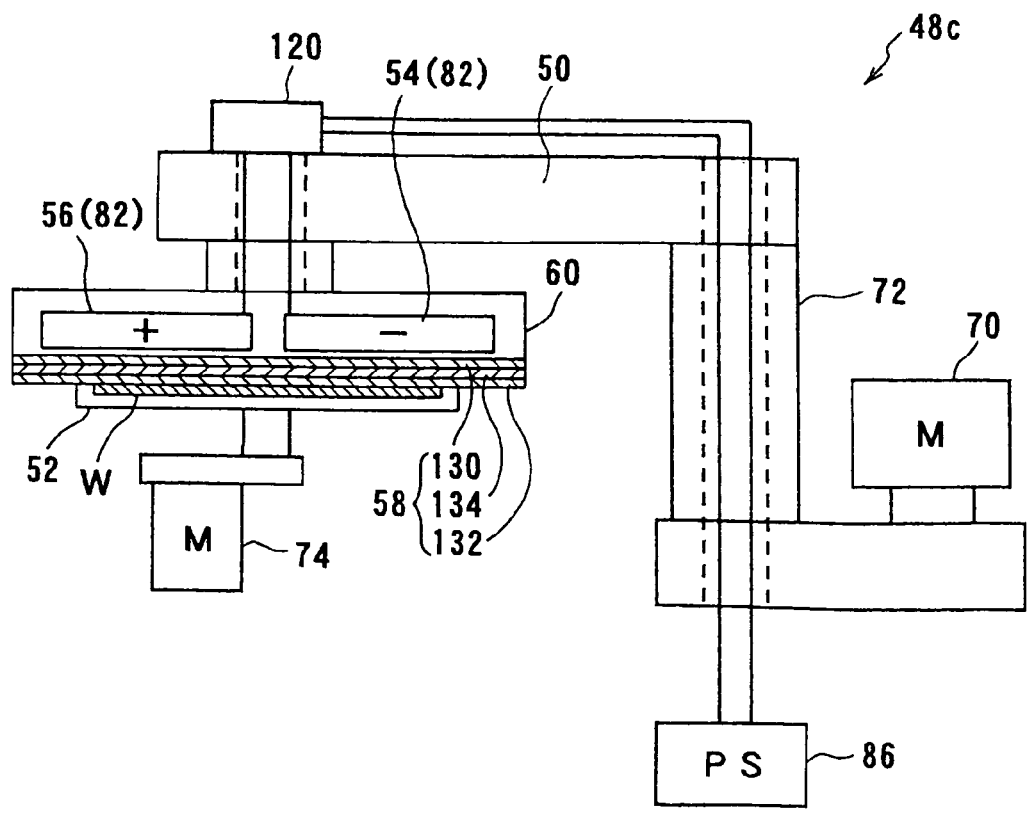
FIG. 17 is a cross-sectional view of the main part of an electrolytic processing apparatus provided with an ion exchanger regeneration device according to still another embodiment of the present invention.

FIG. 17 shows an electrolytic processing apparatus 48c having a regeneration device of an ion exchanger according to still another embodiment of the present invention. The electrolytic processing apparatus 48c differs from the electrolytic processing apparatus 48b shown in FIGS. 15 and 16 in that the ion exchanger 58 is of a three-layer structure (lamination) consisting of a pair of strongly acidic cation-exchange fibers 130, 132 and a strongly acidic cation-exchange membrane 134 interposed between the fibers 130, 132, for example. The other construction is the same as shown in FIGS. 15 and 16. The ion exchanger 58 may consist of any ion exchanger materials. Furthermore, the number of the laminated layers is not limited to three.

By making the ion exchanger 58 a multi-layer structure consisting of laminated layers of ion-exchange materials, such as a nonwoven fabric, a woven fabric and a porous membrane, it is possible to increase the total ion exchange capacity of the ion exchanger 58, whereby formation of an oxide, for example in removal (polishing) processing of copper, can be restrained to thereby avoid the oxide adversely affecting the processing rate. Without using a multi-layer structure, an ion exchange capacity may be increased by using a thick ion exchanger of single layer. In this regard, when the total ion exchange capacity of an ion exchanger is smaller than the amount of copper ions taken in the ion exchanger during removal processing, the oxide should inevitably be formed on the surface or in the inside of the ion exchanger, which adversely affects the processing rate. Thus, the formation of the oxide is governed by the ion exchange capacity of an ion exchanger, and copper ions exceeding the capacity should become the oxide. The formation of an oxide can thus be effectively restrained by using, as the ion exchanger, a multi-layer ion exchanger composed of laminated layers of ion-exchange materials which has enhanced total ion exchange capacity. The formation of an oxide can be restrained by regenerating the ion exchanger to suppress the accumulation of the copper ions or the like inside the ion exchanger.

According to this embodiment, as with the embodiment shown in FIGS. 14 and 15, the ion exchanger 58 of a multi-layer structure is regenerated in the regeneration section 64 at a desired time. By the regeneration, the plurality of ion-exchange materials constituting the ion exchanger 58, such as the strongly acidic cation-exchange fibers 130, 132 and the strongly acidic cation-exchange membrane 134 or the like, can be regenerated simultaneously.

This embodiment employs a laminate of a plurality of ion-exchange materials as the ion exchanger to be regenerated. It is also possible to use a laminate of a plurality of ion-exchange materials as the ion exchanger for regeneration. When the ion exchanger for regeneration is configured by a lamination of plurality of ion-exchange materials, the substantial ion-exchanger capacity of the ion exchanger for regeneration is increased, and more ion exchanger (ion exchanger to be regenerated) can be regenerated continuously.

According to the above-described embodiments, the liquid supply section for supplying a liquid between the substrate and the ion exchanger upon the electrolytic processing is utilized also as the liquid supply section for supplying a liquid between the pair of electrodes to immerse the ion exchanger to be regenerated and the ion exchanger for regeneration in the liquid. It is, however, possible to provide two independent liquid supply sections.

Further according to the above embodiments, the regeneration section is provided with the ion exchanger for regeneration so that ions in the ion exchanger to be regenerated can move into the ion exchanger for regeneration during the regeneration treatment. This can prevent the ions, moving from the ion exchanger to be regenerated, from attaching to the electrode, thus preventing a solid matter adhering to the electrode from contaminating the regenerated ion exchanger. The ion exchanger for regeneration may however be omitted.

Figure 18:
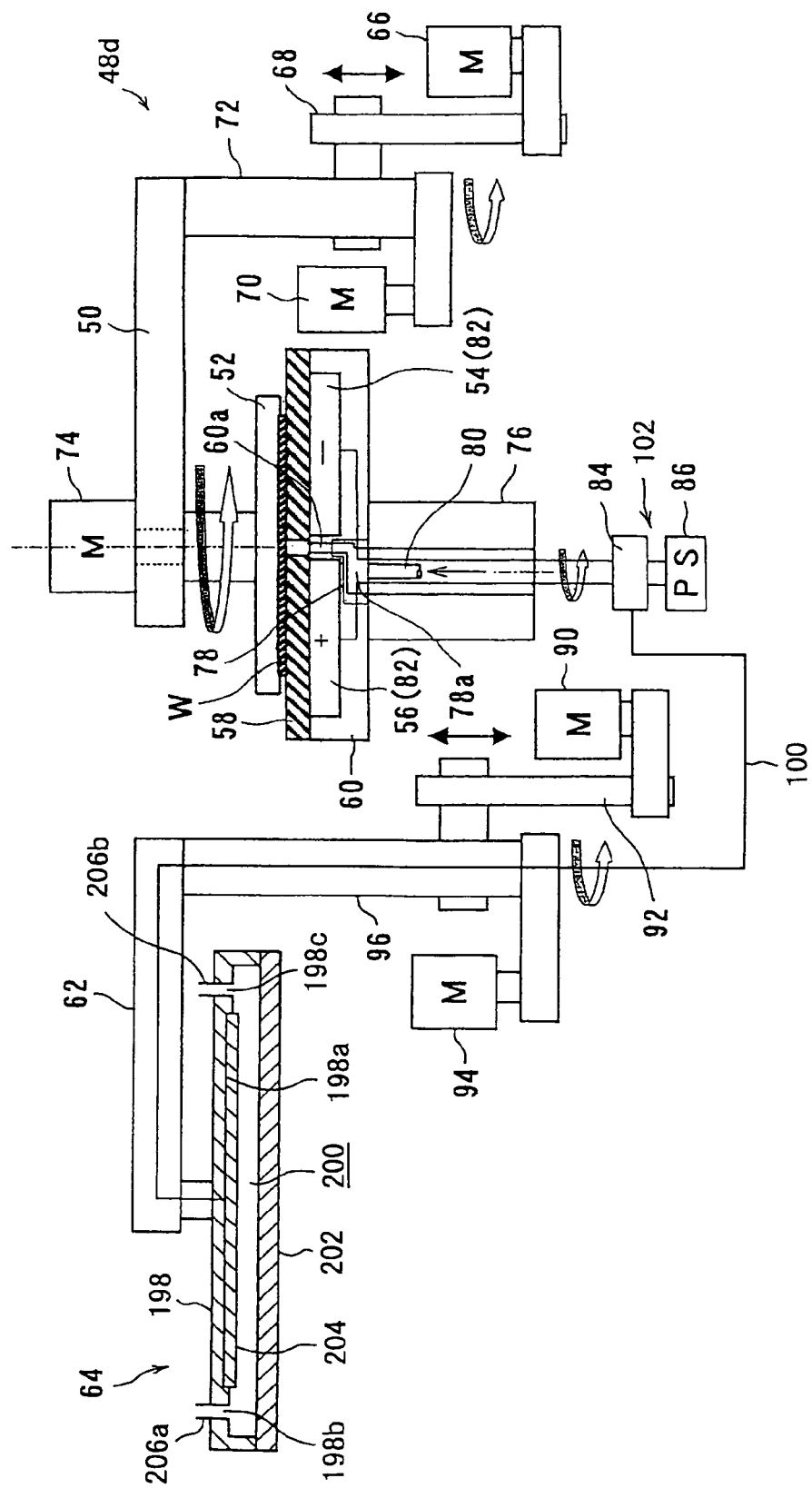
FIG. 18 is a cross-sectional view of an electrolytic processing apparatus provided with an ion exchanger regeneration device according to still another embodiment of the present invention, showing the state of the apparatus upon electrolytic processing.
Figure 19:
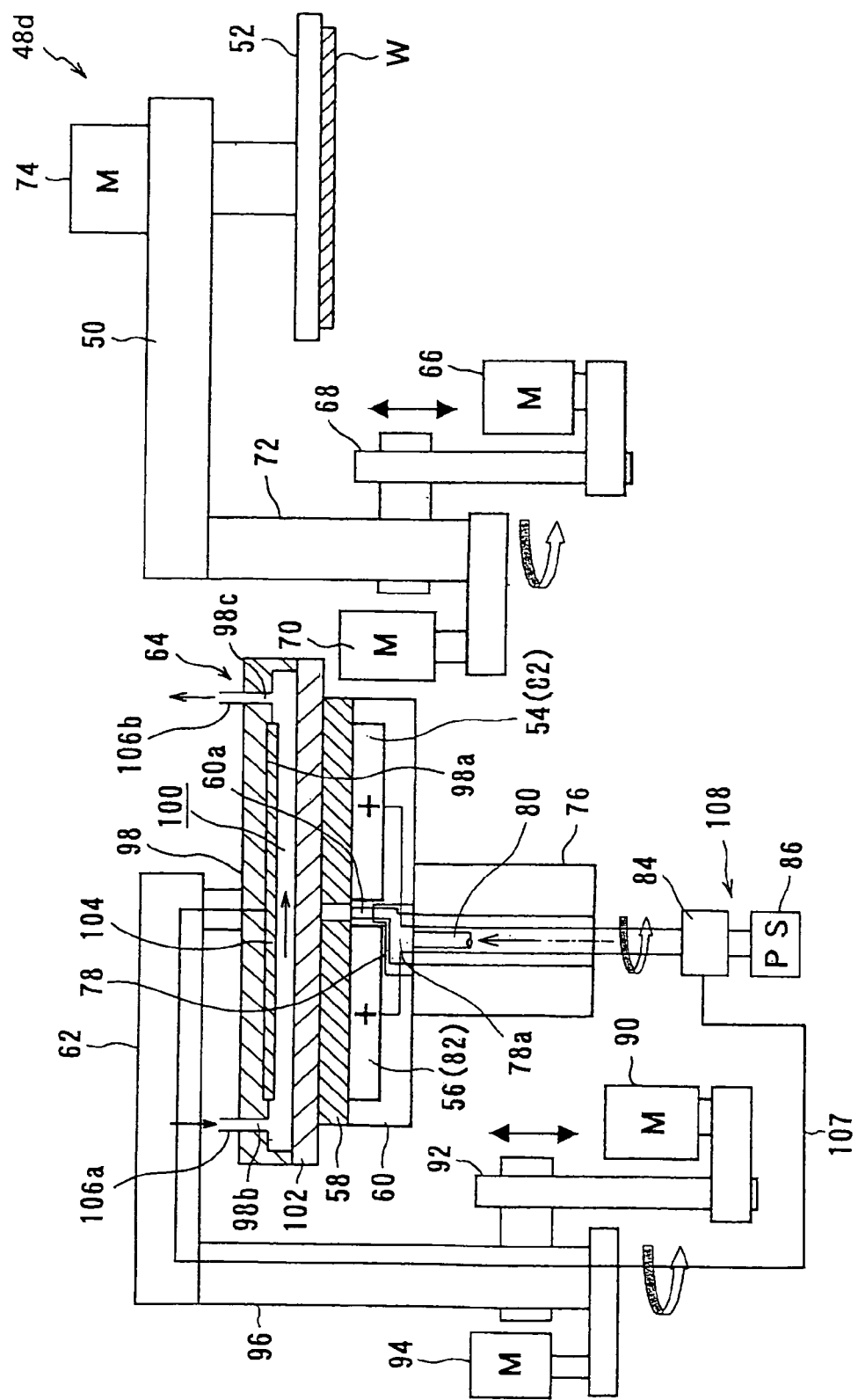
FIG. 19 is a cross-sectional view of an electrolytic processing apparatus provided with an ion exchanger regeneration device according to still another embodiment of the present invention, showing the state of the apparatus upon regeneration of an ion exchanger.

FIGS. 18 and 19 show an electrolytic processing apparatus 48d having an ion exchanger regeneration device according to still another embodiment of the present invention. The electrolytic processing apparatus 48d differs from the above-described embodiment shown in FIGS. 10 through 13 in the use of the below-described regeneration section as the regeneration section 64, mounted to the free end of the pivot arm 62 which is coupled to the upper end of the pivot shaft 96 that rotates by the actuation of the pivoting motor 94, for regenerating the ion exchanger 58. The other construction is the same as the embodiment shown in FIGS. 10 through 13.

The regeneration section 64 includes a disc-shaped regeneration electrode holder 198. The regeneration electrode holder 198 has a downwardly-open circular depression 198a. The opening of the depression 198a is closed with a partition 202, whereby a discharge portion 200, defined by the depression 198a and the partition 202, is formed. A disc-shaped regeneration electrode 204 is mounted in the bottom of the depression 198a. Further, a liquid inlet 198b and a liquid outlet 198c, communicating with peripheral portions of the discharge portion 200, are respectively provided at the both end portions in the diametrical direction of the regeneration electrode holder 198. The liquid inlet 198b and the liquid outlet 198c are respectively connected to a liquid inlet pipe 206a and to a liquid outlet pipe 206b. A liquid is supplied from the liquid inlet pipe 206 into the discharge portion 200. The liquid supplied fills the discharge portion 200, so that the regeneration electrode 204 is immersed in the liquid. Thereafter, the liquid supplied into the discharge portion 200 flows in one in direction in the discharge portion 200 and is discharged sequentially from the liquid outlet pipe 206b.

As described below, it is desired that the partition 202 not hinder the migration therethrough of impurity ions removed from the ion exchanger 58 to be regenerated and inhibit permeation therethrough of the liquid (including ions in the liquid) flowing between the partition 202 and the regeneration electrode 204 into the ion exchanger 58 side. In this regard, ion exchangers permit selective permeation therethrough of cations or anions. A suitable ion exchanger as a partition can be selected. Further, a film-type ion exchanger as a partition can prevent intrusion of the liquid flowing between the partition 202 and the regeneration electrode 204 into the to-be-regenerated ion exchanger 58 side. Thus, a suitably selected film-type ion exchanger can meet the above requirements for the partition 202.

It is desired that the liquid to be supplied into the discharge portion 200 be a liquid, such as an electrolytic solution, which has a high electric conductivity and does not form a hardly soluble or insoluble compound through a reaction with ions removed from the ion exchanger to be processed. Thus, as described below, the liquid is for discharging those ions, which have moved from the ion exchanger 58 to be regenerated and passed through the partition 202, out of the system by the flow of the liquid. The above liquid having a high conductivity, because of its low electric resistance, can reduce the power consumption in the regeneration section. Further the above liquid, which does not form an insoluble compound (by-product) through a reaction with the impurity ions, can prevent adhesion of a solid matter to the partition 202. A suitable liquid may be chosen depending upon the kind of the impurity ion to be discharged. For example, when regenerating an ion exchanger that was used in electrolytic polishing of copper, sulfuric acid with a concentration of 1 wt % or higher may be used.

The regeneration electrode 204 is to be electrically connected by the wire 100 to one of the electrodes (e.g. cathode) of the power source 86 by means of control box 84, while the electrode plates 82, consisting of the processing electrodes 54 and the feeding electrodes 56, are to be electrically connected to the other electrode (e.g. anode) of the power source 86. A regeneration power source 102 is thus constructed.

According to this embodiment, the ion exchanger used as the partition 202 has the same type of ion-exchange group as the ion exchanger 58 to be regenerated mounted in the electrode section 60. That is, when a cation exchanger having a cation-exchange group is used as the ion exchanger 58, a cation exchanger is used also as the partition (ion exchanger) 202. When an anion exchanger having an anion-exchange group is used as the ion exchanger 58, an anion exchanger is used also as the partition (ion exchanger) 202.

Further, when connecting, by means of the control box 84, the regeneration electrode 204 to one of the electrodes of the power source 86 by the wire 100 and, at the same time, connecting the electrode plates 82, consisting of the processing electrodes 54 and the feeding electrodes 56, to the other electrode of the power source 86, as described above, such control is made that when a cation exchanger is used as the ion exchanger 58 to be regenerated, the regeneration electrode 204 should become a cathode, and when an anion exchanger is used as the exchanger 58, the regeneration electrode 204 should become an anode.

Regeneration treatment as performed by the electrolytic processing apparatus will now be described with reference to FIG. 19.

First, the substrate holder 52 is retreated from above the electrode section 60, and then the pivot arm 62 is pivoted to move the regeneration section 64 to above the electrode section 60. The regeneration section 64 is then lowered so that the lower surface of the partition 202 of the regeneration section 64 is brought close to or into contact with the upper surface of the ion exchanger 58 to be regenerated, mounted in the upper surface of the electrode section 60.

By means of the control box 84, one of the electrodes (e.g. cathode) of the power source 86 is connected to the regeneration electrode 204 and the other electrode (e.g. anode) is connected to the electrode plates 82 consisting of the processing electrodes 54 and the feeding electrodes 56, thereby applying a voltage between the regeneration electrode 204 and the electrode plates 82, while the electrode section 60 is allowed to make a scroll movement. The feeding electrodes may not be in electrical connection upon regeneration. At the same time, pure water or ultrapure water is supplied from below the electrode section 60 through the through-hole 60*a* to the upper surface of the electrode section 60 so as to fill the area between the partition 202 and the electrode plates 82 with pure water or ultrapure water, thereby immersing the ion exchanger 58 to be regenerated in pure water or ultrapure water, while a liquid is supplied into the discharge portion 200 provided inside the regeneration electrode holder 98 so as to fill the discharge portion 200 with the liquid, thereby immersing the regeneration electrode 204 in the liquid and allowing the liquid to flow in one direction in the discharge portion 200 and to be discharged from the liquid outlet 198*c*.

Upon the electrical connection, as described above, such control is made by means of the control box 84 that the regeneration electrode 204 should have the opposite polarity to the polarity of the ion exchanger 58 (and of the partition 202). Thus, when a cation exchanger is used as the ion exchanger 58 (and as the partition 202), the regeneration electrode 204 should become a cathode and the electrode plates 82 should become an anode. Conversely, when an anion exchanger is used as the ion exchanger 58 (and as the partition 202), the regeneration electrode 204 should become an anode and the electrode plates 82 a cathode.

By the above operation, ions in the ion exchanger 58 to be regenerated are moved toward the regeneration electrode 204, passed through the partition 202, and introduced into the discharge portion 200. The ions thus moved into the discharge portion 200 are discharged out of the system by the flow of the liquid supplied into the discharge portion 200. Regeneration of the ion exchanger 58 is thus effected. When a cation exchanger is used as the ion exchanger 58, cations taken in the ion exchanger 58 to be regenerated pass through the partition 202 and move into the discharge portion 200; when an anion exchanger is used, anions taken in the ion exchanger 58 to be regenerated pass through the partition 202 and move into the discharge portion 200, whereby the ion exchanger 58 is regenerated.

In the above regeneration treatment, as descried above, an ion exchanger having the same type of ion-exchange group as the ion exchanger 58 to be regenerated is used as the partition 202. This prevents migration of impurity ions in the ion exchanger 58 through the partition (ion exchanger) 202 from being hindered by the partition 202, thereby preventing an increase in the power consumption. Further, this inhibits permeation through the partition 202 of the liquid (including ions in the liquid) flowing between the partition 202 and the regeneration electrode 204, thus inhibiting movement of the liquid to the ion exchanger 58 side and preventing re-contamination of the regenerated ion exchanger 58. Furthermore, preferably used as the liquid to be supplied between the partition 202 and the regeneration electrode 204 is a liquid having an electric conductivity of not less than 50 μS/cm which does not form a hardly soluble or insoluble compound through a reaction with ions removed from the ion exchanger 58. Such a liquid, because of its low electric resistance, can reduce the power consumption in the regeneration section. Moreover the liquid does not form an insoluble compound (by-product) through a reaction with an impurity ion. In this regard, an insoluble compound, if formed, will adhere to the partition 202 whereby the electric resistance between the regeneration electrode 204 and the electrode plates 82 will be changed, making it difficult to control the electrolysis current. Such a problem can thus be prevented.

As with the above-described embodiments, instead of using pure water or ultrapure water, it is possible to use a liquid having an electric conductivity of not more than 500 μS/cm or an electrolytic solution.

After completion of the regeneration, electrical connections between the power source 86 and the electrodes 82 and between the power source 86 and the regeneration electrode 204 are shut off by means of the control box 84, and, after raising the regeneration section 64, the scroll movement of the electrode section 60 is stopped. Thereafter, the pivot arm 62 is pivoted to return the regeneration section 64 to the original position. According to the present invention, as described hereinabove, regeneration of an ion exchanger can be carried out easily and quickly through an electrochemical reaction. By carrying out such an ion exchanger regeneration e.g. in an electrolytic processing apparatus, the stoppage time of electrolytic processing can be shortened and the processing efficiency of the apparatus can be enhanced. Further, the present invention can minimize contamination of the regenerated ion exchanger with a chemical liquid and can also minimize a load upon cleaning of the regenerated ion exchanger.

Figure 21:
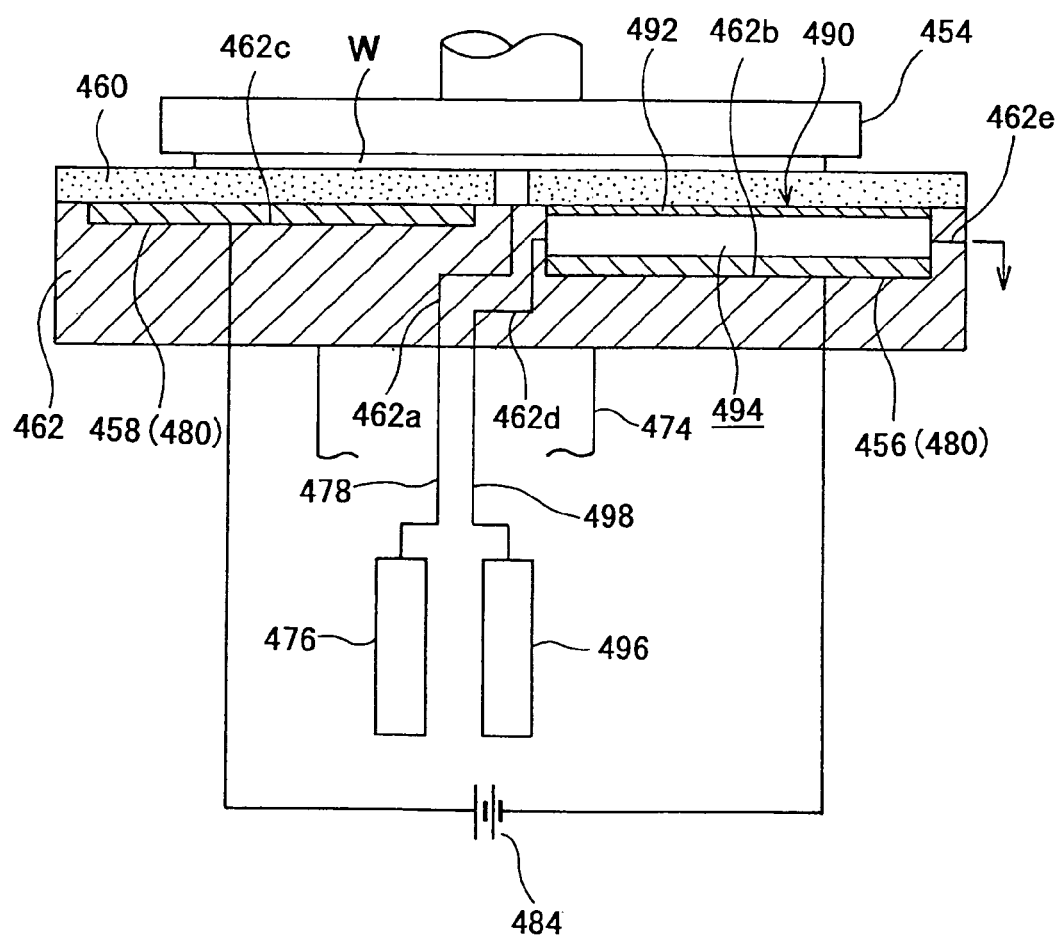
FIG. 21 is an enlarged view of the main part of the electrolytic processing apparatus shown in FIG. 20.
Figure 22:
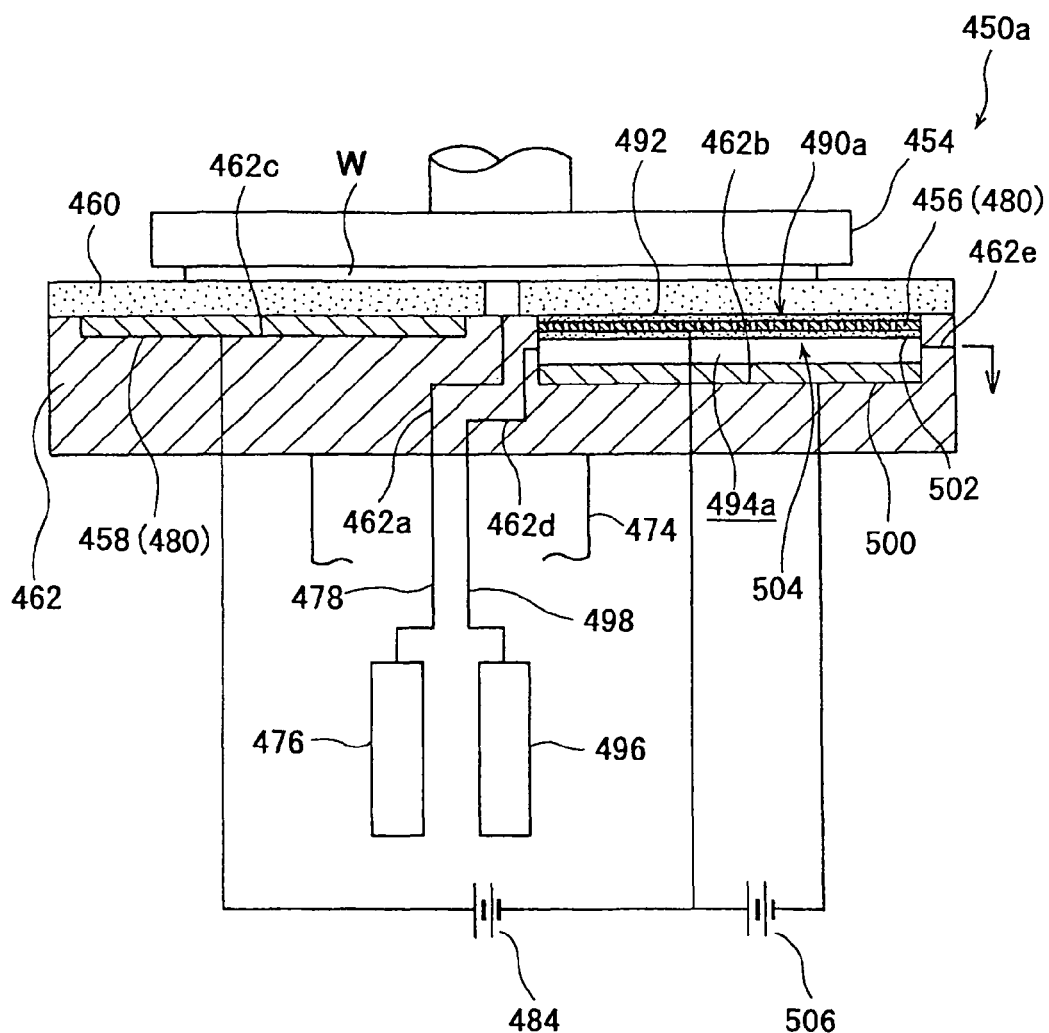
FIG. 22 is a cross-sectional view of an electrolytic processing apparatus according to still another embodiment of the present invention, showing the state of the apparatus upon electrolytic processing.

FIGS. 21 and 22 show an electrolytic processing apparatus 450 according to another embodiment of the present invention. This electrolytic processing apparatus 450 includes a substrate holder 454, supported at the free end of a pivot arm 452 that can pivot horizontally, for attracting and holding the substrate W with its front surface facing downward (so-called "face-down" manner), a disc-shaped electrode section 462, made of an insulating material, has fan-shaped processing electrodes 456 and feeding electrodes 458 embedded therein, that are disposed alternately with their surfaces (upper faces) exposed, and a film-like ion exchanger 460 mounted on the electrode section 462 so as to cover the surfaces of the processing electrodes 456 and the feeding electrodes 458.

This embodiment uses, merely as an example of the electrode section 462 having the processing electrodes 456 and the feeding electrodes 458, such one that has a diameter a little longer than that of the substrate W held by the substrate holder 454 so that the entire surface of the substrate W may undergo electrolytic processing by making a scroll movement of the electrode section 462.

The pivot arm 452, which moves up and down via a ball screw 466 by the actuation of a motor 464 for vertical movement, for pivoting the substrate holder 454 is connected to the upper end of a pivot shaft 470 that pivots by the actuation of a pivoting motor 468. The substrate holder 454 is connected to a motor 475 for rotation that is mounted on the free end of the pivot arm 452, and is allowed to rotate by the actuation of the motor 472 for rotation.

The electrode section 462 is connected directly to a hollow motor 474, and is allowed to make scroll movement (translational rotating movement) by the actuation of the hollow motor 474. A through-hole 462a is formed in the central portion of the electrode section 462. The through-hole 462a is connected to a electrolytic processing liquid supply section 478 for supplying a processing liquid for electrolytic processing such as pure water, preferably ultrapure water, and connects to an electrolytic processing liquid supply pipe 478 that extends inside the hollow motor 474. The processing liquid such as pure water or ultrapure water is supplied through the through-hole 462a to the upper surface of the electrode section 462, and spreads to the entire processing surface of the substrate W through the ion exchanger 460 having water absorbing property.

According to this embodiment, fan-shaped electrode plates 480 are disposed in the electrode section 462 along the circumference direction, and the cathode and anode of a processing power source 484 are alternately connected, via a control box 484, to the electrode plates 480. The electrode plates 480 connected to the cathode of the processing power source 484 become the processing electrodes 456 and the electrode plates 480 connected to the anode of the processing power source 484 become the feeding electrodes 458.

Further according to this embodiment, a cation exchanger is used as the ion exchanger 460, and is partly regenerated the ion exchanger (cation exchanger) 460 which covers the processing electrodes 456.

Each processing electrode 456 is embedded in a depression 462b provided in the electrode section 462, and each feeding electrode 458 is embedded in a depression 462c provided in the electrode section 462. The depression 462b for embedding the processing electrode 456 therein, which is designed to be deeper than the depression 462c for embedding the feeding electrode 458 therein, provides a regeneration section 490.

The regeneration section 490 includes a partition 492 that closes the opening of the depression 462b. By thus closing the opening of the depression 462b with the partition 492, a discharge portion 494 is formed between the processing electrode 456 and the partition 492. Further, the electrode section 462 is provided with a discharging liquid supply inlet 462d which is connected to a discharging liquid supply pipe 498 that is connected to a discharging liquid supply section 496 for supplying a discharging liquid for discharging contaminants and extends in the hollow portion of the hollow motor 474, and which extends horizontally and opens to the discharge portion 492; and a discharging liquid discharge outlet 462e which extends horizontally from the outer periphery of the discharge portion 494 and opens at the outer circumferential surface of the electrode section 462. A discharging liquid is supplied through the discharging liquid supply inlet 462d into the discharge portion 494. The discharging liquid thus supplied into the discharge portion 494 fills the discharge portion 494, so that the processing electrode 456 is immersed in the discharging liquid. Thereafter, the discharging liquid supplied into the discharge portion 494 flows in one direction in the discharge portion 494 and is discharged sequentially from the discharging liquid discharge outlet 462e.

As described below, it is desired that the partition 492 does not hinder the migration therethrough of impurity ions removed from the ion exchanger 460 to be regenerated and inhibit permeation therethrough of the discharging liquid (including ions in the liquid) flowing between the partition 492 and the processing electrode 456 into the ion exchanger 460 side. In this regard, ion exchangers permit selective permeation therethrough of cations or anions. A suitable ion exchanger as a partition can be selected. Further, a film-type ion exchanger as a partition can prevent intrusion of the discharging liquid flowing between the partition 492 and the processing electrode 456 into the ion exchanger 460 side. Thus, a suitably selected film-type ion exchanger can meet the above requirements for the partition 492.

As described above, it is desired that the discharging liquid to be supplied into the discharging portion 494 be a liquid which has a high electric conductivity, e.g. not less than 50 µS/cm, and which does not form a hardly soluble or insoluble compound through a reaction with ions removed from the ion exchanger 460.

According to this embodiment, an ion exchanger having the same type of ion-exchange group as the ion exchanger 460 to be regenerated is used as the partition 492. That is, a cation exchanger is used as the partition 492. Such a partition (ion exchanger) 492 can permit permeation therethrough of only those ions as coming from the ion exchanger (cation exchanger) 460 and inhibit migration therethrough of ions in the discharging liquid flowing in the discharging portion 494 into the ion exchanger 460 side.

When an anion exchanger having an anion-exchange group is used as the ion exchanger to be regenerated, it is preferred to use an anion exchanger as the partition (ion exchanger).

Next, a substrate processing (electrolytic processing) and a regeneration treatment by the electrolytic processing apparatus 450 will be described.

First, a substrate W is attracted and held by the substrate holder 454 of the electrolytic processing apparatus 450, and the substrate holder 454 is moved by the pivot arm 452 to a processing position right above the electrode section 462. The substrate holder 454 is then lowered by the actuation of the motor 464 for vertical movement, so that the substrate W held by the substrate holder 454 contacts or gets close to the surface of the ion exchanger 460 mounted on the upper surface of the electrode section 460.

Next, via a control box 482, a given voltage is applied from the processing power source 484 between the processing electrodes 456 and the feeding electrodes 458, while the substrate holder 454 is rotated and the electrode section 462 makes a scroll movement. Specifically, the ion exchanger 460 and the electrode section 454 are contacted or get close to each other, and are moved relatively. The electrode section 462 may be rotated instead of making a scroll movement. Furthermore, one of the substrate holder 454 and the electrode section 462 may be moved. At the same time, a processing liquid such as pure water or ultrapure water is supplied, through the through-hole 462a, from beneath the electrode section 462 to the upper surface thereof, thereby filling the processing liquid into the space between the processing electrode 456, the feeding electrode 458 and the substrate W. Thereby, electrolytic processing of the copper film 6, as shown in FIG. 1B, for example, formed on the substrate W is effected by the electrolytic reaction and the movement of ions produced in the ion exchanger. More specifically, by allowing pure water or ultrapure water to flow within the ion exchanger 460, the electrolytic processing efficiency can be enhanced.

At the same time, a discharging liquid is supplied through the discharging liquid supply inlet 462*d* into the discharge portion 494 provided in the regeneration section 490, thereby filling the discharge portion 494 with the discharging liquid and immersing the processing electrode 456 in the discharging liquid, and allowing the discharging liquid to flow outwardly in the discharge portion 494 and be discharged from the discharging liquid discharge outlet 462*e*.

By the above operation, through an ion-exchange reaction utilizing the ion exchanger 460 as a solid electrolyte, ions in the ion exchanger 460 to be regenerated are moved toward the processing electrode 456, passed through the partition 492, and introduced into the discharge portion 494. The ions thus moved into the discharge portion 494 are discharged out of the system by the flow of the discharging liquid supplied into the discharge portion 494. Regeneration of the ion exchanger 460 is thus effected. When a cation exchanger is used as the ion exchanger 460, cations taken in the ion exchanger 460 to be regenerated pass through the partition 492 and move into the discharge portion 494; when an anion exchanger is used, anions taken in the ion exchanger 460 to be regenerated pass through the partition 492 and move into the discharge portion 494, whereby the ion exchanger 460 is regenerated.

In the above regeneration treatment, as descried above, an ion exchanger having the same type of ion-exchange group as the ion exchanger 460 to be regenerated is used as the partition 492. This prevents migration of impurity ions in the ion exchanger 460 through the partition (ion exchanger) 492 from being hindered by the partition 492, thereby preventing an increase in the power consumption. Further, this inhibits permeation through the partition 492 of the discharging liquid (including ions in the liquid) flowing between the partition 492 and the processing electrode 456, thus inhibiting movement of the discharging liquid to the ion exchanger 460 side and preventing re-contamination of the regenerated ion exchanger 460. Furthermore, preferably used as the discharging liquid to be supplied between the partition 492 and the regeneration electrode 500 is a discharging liquid having an electric conductivity of not less than 50 μS/cm which does not form a hardly soluble or insoluble compound through a reaction with ions removed from the ion exchanger 460. Such a discharging liquid, because of its low electric resistance, can reduce the power consumption in the regeneration section. Moreover the discharging liquid does not form an insoluble compound (by-product) through a reaction with an impurity ion. In this regard, an insoluble compound, if formed, will adhere to the partition 492 whereby the electric resistance between the regeneration electrode 500 and the processing electrode 456 will be changed, making it difficult to control the electrolysis current. Such a problem can thus be prevented.

After completion of the electrolytic processing, electrical connections between the processing power source 484 and the processing electrode 456, and between the power processing source 484 and the feeding electrode 458 are shut off by means of the control box 482. Then, the rotation of the substrate holder 454 and the scroll movement of the electrode section 462 are stopped. Thereafter, the pivot arm 62 is pivoted to transfer the electrolytic processed substrate W to the next process.

Figure 20:
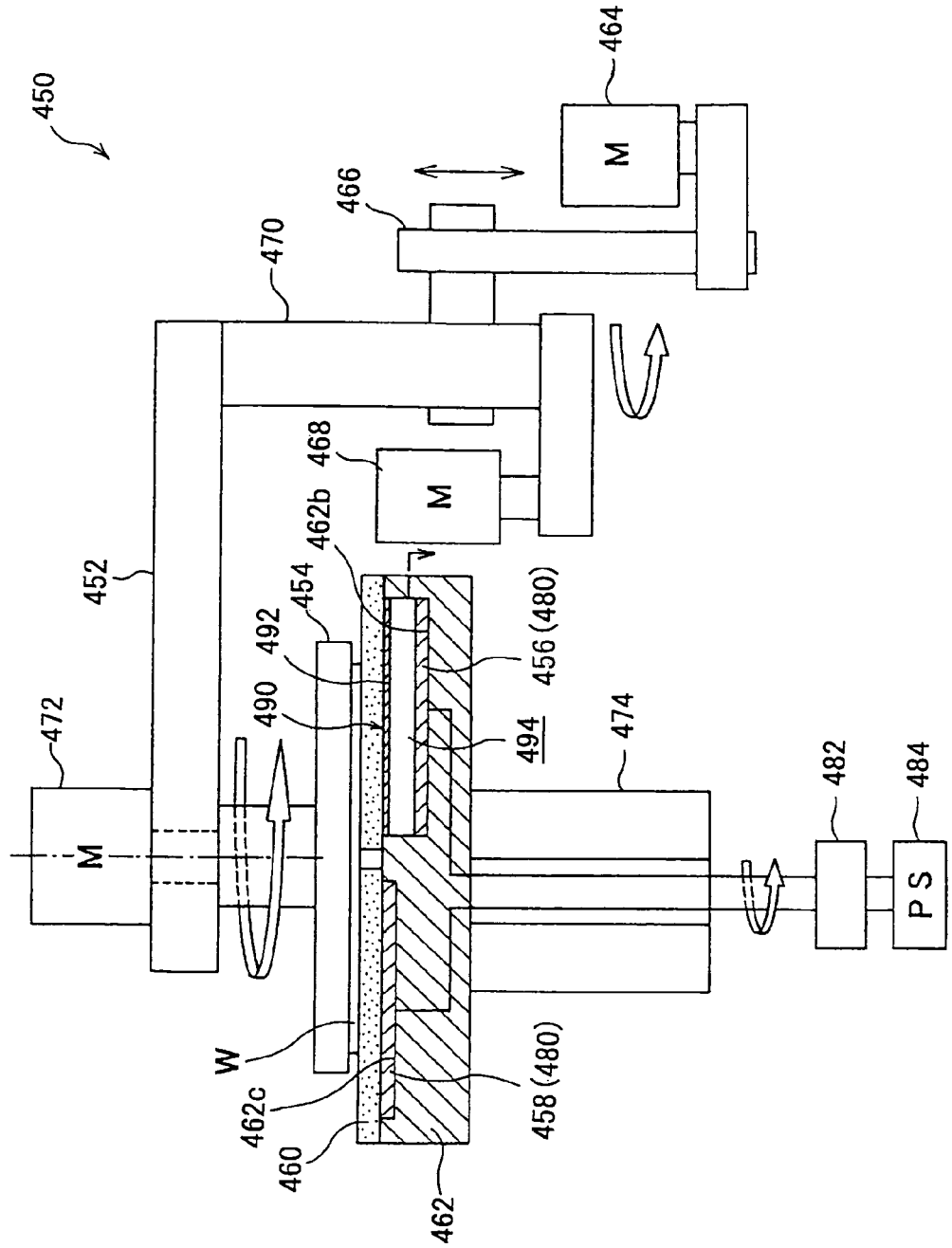
FIG. 20 is a cross-sectional view of an electrolytic processing apparatus according to still another embodiment of the present invention, showing the state of the apparatus upon electrolytic processing.
Figure 23:
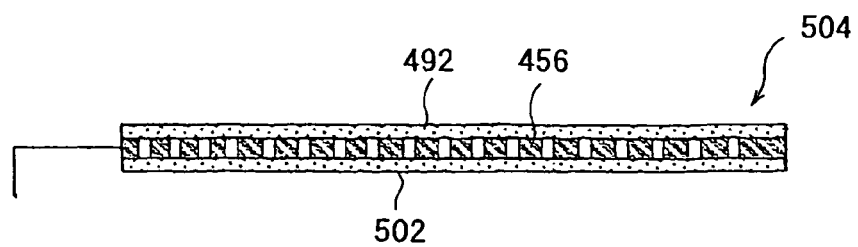
FIG. 23 is an enlarged sectional view of the processing electrode portion shown in FIG. 22.

FIGS. 22 and 23 show an electrolytic processing apparatus 450*a* according to still another embodiment of the present invention. As with the embodiment shown in FIGS. 20 and 21, the electrolytic processing apparatus 450*a* includes a regeneration section on the processing electrode side. The apparatus 450*a* is provided with a regeneration section 490*a* including a processing electrode portion 504 composed of the processing electrode 456 and the same partition 492 as described above and a second partition 502 which are mounted on the both surfaces of the processing electrode 456, a regeneration electrode 500 disposed at a distance from the processing electrode 456, and a discharge portion 494*a* for flowing a discharging liquid therethrough, which is formed between the processing electrode portion 504 and the regeneration electrode 500. The apparatus 450*a* is also provided with a regeneration power source 506. The processing electrode 456 is connected to the cathode of the processing power source 484 and to the anode of the regeneration power source 506; the regeneration electrode 500 is connected to the cathode of the regeneration power source 506. According to this embodiment, as with the above-described partition 492, an ion exchanger having the same type of ion-exchange group as the ion exchanger 460 to be regenerated, i.e. a cation exchanger, is used as the second partition 502. Further, the processing electrode 456 is disposed close to the ion exchanger 460, thus close to a workpiece, with the partition 492 interposed. The other construction is almost the same as the embodiment shown in FIGS. 20 and 21. According to this embodiment, a mesh electrode having numerous meshes as through-holes is used as the processing electrode 456. Ionic processing products (impurity ions) coming from the ion exchanger 460 pass through the numerous meshes (through-holes) of the processing electrode 456 and reach the discharge portion 494*a*.

Figure 8:
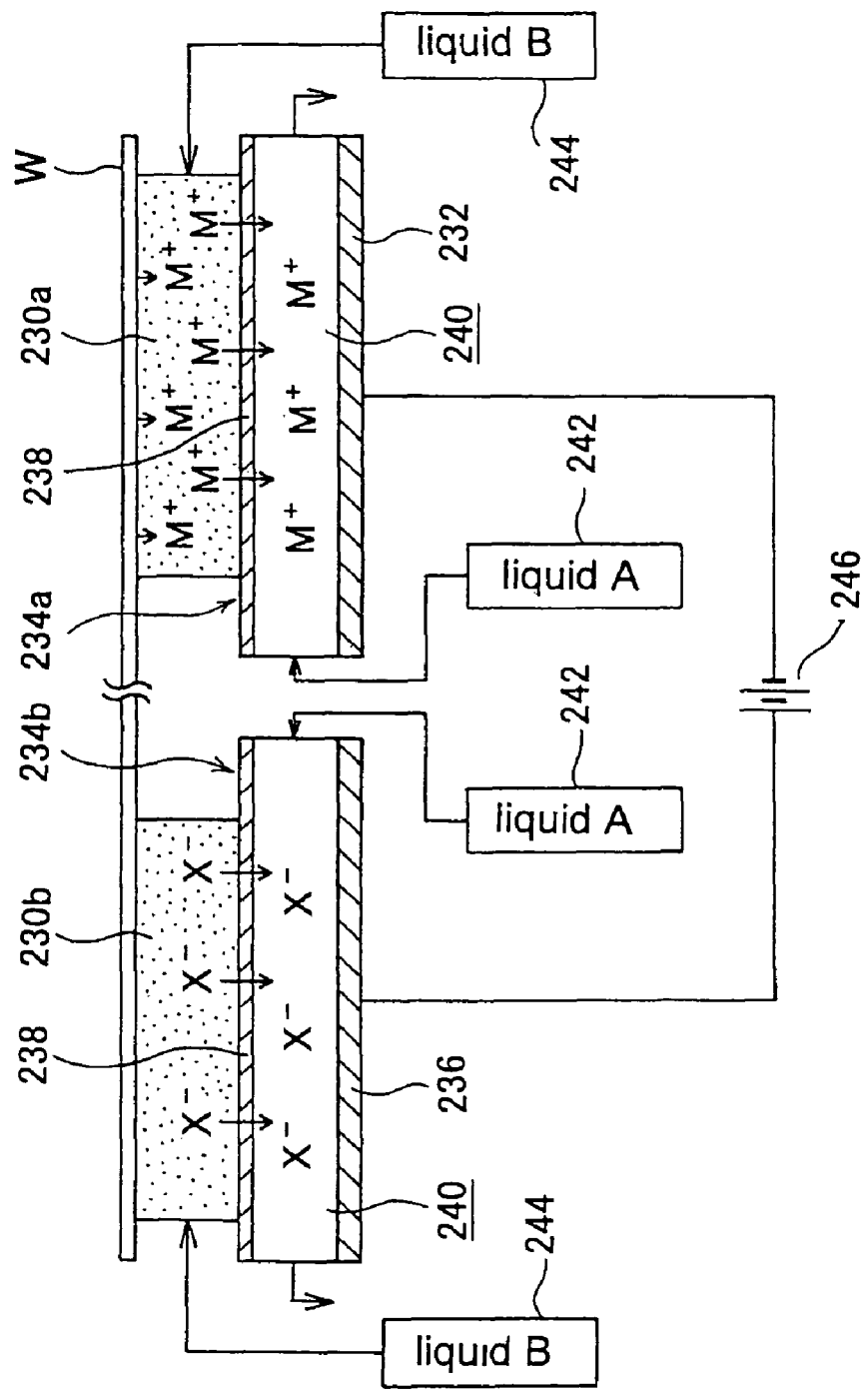
FIG. 8 is a diagram illustrating the principle of electrolytic processing/regeneration as carried out by an ion regeneration device according to the present invention.
Figure 9:
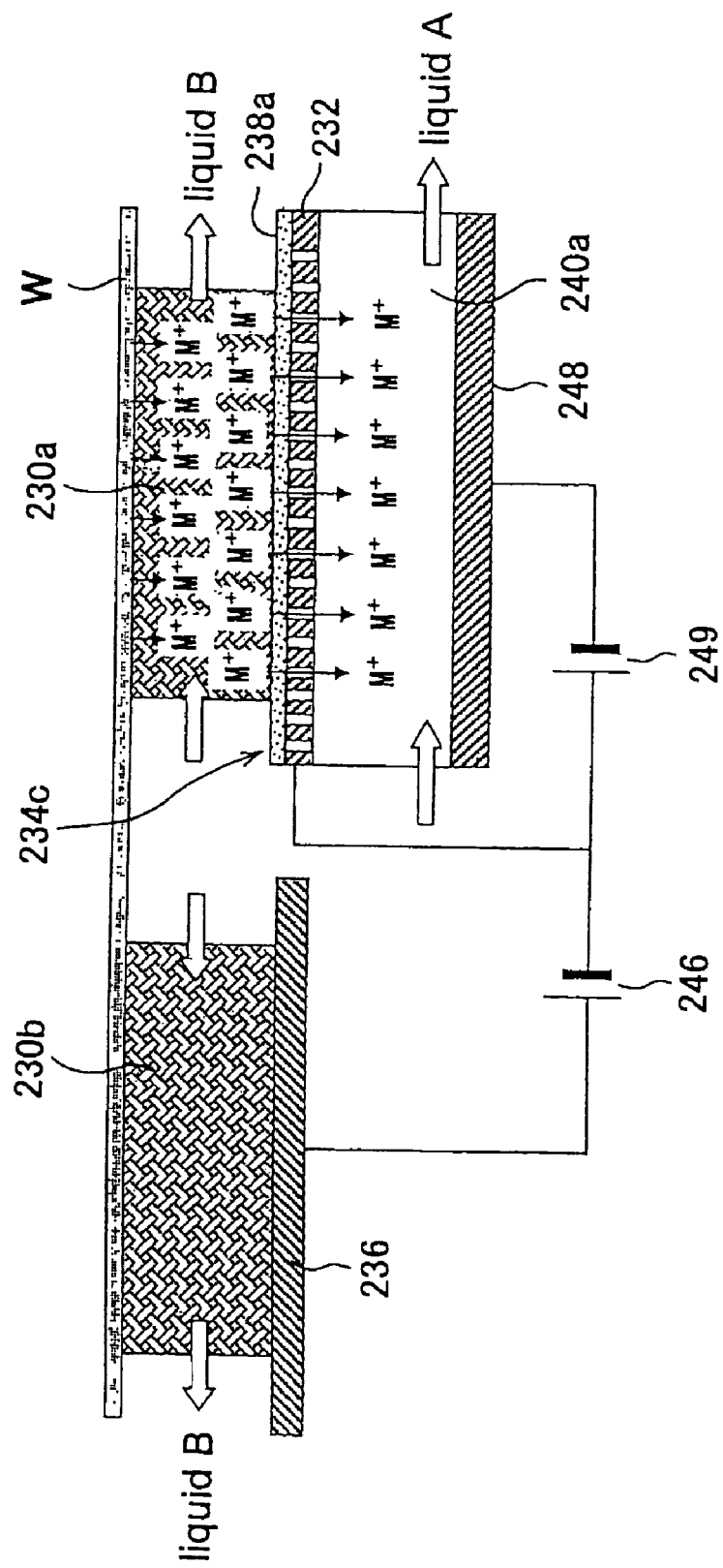
FIG. 9 is a diagram illustrating the principle of electrolytic processing/regeneration as carried out by another ion regeneration device according to the present invention.

By thus disposing the processing electrode 456 close to the ion exchanger 460, with the partition 492 interposed, and connecting the processing electrode 456 to the cathode of the processing power source 484, the position at which the processing electrode 456 is disposed, which is close to the ion exchange 460, can be made the same electric potential as the cathode of the processing power source 484. Thus, as compared e.g. with the case shown in FIG. 8 in which the processing electrode 232 is disposed at a distance from the ion exchanger and thus from a workpiece, the same potential as the cathode of the processing power source 484 can be created at a closer position to a workpiece according to this embodiment. This can create a uniform electric field, enabling a stable processing. Furthermore, the closeness of the processing electrode 456 to the ion exchanger 460 makes it possible to carry out removal of ionic processing products accumulated within the ion exchanger 460 or regeneration of the ion exchanger 460 more uniformly. In this regard, if the processing electrode 456 is distant from the ion exchanger 460, due to deposits present therebetween, accumulation of gas bubbles, etc., the electric resistances of internal micro portions of the ion exchanger can change. This can affect the electric current upon processing (regeneration), leading to variation of the electric field. Accordingly, when electrolytic processing of a workpiece and regeneration of the ion exchanger are continued, there may be a case in which an efficient regeneration of the ion exchanger or uniform regeneration of the ion exchanger can be made with difficulty, which may lead to difficulty in carrying out uniform processing of a workpiece.

According to this embodiment, the processing electrode 456 is disposed at a closer position to the ion exchanger 460 so as to create the same potential at the closer position to the ion exchanger 460, thereby suppressing variation of the electric field and reducing the adverse effect of deposits and gas bubbles. Further, by connecting the feeding electrode 458, the processing electrode 456 and the regeneration electrode 500 of a lower potential than the processing electrode 456 in series, regeneration of the ion exchanger 460 can be carried out simultaneous with processing of a workpiece.

In order to carry out uniform processing/regeneration, it is preferred that the surface of a workpiece W, the processing electrode 456, the regeneration electrode 500 and the below-described intermediate electrode 505 be parallel with one another. It is also desired that the thickness of the ion exchanger 460 be uniform.

When regenerating an ion exchanger (cation exchanger) 460 e.g. on the processing electrode 456 side having the regeneration section 490a, a regeneration voltage is applied between the processing electrode 456 as an anode and a regeneration electrode 500 as a cathode via a regeneration power source 506. By thus forcibly passing an electric current between the processing electrode 456 and the regeneration electrode 500, the ionic processing products (impurity ions) accumulated within the ion exchanger 460 are passed through the processing electrode 456 and the partitions 492, 502, and moved into the discharge portion 494a. A processing power source 484 is generally expensive because of its need for a CC (constant current) or CV (constant voltage) control. The regeneration power source 506, on the other hand, needs no such control, and therefore a less expensive electrode can be employed.

As described above, a discharging liquid having high electric conductivity, e.g. not less than 50 μS/cm, which does not form a hardly soluble or insoluble compound through a reaction with ions removed from the ion exchanger 460, e.g. sulfuric acid with a concentration of 1 wt % or higher, is supplied to the discharge portion 494a of the regeneration section 490a. Though this embodiment employs as the processing electrode 456 an electrode connected to the cathode of the processing power source 484, it is also possible to use a so-called floating electrode not connected to a power source. Even with the use of a floating electrode as the processing electrode, it is possible to create the same potential over the floating electrode surface. According to this embodiment, the two partitions 492, 502 composed of ion exchangers are mounted on the both sides of the processing electrode 456. Therefore, even if one of the partitions 492, 502 is broken, the other one can prevent the discharging liquid (usually an electrolytic solution) from leaking toward the surface of the substrate W (workpiece).

Figure 24A:
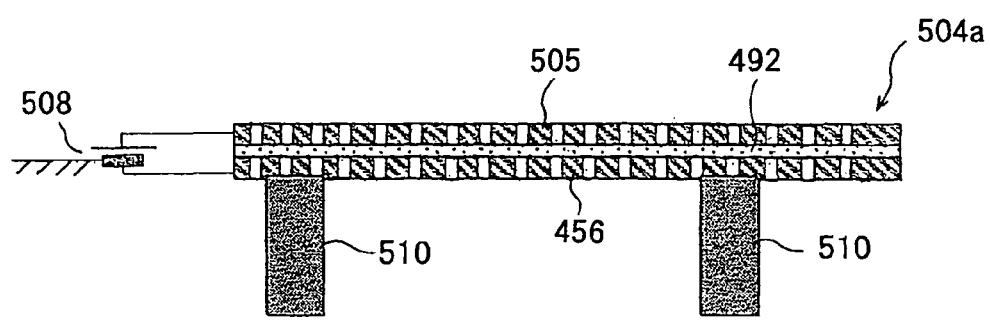
FIGS. 24A and 24B are enlarged sectional views showing other processing electrode portions.

FIG. 24A shows another processing electrode portion 504a. The processing electrode portion 504a includes a mesh-shaped intermediate electrode 505. The partition 492 is sandwiched between the processing electrode 456 and the intermediate electrode 505. The intermediate electrode 505 is connected to the anode of a drawing power source 508, and the processing electrode 456 is connected to the cathode of the drawing power source 508. The processing electrode herein refers to an electrode connected to the processing electrode of a processing power source. Either the electrode 456 or the electrode 505 may be connected to the processing electrode (cathode according to this embodiment) of the processing electrode. The electrode connected to the cathode of the processing power source becomes a processing electrode, and the other electrode becomes an intermediate electrode when it is positioned on the workpiece side of the processing electrode, and a buffer electrode when it is positioned on the discharge portion side of the processing electrode. Further, according to this embodiment, the processing electrode portion 504a is supported on supports 510 disposed vertically in the discharge portion 494a.

By thus interposing the intermediate electrode 505 between a workpiece and the processing electrode 456, it becomes possible to make the electric potential constant at the surface of the intermediate electrode which is at a closer distance to the workpiece than the processing electrode 456, thereby stabilizing the electric potential and the electric field in the vicinity of the workpiece and stabilizing the processing efficiency. In this case, the voltage applied between the processing electrode 456 and the intermediate 505 is made smaller than the voltage applied between the workpiece and the processing electrode 456.

Further, by supporting the processing electrode portion 504a, i.e. the processing electrode 456, the intermediate electrode 505 and the partition 492, on the supports 510, positioning and fixing of the partition 492 can be made automatically via the aid of the stiff electrodes 456, 505. This eliminates the need to provide a structure for holding the partition 492, and thus can simplify the construction.

Figure 24B:
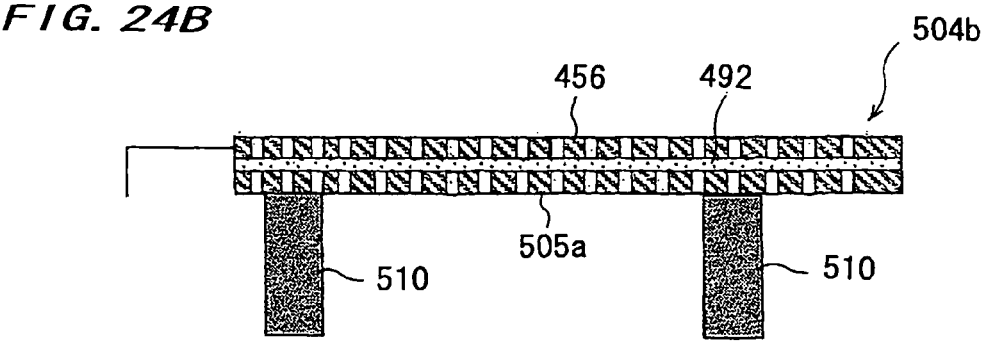

FIG. 24B shows still another processing electrode portion 504b. The electrode portion 504b includes a buffer electrode 505a between the processing electrode 456 and the regeneration electrode 500 as an electrode for adjusting the electric potential therebetween. In this case, a drawing electrode is not provided, and the partition 492 is sandwiched between the processing electrode 456 and the buffer electrode 505a. The buffer electrode 505a on the discharge portion 494a side is a so-called floating electrode. The floating electrode 505a has an electric potential determined by a potential difference from the potential of the workpiece surface or from the regeneration electrode surface and other environmental factors, and can create the same potential over the electrode surface. The use of such a buffer electrode can therefore realize a uniform regeneration of the ion exchanger.

Figure 25:
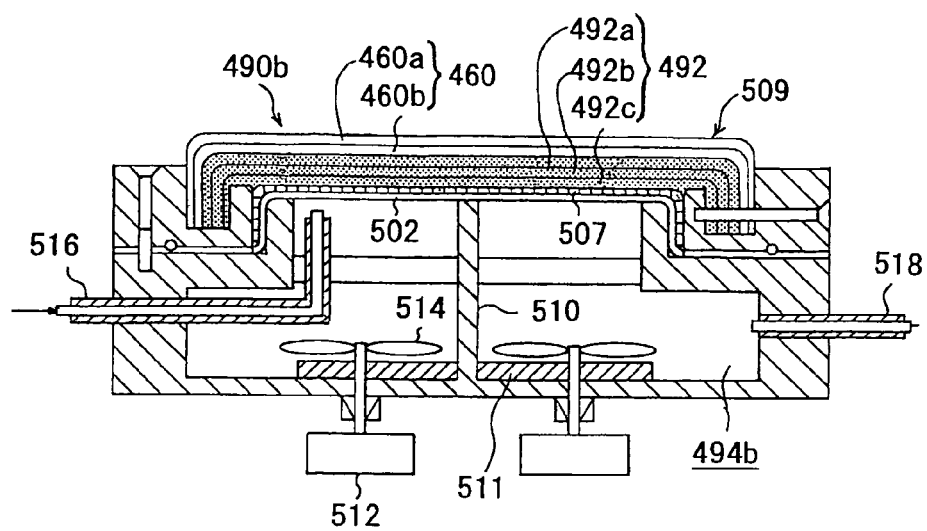
FIG. 25 is a cross-sectional view of another regeneration section according to the present invention.

FIG. 25 shows another regeneration section 490b. According to this embodiment, the ion exchanger is composed of two groups of ion exchangers. The surface side first-group ion exchanger 460 is a laminate of a surface layer 460a and a backside layer 460b, and the second-group ion exchanger 492 is a three-layer laminate of a top layer 492a, an intermediate layer 492b and a bottom layer 492c. The total ion exchanger is thus of a five-layer laminated structure. The second-group ion exchanger 492 also functions as a partition. Such a lamination enhances the rigidity of the ion exchanger 460 and increases the ion-exchange capacity. The regeneration section 460b is provided with a mesh-shaped floating electrode 407, not connected to the processing power source, as an intermediate electrode.

The floating electrode portion 509, which is supported by the supports 510, covers the top opening of a discharge portion 494b that is provided at the bottom an electrode 511 as a processing electrode and also as a regeneration electrode. In the discharge portion 494b, there are also provide stirring blades 514 that rotate by the actuation of motors 512 and stir the discharging liquid in the discharge portion 494b. Further according to this embodiment, the discharging liquid for discharging contaminants is supplied from a discharging liquid supply pipe 516 into the discharge portion 494b, and the discharging liquid in the discharge portion 494b is discharged out from a discharging liquid discharge pipe 518. The discharging liquid supply pipe 516 is so desired that a fresh discharging liquid is supplied close to the partition.

Further, though not figured, an additional mesh-shaped floating electrode may be disposed between the first-group ion exchanger 460 and the second-group ion exchanger 492. Such an additional floating electrode can create the same potential at the closer position to the ion exchanger 460, thereby suppressing variation of the electric field and reducing the adverse effect of deposits and gas bubbles.

By thus disposing the stirring blades 514 in the discharge portion 494b and forcibly stirring the discharging liquid in the discharge portion 494b by the stirring blades 514, gas bubbles (hydrogen gas bubbles in removal processing of copper) generated in the surface of the processing/regeneration electrode 511 upon electrolytic processing can be prevented from adhering to the partitions 492, 502, and impeding formation of a uniform electric field and impeding the ion-exchange reaction itself.

Figure 26:
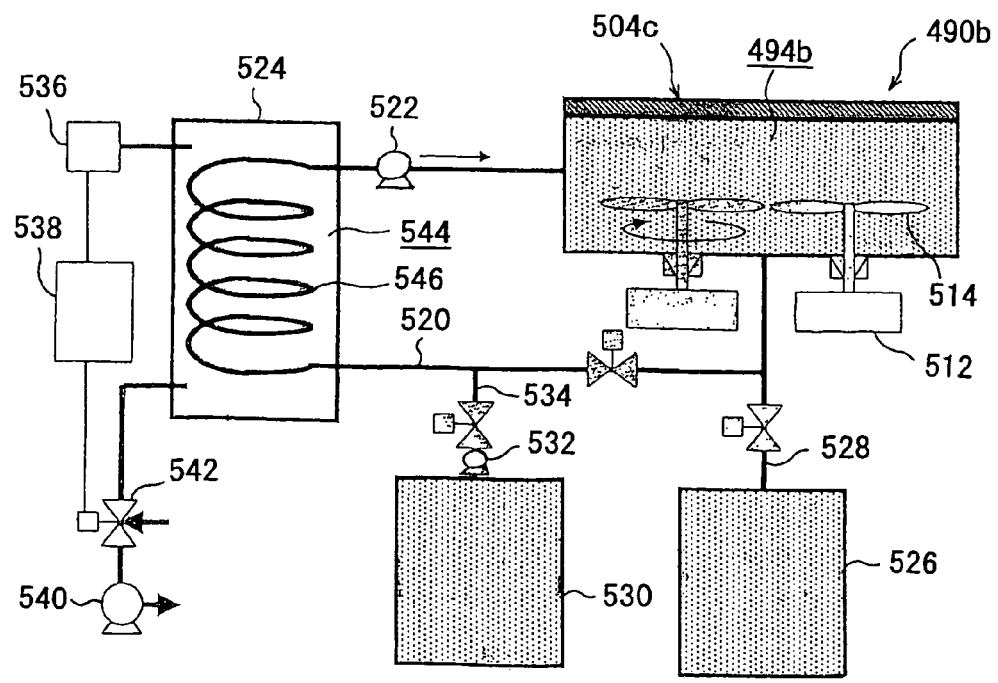
FIG. 26 is a system diagram illustrating a circulation system of a discharging liquid, provided with the regeneration section of FIG. 25.

FIG. 26 shows a circulation system of the discharging liquid for discharging contaminants, including the regeneration section 490b of FIG. 25. The circulation system includes the discharge portion 494b and a circulation line 520 for holding the discharging liquid therein and circulating the discharging liquid. In the circulation line 520, a circulation pump 522 and a deaerator 524 are provided for removing a gas, which has been generated during electrolytic processing and taken in the discharging liquid, from the discharging liquid and supplying the discharging liquid with a lowered dissolved gas content into the discharge portion 494b. Further, to the circulation line 520 is connected a discharge line 528 which extends from a discharge tank 530, and a supply line 534 which extends from a supply tank 530 and has on its way a supply pump 532.

According to this embodiment, a deaerating film-type deaeration chamber is used as the deaerator 524, with which deaeration is effected in the following manner: A pressure data as detected by a pressure sensor 536 is input to a pressure control circuit 538. Based on an output signal from the pressure control circuit 538, the degree of opening of an open/close value 542, provided between a vacuum pump 540 and the deaerating film-type deaeration chamber, is controlled so as to control the pressure in the deaeration chamber 544 at a constant reduced pressure. The external pressure of a deaerating film 546, which is disposed in the deaeration chamber 544 and constitutes part of the circulation line 520, is thus reduced whereby a gas in the discharging liquid flowing in the deaerating film 546 is removed.

By thus providing the circulation line 520, deaerating the discharging liquid flowing through the circulation line 520 and supplying the deaerated discharging liquid into the discharge portion 494b, it becomes possible to reuse the discharging liquid. Further, by connecting the discharge line 528 and the supply line 534 to the circulation line 520, it becomes possible to replace the discharging liquid, which has lost the regenerating ability, with a fresh discharging liquid. The discharging liquid may be reused not by circulation but batchwise.

Figure 27:
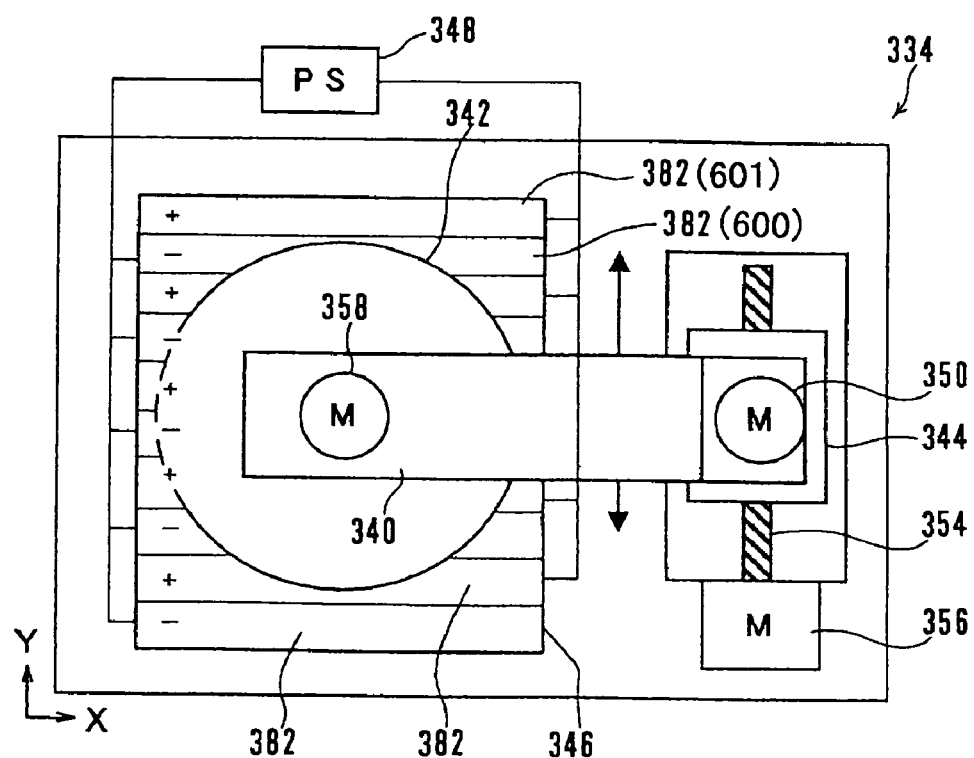
FIG. 27 is a plan view of an electrolytic processing apparatus according to still another embodiment of the present invention.
Figure 28:
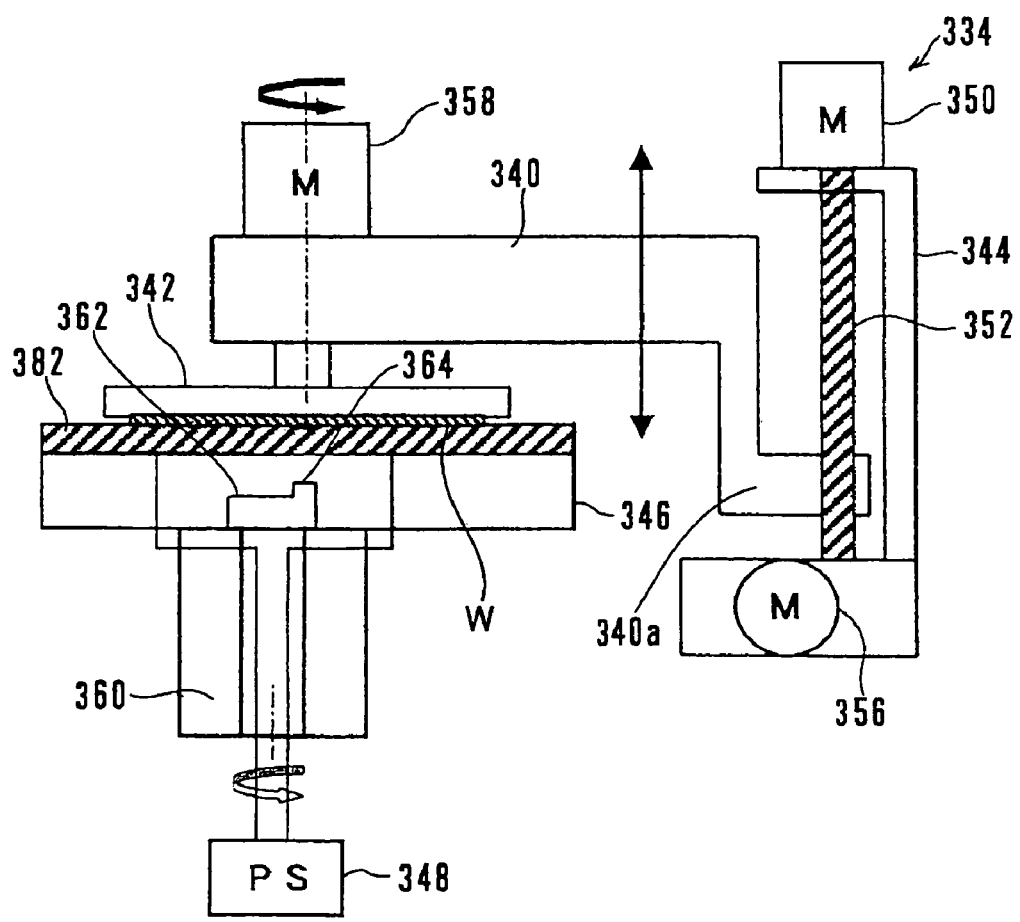
FIG. 28 is a vertical sectional view of the electrolytic processing apparatus of FIG. 27.

FIG. 27 is a plan view showing an electrolytic processing apparatus 334 according to still another embodiment of the present invention, FIG. 28 is a vertical sectional view of FIG. 27. As shown in FIGS. 27 and 28, the electrolytic processing apparatus 334 includes a arm 340 that can move vertically and make a reciprocating motion along a horizontally plane, a substrate holder 342, supported at the free end of the arm 340, for attracting and holding the substrate W with its front surface facing downward (face-down), a moveable flame 344 connected to the arm 340, a rectangular-shaped electrode section 346, and a processing power source 348 connected to the electrode section 346. According to this embodiment, the ion electrode section 346 is designed to have a diameter that is larger than that of the substrate W held by substrate holder 342.

As shown in FIGS. 27 and 28, a motor 350 for vertical movement is mounted on the upper portion of the moveable frame 344, and a ball screw 352, extending vertically, is coupled to the motor 350 for vertical movement. A base portion 340a of the arm 340 is engaged with the boll screw 350 so that the arm 340 moves up and down via a ball screw 352 by the actuation of a motor 350 for vertical movement. The moveable frame 344 is engaged with a boll screw 354, extending horizontally, so that the moveable frame 344 and the arm 340 make a reciprocating motion along a horizontally plane by the actuation of a motor 356 for reciprocating motion The substrate holder 342 is connected to a rotating motor 358 provided at the free end of the arm 340, and allowed to rotate by the actuation of a motor 358. As described above, the arm 340 is adapted to move vertically and make a reciprocating motion along a horizontally plane, the substrate holder 342 is adapted to move vertically and make a reciprocating motion along a horizontally plane integrated with the arm 340.

The hollow motor 360 is disposed below the electrode section 346. A drive end 364 is formed at the upper end portion of the main shaft 362 of the hollow motor 360 and arranged eccentrically position to the center of the main shaft 362. The electrode section 346 is connected to the drive end 364 via a bearing (not shown) at the center portion thereof. Three or more rotation-prevention mechanisms are provided in the circumferential direction between the electrode section 346 and the hollow motor 360.

Figure 29A:
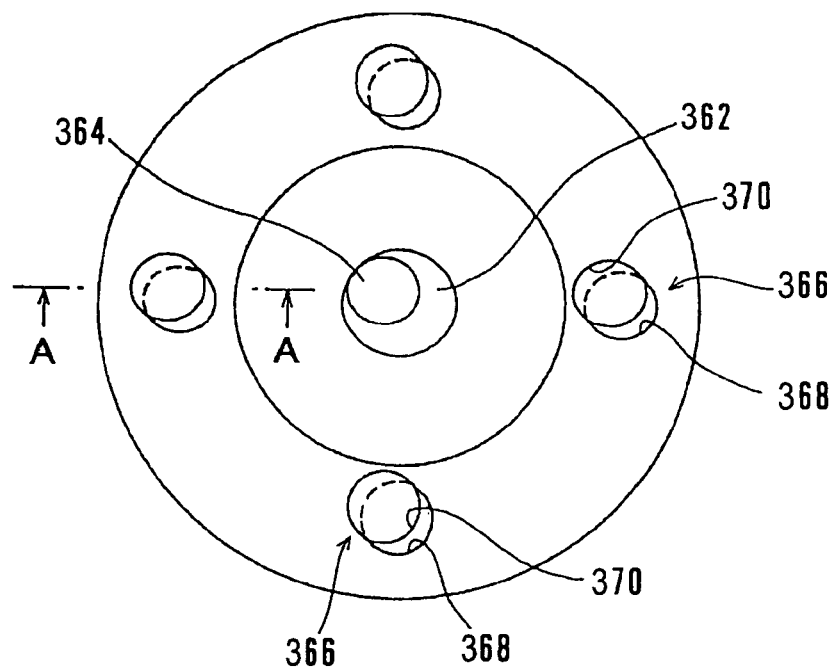
FIG. 29A is a plan view of a rotation-prevention mechanism provided in the electrolytic processing apparatus of FIG. 27.
Figure 29B:
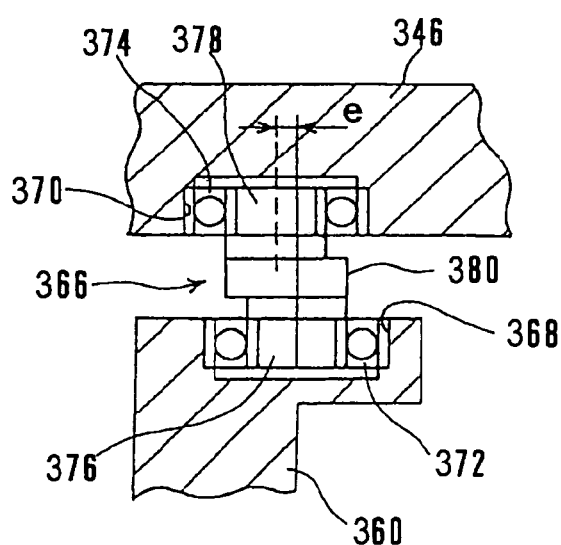
FIG. 29B is a sectional view taken along the line A-A of FIG. 29A.

FIG. 29A is a plan view showing the rotation-prevention mechanisms of this embodiment, and FIG. 29B is a cross-sectional view taken along the line A-A of FIG. 29A. As shown in FIGS. 29A and 29B, three or more (four in FIG. 29A) of rotation-prevention mechanisms 366 are provided in the circumferential direction between the electrode section 346 and the hollow motor 360. As shown in FIG. 29B, a plurality of depressions 368, 370 are formed at equal intervals in the circumferential direction at the corresponding positions in the upper surface of the hollow motor 360 and in the lower surface of the electrode section 346. Bearings 372, 374 are fixed in each depression 368, 370, respectively. A connecting member 380, which has two shafts 376, 378 that are eccentric to each other by eccentricity "e", is coupled to each pair of the bearings 372, 374 by inserting the respective ends of the shafts 376, 378 into the bearings 372, 374. Further, a drive end 364, formed at the upper end portion of the main shaft 362 of the hollow motor 360 and arranged eccentrically position to the center of the main shaft 362, is rotatably connected, via a bearing (not shown), to a lower central portion of the electrode section 346. The eccentricity is also "e". Accordingly, the electrode section 346 is allowed to make a scroll movement (translational rotation movement), along a circle with radius "e".

A plurality of electrode plates 382 are disposed in parallel, spaced at a given pitch, in the upper surface of the electrode section 346, and the cathode and the anode of the processing power source 348 are alternately connected to the electrode plates 382, so that the electrode plates 382 connected to the cathode becomes the processing electrodes 200, adversely, the electrode plates 382 connected to the anode becomes the feeding electrodes 201. The processing electrodes 200 and the feeding electrodes 201 are thus disposed alternately. The surface each of the processing electrodes 200 and the feeding electrodes 201 is covered with ion exchanger, respectively.

Figure 30A:
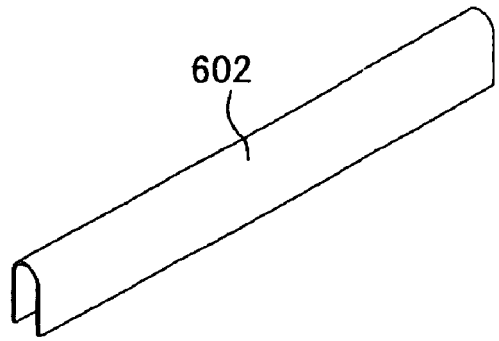
FIG. 30A is a perspective view of an ion exchanger in the regeneration section of the electrolytic processing apparatus of FIGS. 27 and 28.
Figure 30B:
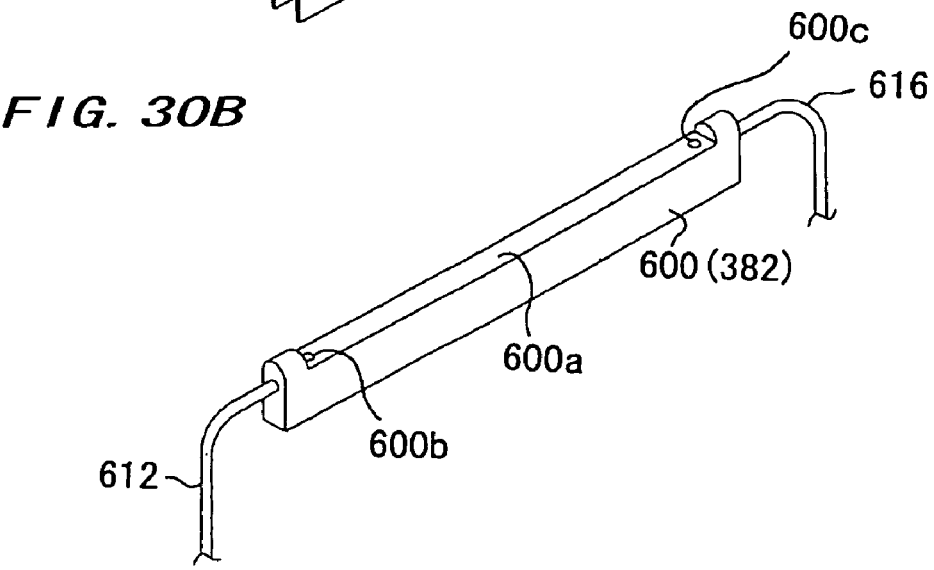
FIG. 30B is a perspective view of an electrode (processing electrode) in the same regeneration section.
Figure 30C:
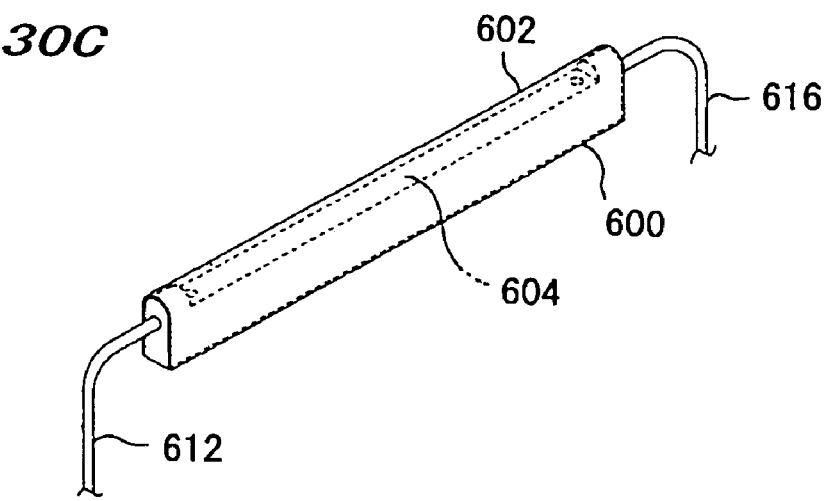
FIG. 30C is a perspective view showing the state of the ion exchanger and the electrode when the ion exchanger is mounted on the electrode.
Figure 31:
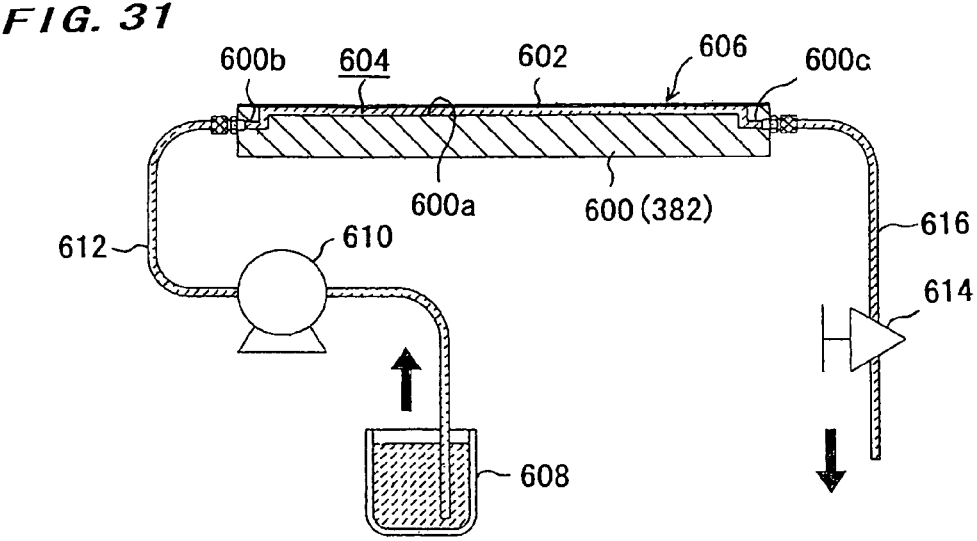
FIG. 31 is a system diagram illustrating a distribution system of a discharging liquid, provided with the regeneration section shown in FIGS. 30A through 30C.

According to this embodiment, as with the above-described embodiments, a regeneration section is provided on the processing electrode side. FIGS. 30A to 30C show the electrode plate 382 which is connected to the cathode of the processing power source 348 and becomes a processing electrode 600, and FIG. 31 shows a distribution system of the discharging liquid for discharging contaminants, including the regeneration section. As shown in FIGS. 30A to 30C, in the upper portion of the long processing electrode (electrode plate) 600, extending linearly and connected to the cathode of the processing power source 348, there is provided a cut-away portion 600a which has been formed by cutting away part of the electrode 600 while leaving the both end portions. An ion exchanger 602, having the shape of the letter "U" in cross-section, is mounted fitly on the processing electrode 600 so that the ion exchanger 602 covers the cut-away portion 600a, whereby a closed discharging liquid flow passage 604 is formed between the cut-away portion 600a and the ion exchanger 602. The regeneration section 606, having the discharging liquid flow passage 604, is thus constructed. Regeneration of the ion exchanger 602 is effected by utilizing the ion exchanger itself as a partition and, in the same manner as described above, by flowing through the discharging liquid flow passage 604 a discharging liquid having an electric conductivity of e.g. not less than 50 μS/cm which does not form a hardly soluble or insoluble compound through a reaction with ions removed from the ion exchanger 602 mounted on the workpiece side surface of the processing electrode 600.

At the both ends of the processing electrode 600, through-holes 600b, 600c are formed, each opening at one end of the end surface of the processing electrode 600 and at one end of the cut-away portion 600a. One through-hole 600b is connected to a liquid supply pipe 612 which extends from a supply tank 608 and has on its way a pressure-supply pump 610, and the other through-hole 600c is connected to a liquid discharge pipe 616 which has on its way a pressure regulation valve 614. An open flow line is thus constructed in which by the actuation of the pressure-supply pump 610, the discharging liquid in the supply tank 608 is pressure-supplied into the discharging liquid flow passage 604 of the regeneration section 606, and the discharging liquid flows in one direction in the discharging liquid flow passage 604 and flows out of the system.

According to this embodiment, a substrate W is held by the substrate holder 342, and the substrate holder 342 is lowered so as to bring the substrate W close to or in contact with the ion exchanger mounted on the surface of the electrode section 346. While rotating the substrate holder 342 and allowing the electrode section 346 to make a scroll movement and a reciprocating movement, a voltage is applied between the processing electrode 600 and the feeding electrode 601 and, at the same, a processing liquid such as pure water is supplied to the surface of the substrate W, thereby carrying out electrolytic processing. Processing proceeds in the region in which the workpiece and the ion exchanger 302 covering the processing electrode 600 are closed to or in contact with each other. During the electrolytic processing, while regulating the pressure on the upstream side of the pressure regulation valve 614 by the valve 614, the discharging liquid is pressure-supplied into the discharging liquid flow passage 604 of the regeneration section 606, thereby allowing reaction products taken in the ion exchanger 602 to flow into the discharging liquid. During the processing, gas bubbles may be generated by electrolysis of water in the discharging liquid in the discharging liquid flow passage 604. If the pressure regulation valve 614 is completely closed during the processing, gas bubbles or gasses may remain within the discharging liquid flow passage 604 to lower the processing efficiency and, as the case may be, the ion exchanger 602 can be broken due to the expansion of the discharging liquid. Accordingly, it is desired to continuously supply the discharging liquid during processing at such a flow rate that the gas bubbles or gasses generated do not affect the processing, and discharge the discharging liquid, together with the gas bubbles, from the discharging liquid flow passage 604.

When gas bubbles or gasses are generated in a large amount, it is necessary to supply the discharging liquid at a high flow rate. Therefore, there may be a case where the discharging liquid is discharged as waste while the liquid still has a sufficient processing capacity. Accordingly, it is desired to adjust the concentration of the discharging liquid so that the flow rate meets the processing capacity necessary per unit of time. The amount of waste liquid can be reduced by circulating the discharging liquid during processing, as described below.

Figure 32:
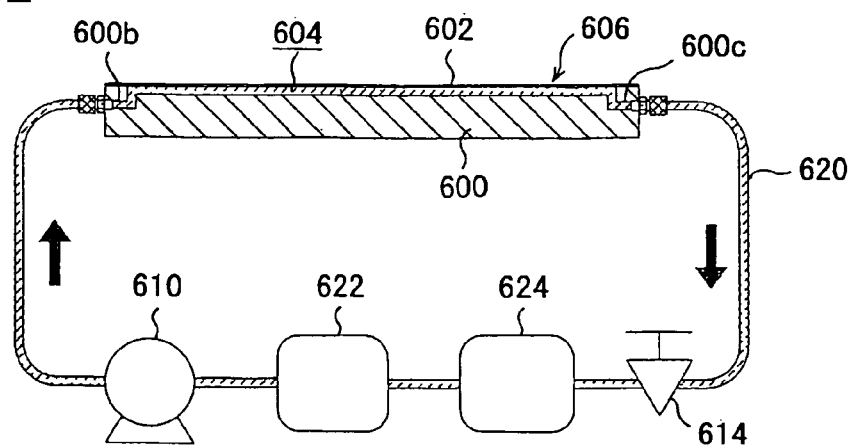
FIG. 32 is a system diagram illustrating an circulation system of a discharging liquid, provided with the regeneration section shown in FIGS. 30A through 30C.

FIG. 32 shows another distribution system of the discharging liquid for discharging contaminants, including the regeneration section 606 shown in FIGS. 30A to 30C and FIG. 31. According to this embodiment, the through-holes 600b, 600c provided at the both ends of the processing electrode 600 are connected through the circulation line 620. Between the pressure-supply pump 610 and the pressure regulation valve 614, which are provided in the circulation line 620 on both sides of the processing electrode 600, a discharging liquid regeneration section 622 is disposed and is provided with a liquid regeneration electrode for regenerating the discharging liquid, and a deaerator 624 is also disposed for removing gas bubbles or gasses taken in the discharging liquid. In electrolytic processing of e.g. copper, copper dissolved in the discharging liquid is precipitated in the discharging liquid regeneration section 622. A closed circuit is thus formed in which by the actuation of the pressure-supply pump 610, the discharging liquid is pressure-supplied to the regeneration section 606, and is then sent to the deaerator 624 where the liquid is deaerated, and the deaerated discharging liquid is sent to the discharging liquid regeneration section 622 where the liquid is regenerated, and the regenerated discharging liquid is returned to the pressure-supply pump 610. The discharging liquid can thus be reused.

Insulating sections for preventing a short-circuit between the processing electrode 600 and the liquid regeneration electrode provided in the discharging liquid regeneration section 622 are provided before and after the regeneration section 622, whereby regeneration of the discharging liquid by the regeneration section 622 can be carried out efficiently while preventing a short circuit.

Figure 33:
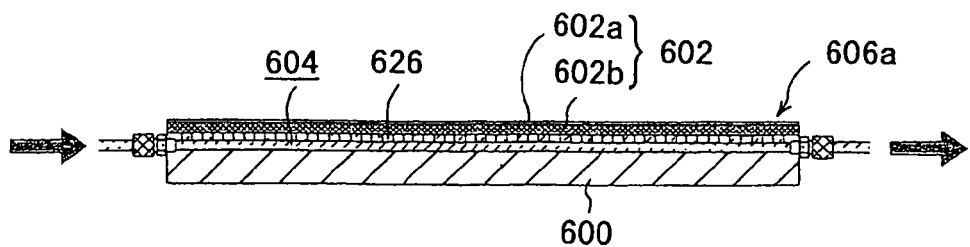
FIG. 33 is a cross-sectional view of an electrode section having still another regeneration section according to the present invention.
Figure 34:
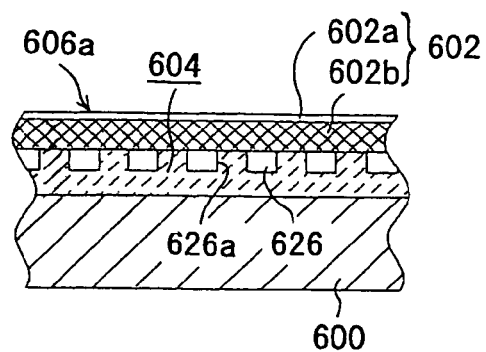
FIG. 34 is an enlarged view of the main part of the regeneration system of FIG. 33.

FIGS. 33 and 34 show an electrode section having still another regeneration section 606a. This embodiment employs, as the ion exchanger 602 that forms the discharging liquid flow passage 604 between it and the processing electrode 600, a two-layer laminate consisting of a surface layer 602a composed of a thin film-type ion exchanger having a surface smoothness and flexibility and a backside layer 602b composed of an elastic ion exchanger having a large ion-exchange capacity. Further, a support 626 for supporting the ion exchanger 602 in a flat state is provided in the discharging liquid flow passage 604. Through-holes 626a are provided at certain positions in the support 626. According to this embodiment, the ion exchanger of the surface layer 602a serves as a partition.

Such an ion exchanger 602 of two-layer laminate structure, because of the backside layer 602b having a large ion-exchange capacity, has an increased total ion-exchange capacity. Further, because of the elasticity, the ion exchanger 602 can be prevented from being damaged even when an excessive pressure is applied thereto in electrolytic processing. As the surface layer 602a, an ion exchanger which is permeable to ions, but not permeable to a liquid, may be used when an electrolytic solution is used as the discharging liquid that flows through the discharging liquid flow passage 604. When the below-described ion-exchange liquid is used as the discharging liquid, the surface layer 602 may permit permeation therethrough of water insofar as an ion exchanger in the discharging liquid does not leak therethrough. The provision of the support 626 ensures the formation of the discharging liquid flow passage 604 and enables lamination of the ion exchanger on the support.

Figure 35:
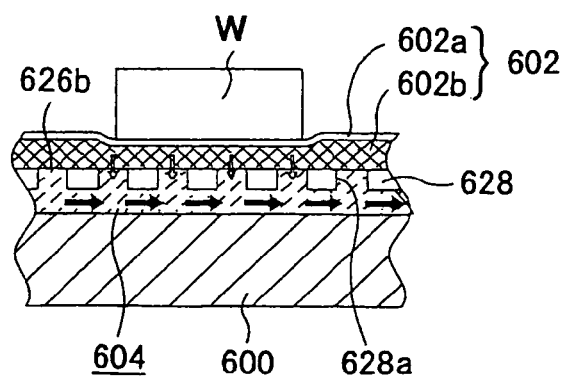
FIG. 35 is an enlarged view of the main part of a variation of the regeneration section shown in FIGS. 33 and 34.

FIG. 35 shows a variation of the regeneration section shown in FIGS. 33 and 34. According to this embodiment, a partition 626b composed of an ion exchanger in the form of a membrane is mounted to the back surface of the ion exchanger 602 of two-layer structure, and the ion exchanger 602 having the partition 626b is supported by a support 628 provided in the discharging liquid flow passage 604. The provision of the support 628 makes it possible to use a thin film-type ion exchanger as the ion exchanger 602, and allow such a film-type ion exchanger 602 to contact the workpiece W flexibly. The flexibility is required to respond to variations of the to-be-processed surface of the workpiece due to the size of the workpiece, the relative movement between the workpiece and the ion exchanger, etc.

The support 628 has a number of through-holes 628a. The support 628 can hold the ion exchanger 602 in a tense state. Owing to the tensity and the elasticity of the ion exchanger 602, the workpiece W such as a substrate can contact the surface of the ion exchanger 602 over the entire surface of the workpiece. According to the embodiment of FIG. 35, two layers of the surface layer 602a and the partition 626b function as a partition. Should one of the layers be broken, the discharging liquid can be kept away from leaking into the workpiece side.

When the ion-exchange capacity of the ion exchanger 602 reaches its limit, the ionic processing products are taken in the discharging liquid flowing through the discharging liquid flow passage 604, whereby the ion exchanger 602 is regenerated. The regeneration can eliminate or at least lessen the time and labor for exchange of the ion exchanger 602 covering the surface of the processing electrode 600. According to this embodiment, ion exchangers are used for the surface layer 602a and the backside layer 602b because they meet the requirements of electrochemical inactivity, elasticity and permeability to ions. Provided these requirements are met, other materials may be employed.

When the support 628 is formed of an electrochemically inactive insulating material, e.g. Teflon, which is different from the material of the processing electrode 600, feeding of electricity to the workpiece is made through the ion exchanger, whereby processing products can be efficiently taken in the discharging liquid. Further, it is possible to form the partition 626b of such an ion exchanger that allows pure water to flow on the partition, that is, along the backside layer 602b, and allows the discharging liquid to flow below the partition, that is, through the discharging liquid flow passage 604. This makes it possible to keep the discharging liquid, which is generally harmful, away from the processing surface and, if the ion exchanger, providing the processing surface, is broken, prevent the discharging liquid from flowing through the partition 626b into the workpiece side. As the surface layer 602a, an ion exchanger which is permeable to ions, but not permeable to a liquid, may be used when an electrolytic solution is used as the discharging liquid that flows through the discharging liquid flow passage 604. When the below-described ion-exchange liquid is used as the discharging liquid, the surface layer 602a may permit permeation therethrough of water insofar as an ion exchanger in the discharging liquid does not leak therethrough.

Figure 36:
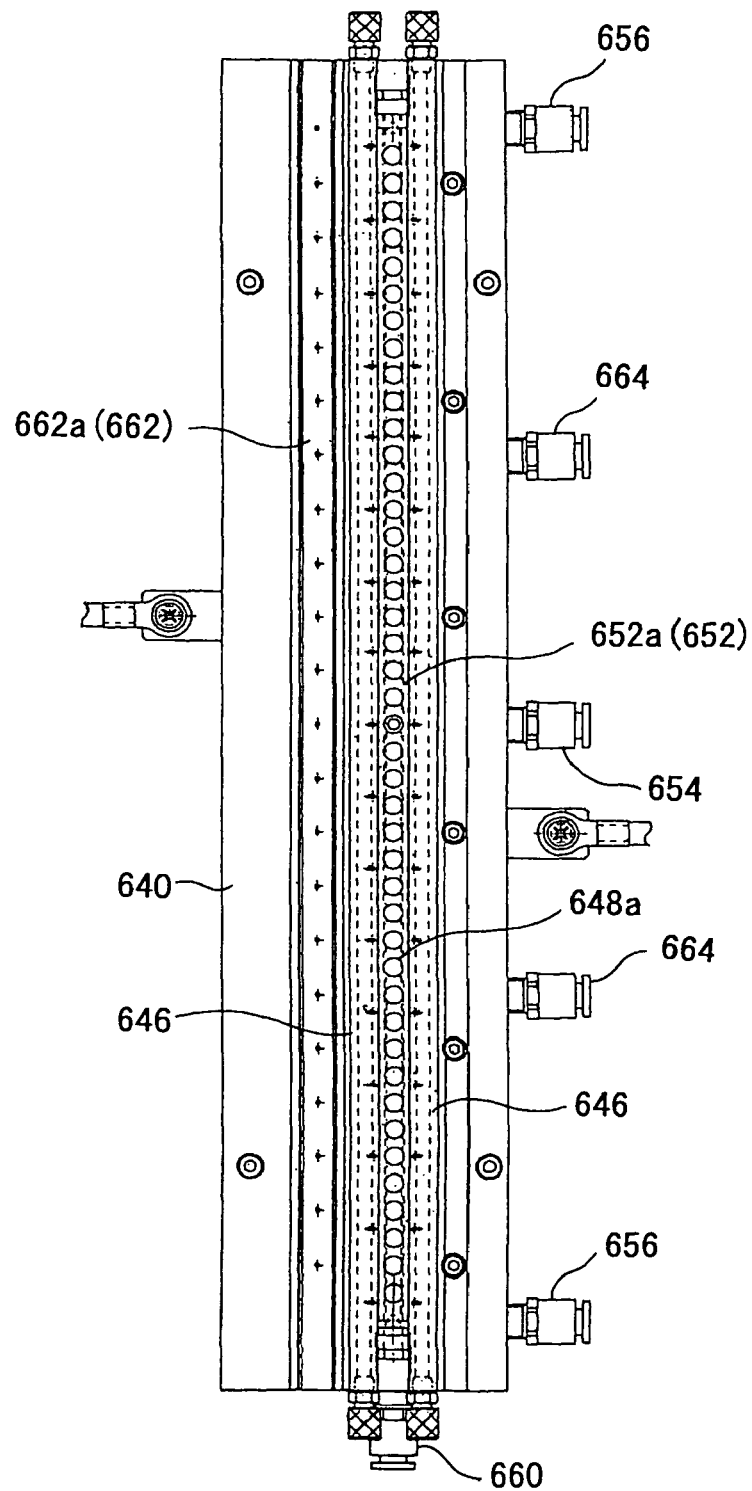
FIG. 36 is a plan view of an electrolytic processing apparatus according to still another embodiment of the present invention.
Figure 37:
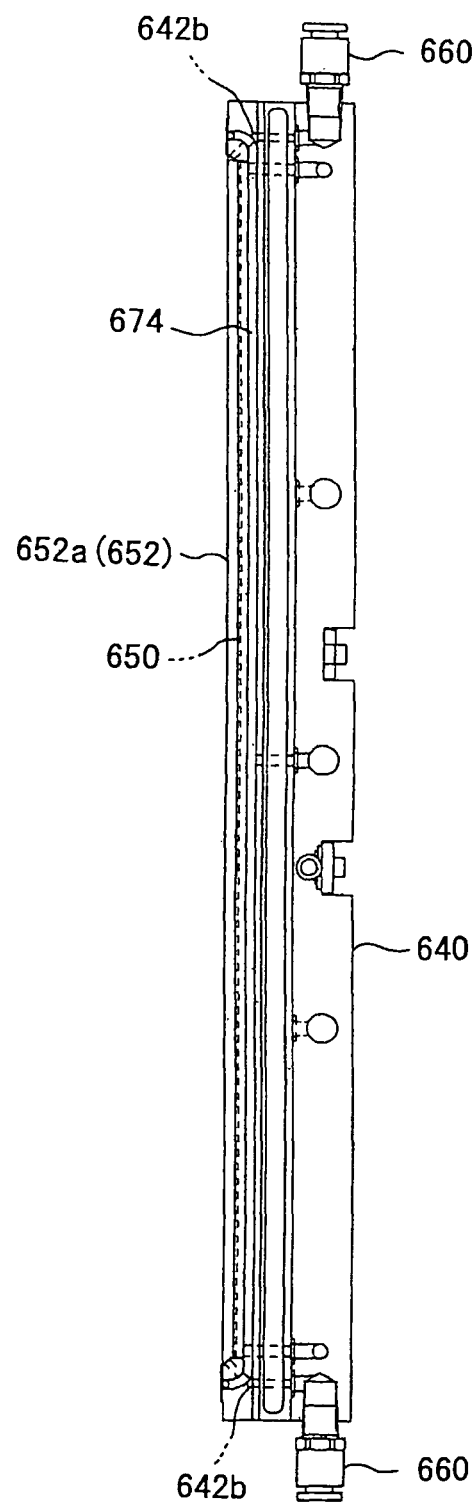
FIG. 37 is a right side view of the electrolytic processing apparatus of FIG. 36.
Figure 38:
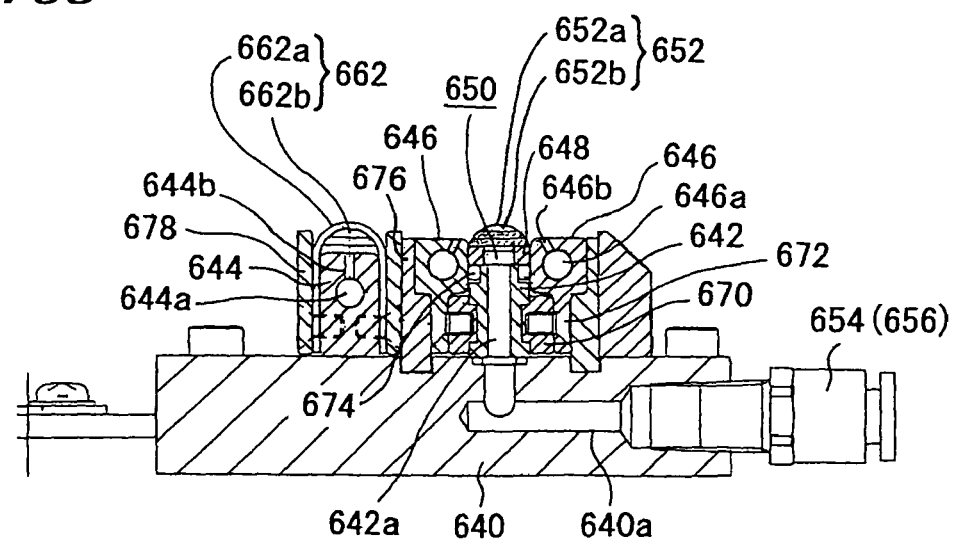
FIG. 38 is an enlarged view of the main part of the electrolytic processing apparatus of FIG. 36.

FIGS. 36 through 38 show still another electrode section of an electrolytic processing apparatus. These Figures show a unit, including a pair of a processing electrode and a feeding electrode, of the entire electrode section. The actual or entire electrode section, as shown e.g. in FIG. 27, is generally square and comprises a plurality of units disposed in parallel. The entire electrode section, when used in electrolytic processing, is allowed to rotate or make a scroll movement. According to this embodiment, an ion exchanger on the processing electrode side is regenerated, and pure water is employed as a processing liquid.

The electrode section includes an electrode plate 640. On the upper surface of the electrode plate 640, a long processing electrode 642 to be connected to the cathode of a processing power source and a long feeding electrode 644 to be connected to the anode of the processing power source are disposed in parallel. On both sides of the processing electrode 642, a pair of long pure water jet nozzles 646 is disposed.

A support 648, which opens downwardly and has a horseshoe shape in cross-section, and extends over almost the full length of the processing electrode 642, is mounted on the upper surface of the processing electrode 642. A discharging liquid flow passage 650, extending over almost the full length of the processing electrode 642, is formed by the depressed portion of the support 648. The support 648 has in the upper portion openings 648a spaced at a given pitch in the long direction. The upper surface of the support 648 is covered with an ion exchanger 652 composed of a surface layer 652a and a three-layer laminate 652b. The surface layer 652a of the ion exchanger 652 serves as a partition. Vertically-extending liquid supply passages 642a are provided at certain positions in the processing electrode 642. The liquid supply passages 642a connected to a discharging liquid introduction/discharge passage 640a provided within the electrode plate 640. A discharging liquid introduction plug 654 which is connected to a liquid supply pipe and discharging liquid discharge plugs 656 which are connected to liquid discharge pipes are connected to the discharging liquid introduction/discharge passage 640a.

The discharging liquid is introduced into the discharging liquid flow passage 650 via the liquid supply pipe connected to the discharging liquid introduction plug 654. The discharging liquid introduced into the discharging liquid flow passage 650 flows through the passage 650 and, at the same time, partly passes through the openings 648a and reaches the ion exchanger 652, and is discharged from the liquid discharge pipes connected to the discharging liquid discharge plugs 656.

Positioned above the electrode plate 640, through-holes 642b, each opening at the end surface of the electrode plate 640 and at the discharging liquid flow passage 650, are provided at both ends of the processing electrode 642. Discharging liquid discharge plugs 660, which are connected to e.g. the discharging liquid discharge pipes 616 shown in FIGS. 30A to 30C and FIG. 31, are connected to the through-holes 642b, respectively. The above construction makes it possible to continuously supply the discharging liquid into the discharging liquid flow passage 650 at such a flow rate that gas bubbles or gasses generated during processing do not affect the processing, and discharge the discharging liquid, together with the gas bubbles or gasses, from the discharging liquid flow passage 650.

On the other hand, in the interior of the feeding electrode 644, there is formed a pure water flow passage 644a that extends over the full length of the feeding electrode 644. The upper surface of the feeding electrode 644 is covered with an ion exchanger 662 composed of a surface layer 662a and a three-layer laminate 662b. Through-holes 644b, extending from the pure water flow passage 644a and reaching the upper surface of the feeding electrode 644, are provided at certain positions in the feeding electrode 644. Further, though not figured, pure water passage, connecting to the pure water flow passage 644a, is provided within the electrode plate 640 and in the feeding electrode 644. Pure water introduction plugs 664, which are connected to pure water supply pipes, are connected to the pure water passage.

Pure water is introduced into the pure water flow passage 644a via the pure water supply pipes connected to the pure water introduction plugs 664. The pure water introduced into the pure water flow passage 644a flows through the pure water flow passage 644a and, at the same time, partly passes through the through-holes 644b, reaches the ion exchanger 662 and leaks out of the surface of the ion exchanger 662.

In the interior of each pure water jet nozzle 646, there is provided a pure water flow passage 646a which extends over the full length of the water jet nozzle 646. Pure water jet orifices 646b, which connect to the pure water flow passage 646a and jet pure water toward the ion exchanger 652, are provided in the pure water jet nozzle 646 at a given pitch in the long direction. By supplying pure water into the pure water flow passage 646a, pure water is jetted from the pure water jet orifices 646b mainly toward the upper surface of the ion exchanger 652 covering the upper surface of the processing electrode 642.

The processing electrode 642 with the ion exchanger 652 mounted thereon and the pair of pure water jet nozzles 646 disposed on both sides of the processing electrode 642 are integrated by fastening taps 672 from the outside of the pure water nozzles 646 to tap bars 670 disposed on both sides of the lower portion of the processing electrode 642. The surface layer 652a of the ion exchanger 652 is disposed such that it covers almost the entire surface of the processing electrode 642. The side portion of the surface layer 652a is positioned between the processing electrode 642 and the pure water jet nozzle 646. Further, the processing electrode 642 and the ion exchanger surface layer 652a are tightened, with an O-ring 674 being interposed therebetween, whereby the discharging liquid flow passage 650 between the processing electrode 642 and the ion exchanger surface layer (partition) 652a is made watertight.

The thus integrated processing electrode 642 and pure water jet nozzles 646 are sandwiched between a pair of insert plates 676 and fixed to the electrode plate 640. On the other hand, the feeding electrode 644, with its surface covered with the surface layer 662a of the ion exchanger 662, is sandwiched between a pair of holding plates 678 and fixed to the electrode plate 640.

According to this embodiment, while allowing the ion exchanger 652, covering the surface of the processing electrode 642, and the ion exchanger 662, covering the surface of the feeding electrode 644, to be closed to or in contact with a workpiece and applying a voltage between the processing electrode 642 and the feeding electrode 644, pure water is supplied to the surface of the ion exchanger 652 of the processing electrode 642 and to the surface of the ion exchanger 662 of the feeding electrode 644 and, at the same time, the discharging liquid is continuously supplied into the discharging liquid flow passage 650 at such a flow rate that gas bubbles or gasses generated during processing do not affect the processing to thereby fill the discharging liquid flow passage 650 of the processing electrode 642 with the discharging liquid and discharge the discharging liquid, together with the gas bubbles, out of the passage 650. Processing of the workpiece and regeneration of the ion exchanger 652, covering the surface of the processing electrode 642, can thus be carried out simultaneously.

Though the above-described embodiments use as the discharging liquid an electrolytic solution having an electric conductivity of e.g. not less than 50 μS/cm, it is also possible to use as the discharging liquid a liquid containing an ion-exchange group. Examples of the discharging liquid containing an ion-exchange group may include an ion exchanger which itself has liquidity and a liquid obtained by pulverizing an ion exchanger having a large ion-exchange capacity, and mixing the pulverized product with a liquid such as pure water.

According to the present invention, as described hereinabove, regeneration of an ion exchanger can be carried out easily and quickly through an electrochemical section and in parallel with electrolytic processing. This eliminates the need to stop the processing for exchange of ion exchanger and can increase the throughput. Further, the present invention can minimize contamination of the generated ion exchanger with a chemical liquid and minimize a load upon cleaning of the regenerated ion exchanger, and can eliminate the need to separately provide a regeneration section and reduce the installation space.

Although certain preferred embodiments of the present invention have been shown and described in detail, it should be understood that various changes and modifications may be made therein without departing from the scope of the present invention.

INDUSTRIAL APPLICABILITY

The present invention relates to a method and device for regenerating an ion exchanger which, in electrolytic processing for processing an electrically conductive material on the surface of a substrate such as a semiconductor wafer or removing impurities adhering to the substrate surface, can electrochemically remove a metal or other ions taken in an ion exchanger used in the electrolytic processing, thereby regenerating the ion exchanger.

The invention claimed is:

1. A method for regenerating an ion exchanger which covers a surface of a processing electrode or a feeding electrode and is used in electrolytic processing that includes bringing the ion exchanger close to or into contact with a workpiece while applying a voltage between the processing and the feeding electrode to process a surface of the workpiece, said method comprising:

providing a regeneration section including a partition, a regeneration electrode to be disposed at a position facing the ion exchanger and the processing electrode or feeding electrode covered with the ion exchanger such that the partition is disposed between the ion exchanger and the regeneration electrode, and a discharge portion formed between the partition and the regeneration electrode; and positioning the regeneration section such that the partition of the regeneration section is brought close to or into contact with a surface of the ion exchanger covering the processing electrode or feeding electrode; and applying a voltage between the regeneration electrode and the processing electrode or feeding electrode covered with the ion exchanger while supplying a liquid into the discharge portion and also supplying a liquid between the partition and the processing electrode or feeding electrode covered with the ion exchanger, thereby regenerating the ion exchanger.

2. The method according to claim 1, wherein the partition comprises an ion exchanger.

3. The method according to claim 2, wherein the partition is a cation exchanger and the ion exchanger that covers the processing electrode or feeding electrode is a cation exchanger.

4. The method according to claim 2, wherein the partition is an anion exchanger and the ion exchanger that covers the processing electrode or feeding electrode is an anion exchanger.

5. The method according to claim 1, wherein the regeneration electrode is a cathode and the ion exchanger that covers the processing electrode or feeding electrode is a cation exchanger.

6. The method according to claim 1, wherein the liquid supplied between the partition and the processing electrode or feeding electrode covered with the ion exchanger is ultrapure water, pure water or a liquid having an electric conductivity of not more than 500 μS/cm.

7. The method according to claim 1, wherein the liquid supplied into the discharge portion is a liquid having an electric conductivity of not less than 50 μS/cm which does not form a hardly soluble or insoluble compound through a reaction with an ion which is removed from the ion exchanger that covers the processing electrode or feeding electrode.

8. The method according to claim 1, wherein the regeneration electrode is an anode and the ion exchanger that covers the processing electrode or feeding electrode is an anion exchanger.

* * * * *